(12) United States Patent
Leddy et al.

(10) Patent No.: US 6,207,313 B1
(45) Date of Patent: Mar. 27, 2001

(54) MAGNETIC COMPOSITES AND METHODS FOR IMPROVED ELECTROLYSIS

(75) Inventors: Johna Leddy, Iowa City, IA (US); Lois Anne Zook, Richmond, OH (US); Sudath Amarasinghe, Iowa City, IA (US)

(73) Assignee: The University of Iowa Research Foundation, Iowa City, IA (US)

(*) Notice: Subject to any disclaimer, the term of this patent is extended or adjusted under 35 U.S.C. 154(b) by 0 days.

(21) Appl. No.: 09/362,495

(22) Filed: Jul. 30, 1999

Related U.S. Application Data

(60) Continuation of application No. 09/239,156, filed on Jan. 28, 1999, now Pat. No. 5,981,095, which is a division of application No. 08/659,505, filed on Jun. 6, 1996, now Pat. No. 5,871,625, which is a continuation-in-part of application No. 08/294,797, filed on Aug. 25, 1994, now abandoned, said application No. 08/659,505, filed on Jun. 6, 1996, is a continuation-in-part of application No. 08/486,570, filed on Jun. 7, 1995, now Pat. No. 6,001,248, and a continuation-in-part of application No. 08/597,026, filed on Feb. 5, 1996, now Pat. No. 5,817,221.

(51) Int. Cl.[7] .................................................. H01M 4/86
(52) U.S. Cl. .................... 429/40; 429/44; 204/290.01; 204/291; 427/77; 427/115; 427/372.2; 427/388.1
(58) Field of Search .......................... 204/290.01, 291, 204/292, 293, 294; 429/40, 44; 427/77, 115, 372.2, 388.1

(56) References Cited

U.S. PATENT DOCUMENTS

| | | |
|---|---|---|
| 2,895,851 | 7/1959 | Johnson .............................. 427/598 |
| 3,811,952 | 5/1974 | Siwersson et al. .................... 429/10 |
| 3,945,910 | 3/1976 | DeCeuster et al. ................. 204/296 |
| 4,132,619 | 1/1979 | Klein et al. ......................... 204/291 |
| 4,201,827 | 5/1980 | Heitkamp ............................ 428/283 |
| 4,244,998 | 1/1981 | Smith .................................. 428/195 |
| 4,247,398 | 1/1981 | Mohri .................................. 210/222 |
| 4,293,371 | 10/1981 | Kokta et al. ........................ 156/624 |
| 4,336,278 | 6/1982 | Pertzsch et al. ...................... 427/47 |
| 4,339,337 | 7/1982 | Tricot et al. ...................... 252/62.54 |
| 4,647,514 | 3/1987 | LeCraw et al. ..................... 428/692 |
| 4,725,490 | 2/1988 | Goldenberg ......................... 428/292 |
| 4,795,698 | 1/1989 | Owen et al. ........................ 436/526 |
| 4,876,115 | 10/1989 | Raistrick ............................... 429/42 |
| 4,965,007 | 10/1990 | Yudelson .......................... 252/62.53 |
| 4,973,391 | 11/1990 | Madon et al. ........................ 204/78 |
| 5,075,169 | 12/1991 | Nagai et al. ........................ 428/402 |
| 5,096,551 | 3/1992 | Shoen et al. ........................ 204/131 |
| 5,102,745 | 4/1992 | Tatarchuk et al. .................. 428/605 |
| 5,172,751 | 12/1992 | Croat .................................. 148/101 |
| 5,186,854 | 2/1993 | Eldelstein ......................... 252/62.55 |
| 5,187,034 | 2/1993 | Otagwa et al. ..................... 429/198 |
| 5,191,223 | 3/1993 | Munekata .......................... 257/421 |
| 5,241,447 | 8/1993 | Barber et al. ...................... 361/141 |
| 5,561,000 | 10/1996 | Dirven et al. ........................ 429/40 |
| 5,587,943 | 12/1996 | Torok et al. ........................ 365/158 |
| 5,599,638 | 2/1997 | Surampude et al. ................. 429/33 |
| 5,646,001 | 7/1997 | Terstapen et al. .................. 436/526 |
| 5,696,392 | 12/1997 | Char et al. ........................ 257/190 |
| 5,817,221 | * 10/1998 | Leddy et al. ................... 204/290 R |

OTHER PUBLICATIONS

Burstall, F.H. and Nyholm, R.S., Studies in Co-ordination Chemistry, Part XIII, Magnetic Moments and Bond Types of Transition–metal Complexes, J. Chem Soc. pp. 3570–3579 (1952).

Cotton, F.A. and Wilkinson, G., Advanced Inorganic Chemistry, Third Edition, Interscience Publisher, New York, 1972, pp. 329, 369.

Figgis, B.N. and Lewis, J., The Magnetic Properties of Transistion Metal Complexes, in Progress in Inorganic Chemistry, vol. 6, Cotton, F.A., ed., Interscience Publishers, New York, 1964, pp. 37–239.

\* cited by examiner

Primary Examiner—Bruce F. Bell
(74) Attorney, Agent, or Firm—Fleshner & Kim, LLP

(57) ABSTRACT

Magnetic composites exhibit distinct flux properties due to gradient interfaces. The composites can be used to improve fuel cells and batteries and effect transport and separation of different chemical species. Devices utilizing the composites include an electrode and improved fuel cells and batteries. Some composites, disposed on the surface of electrodes, prevent passivation of those electrodes and enable direct reformation of liquid fuels. Methods involving these composites provide distinct ways for these composites to be utilized.

16 Claims, 59 Drawing Sheets

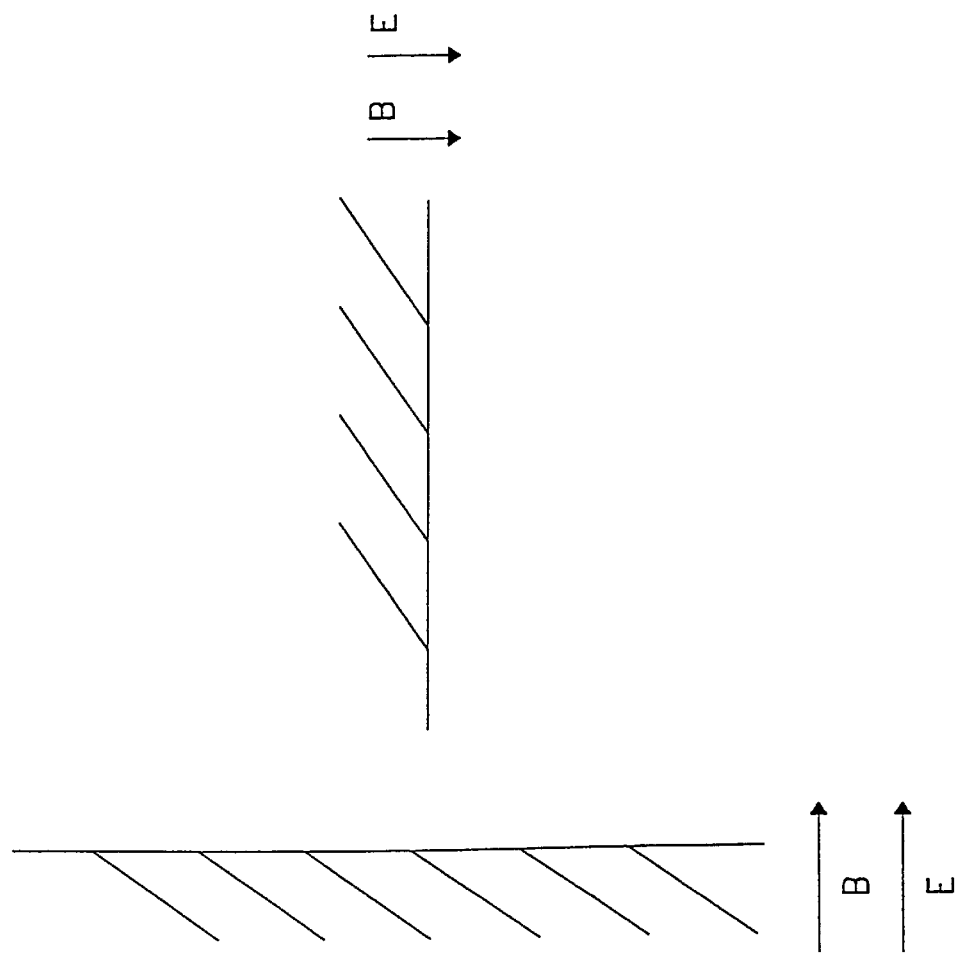

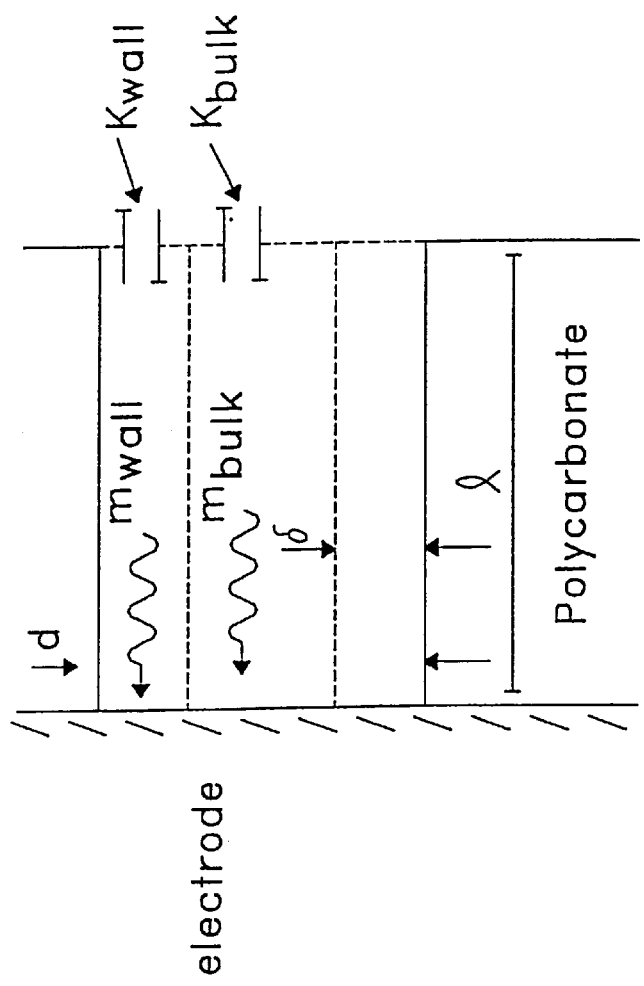
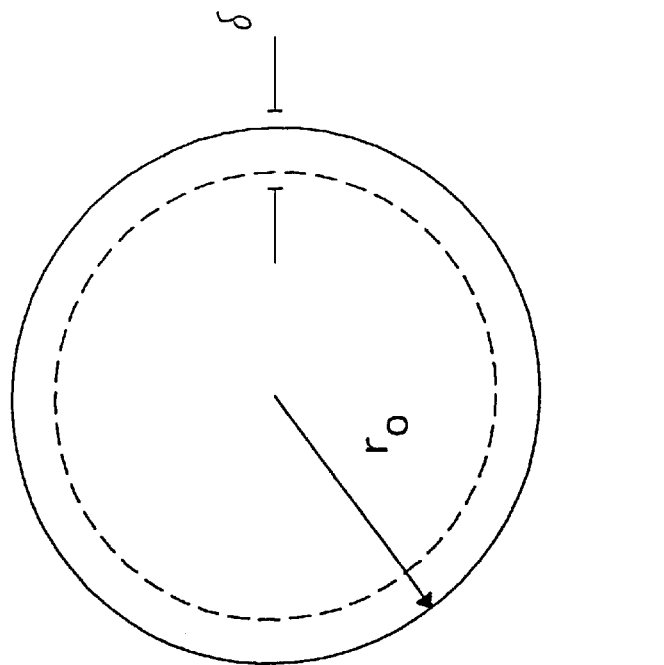
Figure 5A
Figure 5B

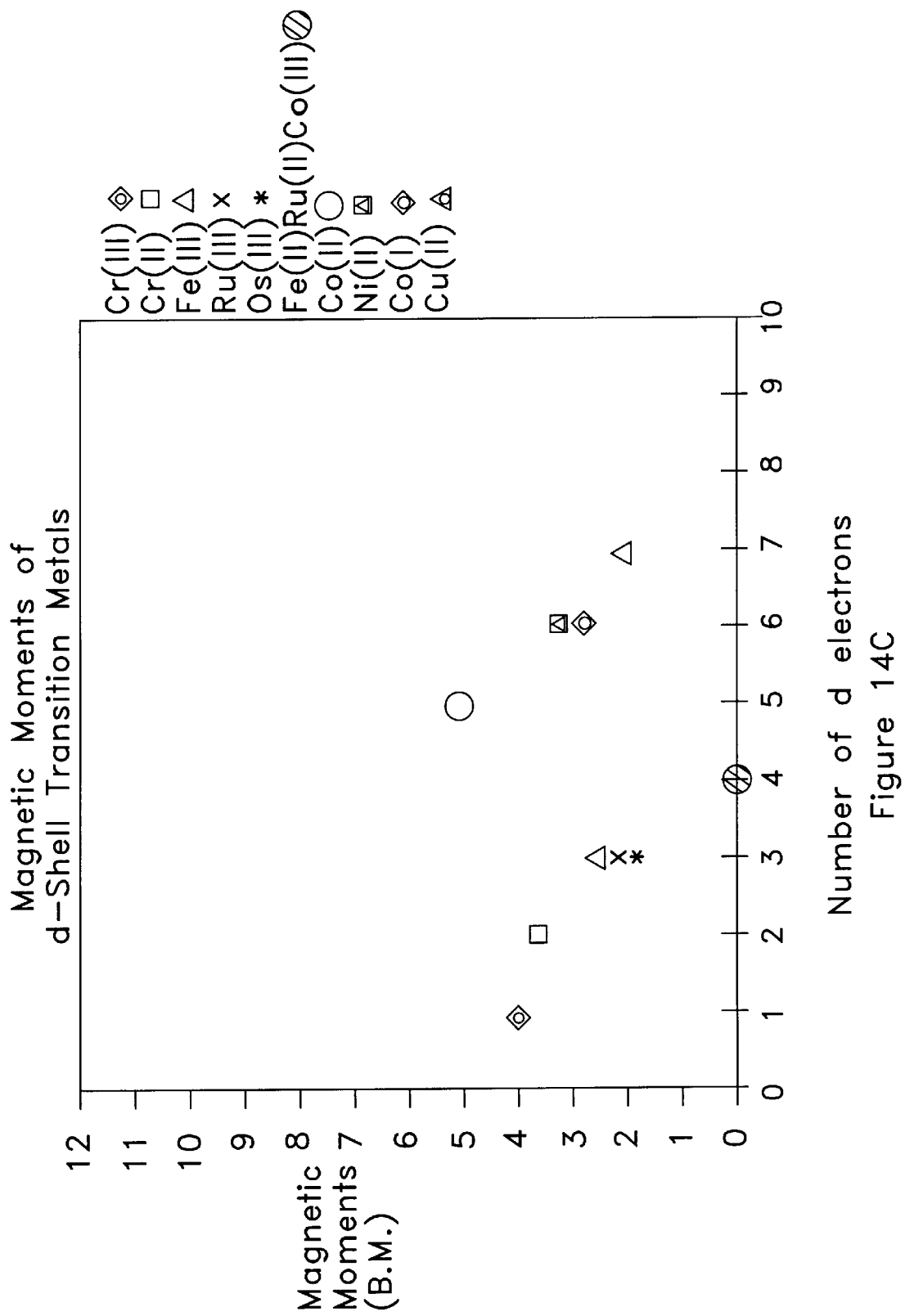

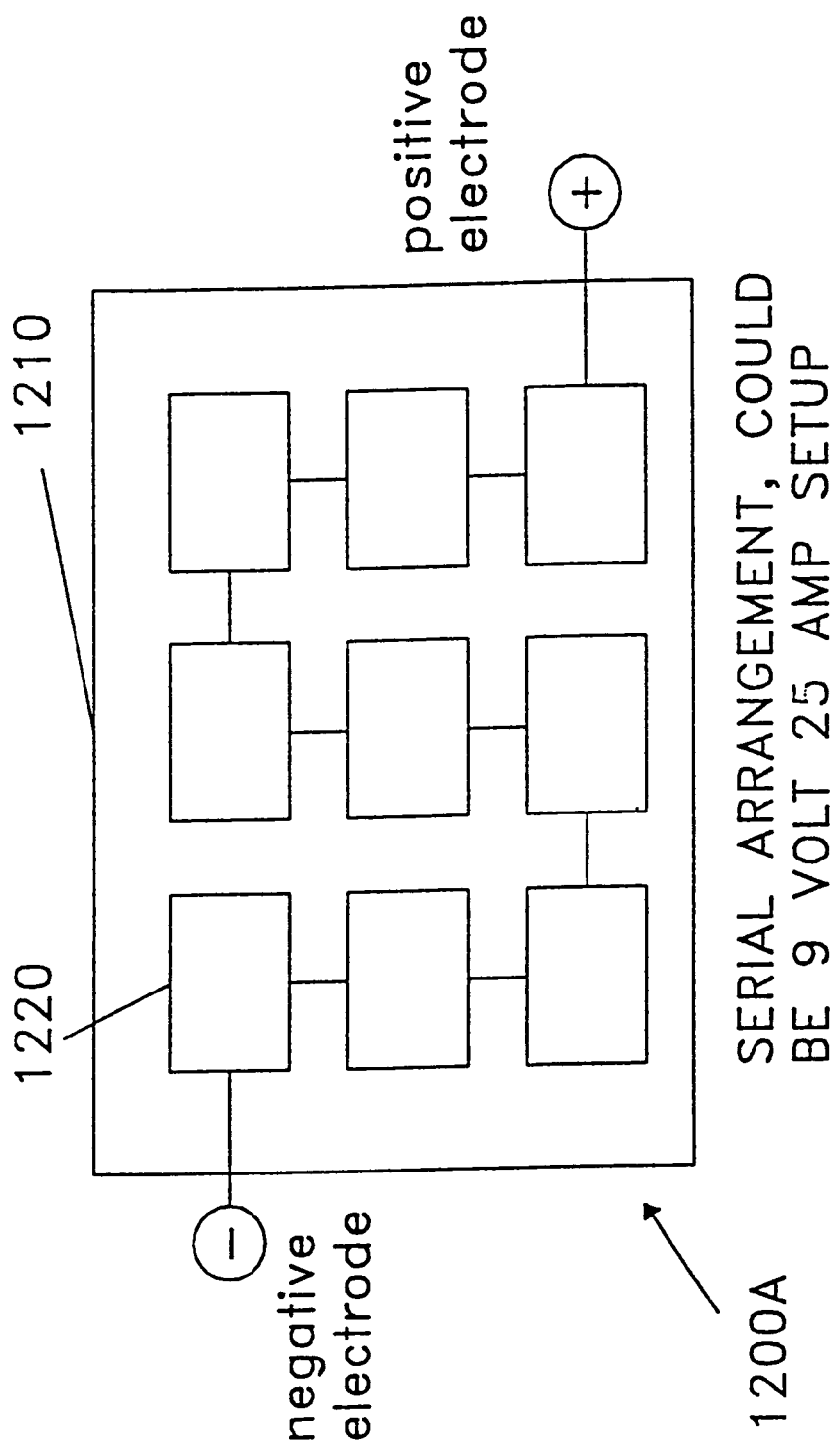

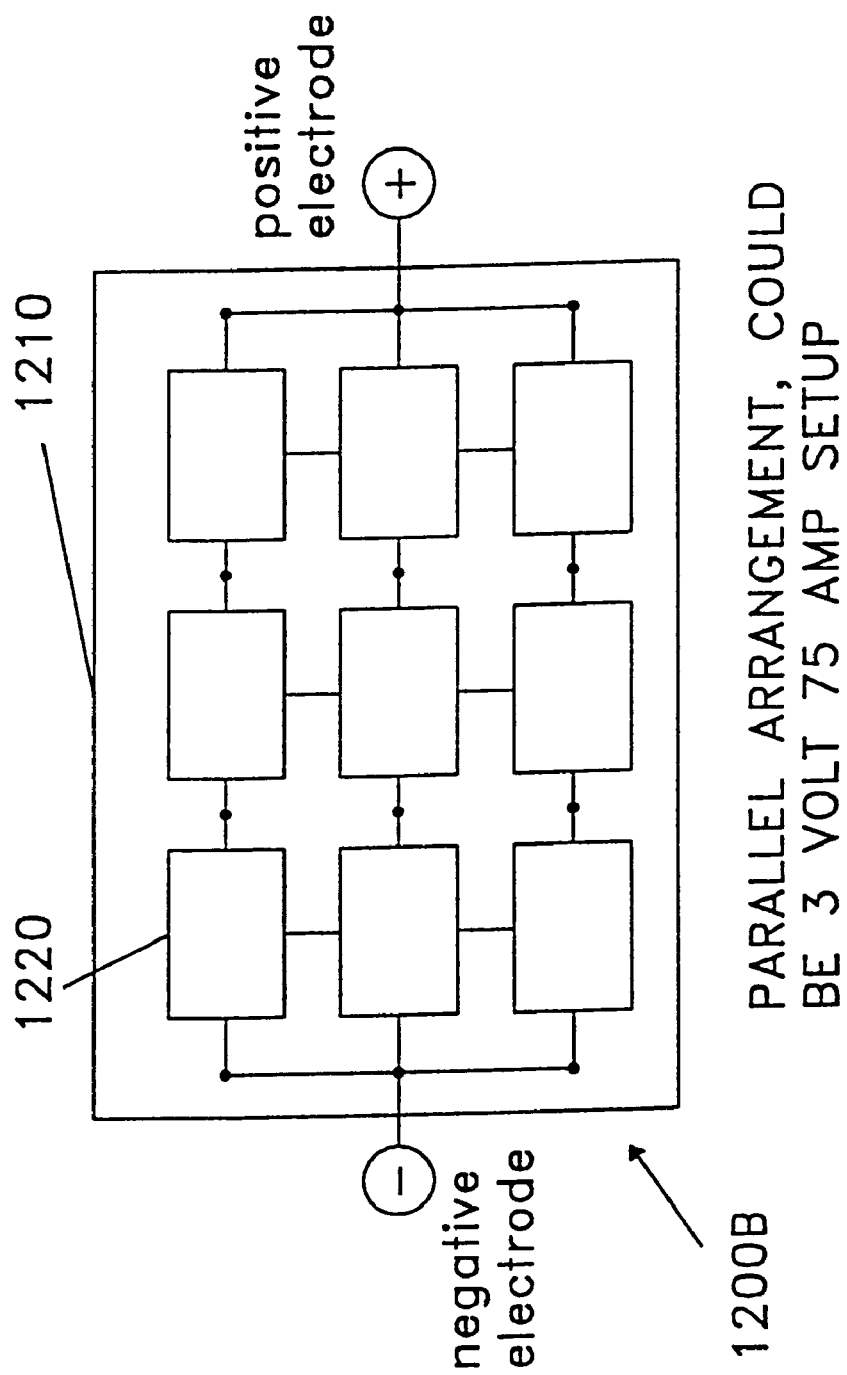
Figure 16E2

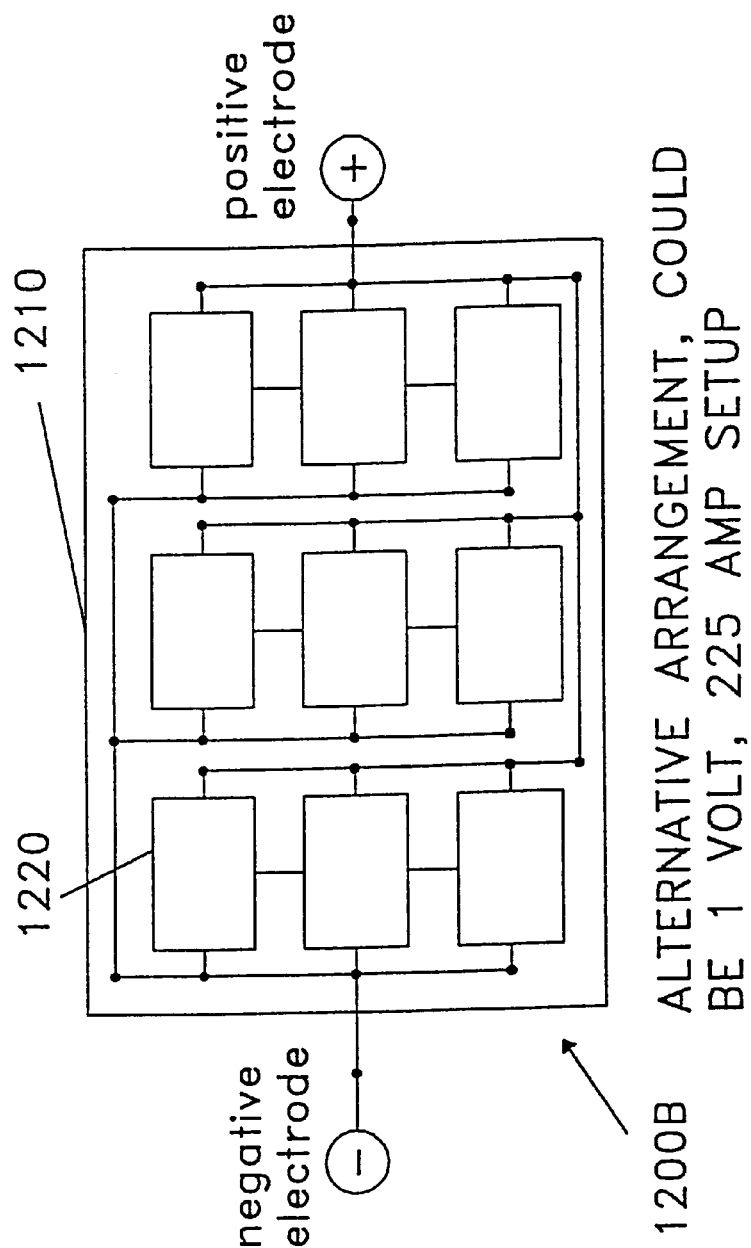
FIG. 16E3

MAGNETIC COMPOSITES AND METHODS FOR IMPROVED ELECTROLYSIS

RELATED APPLICATION

This application is a Continuation of application Ser. No. 09/239,156 filed Jan. 28, 1999, (now U.S. Pat. No. 5,981, 095) which is a Divisional of application Ser. No. 08/659, 505, filed Jun. 6, 1996 (now U.S. Pat. No. 5,871,625), which is a continuation-in-part of application Ser. No. 08/294,797, filed Aug. 25, 1994 now abandoned. Application Ser. No. 08/659,505 is also a continuation-in-part of application Ser. No. 08/486,570, filed Jun. 7, 1995 now U.S. Pat. No. 6,001,248 and a continuation-in-part of Ser. No. 08/597,026, filed Feb. 5, 1996 now U.S. Pat. No. 5,817,221.

Part of the work performed during the development of this invention utilized U.S. government funds under grants No. CHE92-96013 and No. CHE93-20611 from the National Science Foundation, Chemistry Division, Analytical and Surface Science. The government may have certain rights in this invention.

BACKGROUND OF THE INVENTION

1. Field of the Invention

This invention relates generally to a method for forming and exploiting gradients at the interfaces between components of a composite material, as well as to the composite material itself, and devices which incorporate the material. In particular, the invention relates to a method for forming and exploiting magnetic gradients at the interfaces between components of a magnetic composite material and the magnetic composite material itself as well as devices which incorporate the composite material such as electrochemical systems and separators including fuel cells, batteries, and separations resulting in enhanced and modified flux and performance in those systems. The invention further relates to compositions, apparatus, methods of making, and methods of using magnetic composite materials in electrolytic applications, including fuel cells. In particular, the invention relates to compositions, apparatus, methods of making, and methods of using magnetic composite materials in electrolytic applications to prevent electrode passivation, particularly in fuel cell applications for the direct reformation of fuels; and to apparatus and methods for modifying the outcome of electrolyses involving free radical products and intermediates.

As used herein, the term "fuel" includes mixtures of one or more fuels, either liquid or gaseous, with other fuel or non-fuel components, including fuel mixtures of one or more fuels with air. As used herein, the term "fuel mixture" refers to a mixture of a fuel with one or more different fuel, or non-fuel, components.

2. Background of the Related Art

In the detailed description of preferred embodiments, it will be shown that interfacial gradients in properly prepared composite materials can be exploited to enhance flux in many types of electrochemical systems such as fuel cells, batteries, membrane sensors, filters and flux switches. Such interfacial gradients may also be exploited in separators involving chromatographic separations and nonelectrochemical separations including, but not limited to, separations of light and heavy transition metals and transition metal complexes. The heavy transition metals include the lanthanides and the actinides which have atomic numbers 58–71 and 90–103, respectively. First, however, the following discussion provides a brief overview of the current understanding of magnetic properties in composites. In particular, the discussion below summarizes the thermodynamic, kinetic and mass transport properties of bulk magnetic materials. These bulk properties of molecules in magnetic fields are fairly well understood.

Rudimentary Magnetic Concepts

Paramagnetic molecules have unpaired electrons and are attracted into a magnetic field; diamagnetic species, with all electrons paired, are slightly repelled by the field. Radicals and oxygen are paramagnetic; most organic molecules are diamagnetic; and most metal ions and transition metal complexes are either para- or diamagnetic. How strongly a molecule or species in a solution or fluid responds to a magnetic field is parameterized by the molar magnetic susceptibility, $\chi_m$ ($cm^3$/mole). For diamagnetic species, $\chi_m$ is between $(-1$ to $-500) \times 10^{-6}$ $cm^3$/mole, and temperature independent. For paramagnetic species, $\chi_m$ ranges from 0 to $+0.01$ $cm^3$/mole, and, once corrected for its usually small diamagnetic component, varies inversely with temperature (Curie's Law).

While ions are monopoles and will either move with or against an electric field., depending on the sign of the ion, paramagnetic species are dipoles and will always be drawn into (aligned in) a magnetic field, independent of the direction of the magnetic vector. These dipoles will experience a net magnetic force if a field gradient exists. Because electrochemistry tends to involve single electron transfer events, the majority of electrochemical reactions should result in a net change in the magnetic susceptibility of species near the electrode.

Magnetic field effects on chemical systems can be broken down into three types: thermodynamic, kinetic, and mass transport. Macroscopic, thermodynamic effects are negligible, although local magnetic field effects may not be. Kinetically, both reaction rates and product distributions can be altered. Transport effects can lead to flux enhancements of several-fold. Quantum mechanical effects are also possible, especially on very short length scales, below 10 nm. The following summarizes what has been done with homogeneous fields applied to solutions and cells with external laboratory magnets.

Thermodynamics

A magnetic field applied homogeneously by placing a solution between the poles of a laboratory magnet will have a negligible nonexponential effect on the free energy of reaction. $\Delta G_m = -0.5 \Delta \chi_m B^2$ J/mole, where $\Delta G_m$ is the change of the free energy of reaction due to the magnetic field, $\Delta \chi_m$ is the difference in magnetic susceptibility of the products and reactants, and B is the magnetic induction in gauss. For the conversion of a diamagnetic species into a paramagnetic species, $\Delta \chi_m \leq 0.01$ $cm^3$/mole. In a 1 Tesla (T) (1 Tesla=10 kGauss) applied field, $|\Delta G_m| \leq 0.05$ J/mole. Even in the strongest laboratory fields of 10 T, the effect is negligible compared to typical free energies of reaction ($\cong$kJ/mole). These are macroscopic arguments for systems where the magnet is placed external to the cell and a uniform field is applied to the solution. Microscopically, it may be possible to argue that local fields in composites are substantial, and molecules in composites within a short distance of the source of the magnetic field experience strong local fields. For example, for a magnetic wire or cylinder, the magnetic field falls off over a distance, x, as $x^{-3}$. The field experienced by a molecule 1 nm from the magnet is roughly $10^{21}$ times larger than the field experienced at 1 cm. This argument is crude, but qualitatively illustrates the potential advantage of a microstructural magnetic composite. (As an example, in the magnetic/Nafion (DuPont) composites, a larger fraction of the redox species are probably transported through the 1.5 nm zone at the interface between the Nafion and the magnetic particles.) These redox species must therefore experience large magnetic fields in close proximity to the interface.

Kinetics

Reaction rates, k, are parameterized by a pre-exponential factor, A, and a free energy of activation, $\Delta G^{\ddagger}$; $k=A \exp[-\Delta G^{\ddagger}/RT]$. An externally applied, homogeneous magnetic field will have little effect on $\Delta G^{\ddagger}$, but can alter A. Nonadiabatic systems are susceptible to field effects. Magnetic fields alter the rate of free radical singlet-triplet interconversions by lifting the degeneracy of triplet states (affecting $\Delta G^{\ddagger}$); rates can be altered by a factor of three in simple solvents. Because magnetic coupling occurs through both electronic nuclear hyperfine interactions and spin-orbit interactions, rates can be nonmonotonic functions of the applied field strength. Photochemical and electrochemical luminescent rates can be altered by applied fields. For singlet-triplet interconversions, magnetic fields alter product distributions when they cause the rate of interconversion to be comparable to the rate at which free radicals escape solvent cages. These effects are largest in highly viscous media, such as polymer films and micellar environments. Larger effects should be observed as the dimensionality of the system decreases. For coordination complexes, photochemical and homogeneous electron transfer rates are altered by magnetic fields. Spin-orbit coupling is higher in transition metal complexes than organic radicals because of higher nuclear charge and partially unquenched orbital angular momentum of the d- or f-shell electrons. The rate of homogeneous electron transfer between $Co(NH_3)_6^{3+}$ and $Ru(NH_3)_6^{2+}$ is below that expected for diffusion controlled reactions; in a 7 T magnetic field, the rate is suppressed two to three-fold. It has been argued that $\Delta \chi_m$ (and $\Delta G_m$) is set by the magnetic susceptibility of the products, reactants, and activated complex, and a highly paramagnetic activated complex accounts for the field effect. For reversible electron transfer at electrodes in magnetic fields, no significant effect is expected. For quasireversible electron transfer with paramagnetic and diamagnetic species, electron transfer rates and transfer coefficients (α) are unchanged by magnetic fields applied parallel to electrodes. Magnetic fields applied perpendicular to electrodes in flow cells generate potential differences, which just superimpose on the applied electrode potentials. Potentials of 0.25V have been reported. Reversing the applied magnetic field reverses the sign of the potential difference. This effect does not change standard rate constants, only the applied potential.

Mass Transport

Magnetically driven mass transport effects have been studied in electrochemical cells placed between the poles of large magnets. Effects vary depending on the orientation of the electrode, the relative orientation of the magnetic field and the electrode, forced or natural convection, and the relative concentrations of the redox species and electrolyte. Three cases are illustrated in FIGS. 1, 2 and 3.

For a charged species moving by natural or forced convection parallel to an electrode and perpendicular to a magnetic field which is also parallel to the electrode, a Lorentz force is generated which moves the charged particle toward the electrode (FIG. 1). This magnetohydrodynamic effect is characterized by $$F=q(E+v \times B) \qquad (1)$$

where F, E, v, and B are vectors representing the Lorentz force on the charged species, the electric field, the velocity of the moving species, and the magnetic field, respectively; and q is the charge on the species. For flow cells and vertical electrodes, flux enhancements of a few-fold and reductions in the overpotential of a few tenths volts have been found in the presence of the magnetic field. Also, embedded in Equation 1 is the Hall effect; when a charged species moves through a perpendicular magnetic field, a potential is generated. This potential superimposes on the applied potential and causes migration in low electrolyte concentrations.

When the electrode and magnetic field are parallel to the earth, thermal motion leads to vortical motion at the electrode surface unless the field (B) and the current density (j) are spatially invariant and mutually perpendicular (see FIG. 2). This is parameterized as:

$$F_v=c^{-1}[j \times B] \qquad (2)$$

In Equation (2) $F_v$ is the vector of magnetic force per volume and c is the speed of light. In general, these forces are smaller than Lorentz forces; flux enhancements of a few-fold and potential shifts of 10 to 20 mV are observed. Flux enhancements of paramagnetic and diamagnetic species are similar, but paramagnetic electrolytes enhance the flux of diamagnetic $Zn^{2+}$ two-fold. Vortices suppress thermal motion and eddy diffusion.

The final configuration, shown in FIG. 3, is for the magnetic field perpendicular to the electrode surface, and, therefore, parallel to the electric field. Various, and sometimes inconsistent, results are reported for several configurations: for vertical electrodes in quiescent solution, flux enhancements of ≦1000%; for electrodes parallel to the earth with forced convection, flux retardations of 10%; and for electrodes parallel to the earth and no forced convection, both enhancements and no enhancements are reported.

The above summarizes the thermodynamic, kinetic, and mass transport effects for systems where the magnetic field is applied uniformly across a cell with an external magnet. None of these macroscopic effects predict or address properties dependent on the magnetic susceptibility of the redox species. Quantum mechanical effects may also be important, especially on short length scales.

Fuel Cells

Since the incomplete reduction of oxygen limits the efficiency of $H_2/O_2$ solid polymer electrolyte fuel cells, the cathode must be pressurized about five-fold over the anode.

Proton exchange membrane (PEM) fuel cell design is one which employs hydrogen as an anode feed and oxygen in air as a cathode feed. These fuels are decomposed electrolytically (to yield water) at electrodes typically modified with a noble metal catalyst. The hydrogen and oxygen are separated from each other by a proton exchange membrane (such as Nafion) to prevent thermal decomposition of the fuels at the noble metal catalyst. The reactions at the cathode can be summarized as follows:

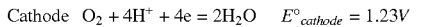
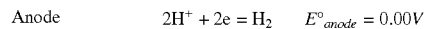
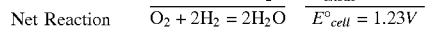

| Cathode | $O_2 + 4H^+ + 4e = 2H_2O$ | $E°_{cathode} = 1.23V$ |
|---|---|---|
| Anode | $2H^+ + 2e = H_2$ | $E°_{anode} = 0.00V$ |
| Net Reaction | $O_2 + 2H_2 = 2H_2O$ | $E°_{cell} = 1.23V$ |

However, the fuel cell is typically run under non-equilibrium conditions, and, as such, is subject to kinetic limitations. These limitations are usually associated with the reaction at the cathode.

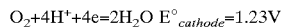

$O_2+4H^++4e=2H_2O$  $E°_{cathode}=1.23V$

As the reaction at the cathode becomes increasingly kinetically limited, the cell voltage drops, and a second reaction path, the two electron/two proton reduction of oxygen to peroxide, becomes increasingly favored. This consumes oxygen in two electron steps with lower thermodynamic potential.

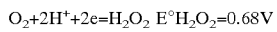
$$O_2 + 2H^+ + 2e = H_2O_2 \quad E°H_2O_2 = 0.68V$$

The standard free energy of this reaction is 30% of the free energy available from the four electron reduction of oxygen to water. The decrease in current associated with the decreased number of electrons transferred and the decreased cell potential couple to yield substantially lower fuel cell power output.

One approach to enhance the efficiency of the cathodic reaction is to increase the concentration (pressure) of the feeds to the cathode—protons and oxygen—so as to enhance the flux (i.e., the reaction rate at the cathode in moles/cm$^2$s$^{-1}$) at the cathode. The proton flux is readily maintained at a sufficiently high value by the proton exchange membrane (usually Nafion) so as to meet the demand set by the cathode reaction. Normally, the method of enhancing the flux and biasing the reaction to favor the formation of water is to pressurize the air feed to the cathode. Pressures of 5–10 atmospheres are typical.

The need to pressurize air to the cathode in PEM fuel cells has been a major obstacle in the development of a cost effective fuel cell as a replacement for the internal combustion engine, e.g. in a vehicle. In particular, pressurization of the cathode requires compressors. In transportation applications, power from the fuel cell is needed to run the compressor. This results in approximately 15% reduction in the power output of the total fuel cell system.

By developing a passive pressurization method for a fuel cell, the mechanical pumps could be eliminated from the fuel cell system. This has numerous advantages. The weight of a fuel cell would be decreased almost 40% by eliminating mechanical pumps. With the elimination of the parasitic loss of running the pumps, and improving cathode performance, the fuel cells would provide a higher energy and power density. Any potential shift at the electrode surface driven by the magnetic components can be exploited to enhance the voltage output of the fuel cell, and to overcome the poor kinetics of the cathode. Eliminating the pumps also eliminates the only moving parts of the fuel cell, and thereby, the likelihood of fuel cell failure is drastically reduced.

In current fuel cell design, the cathode is pressurized to approximately five times the pressure of the anode. This pressurization constrains the design of the fuel cell to be sufficiently rigid as to support this pressure. In a magnetically based, passive pressurization scheme, the need for the rigid structure is eliminated. This has two major advantages. First, the weight and bulk of the fuel cell is decreased. Second, the fuel cell is now a flexible device. The flexibility can be exploited in various ways, including placing fuel cells into unusual geometries and structures, thereby exploiting space in structures and devices which might otherwise be lost. Also, the flexible nature of the fuel cell allows a single structure to be divided readily into several smaller cells, which can be connected into different parallel and serial configurations to provide variable voltage and current outputs. Such a division is more complicated in the more rigid structures of a pressurized fuel cell because the encasing walls limit access to the fuel cell electrodes.

Electrode Passivation

At present, many fuel cell designs are focused on hydrogen as fuel, due in part to the favorable kinetics for hydrogen at the anode. However, hydrogen has the disadvantage of being difficult and somewhat dangerous to store. This disadvantage is particularly apparent in portable fuel cell applications (e.g. vehicular and portable device applications, such as lap-top computers). For vehicular fuel cell applications a liquid fuel, such as methanol, is generally preferred. In prior art fuel cells employing methanol as fuel, methanol is reformed thermally over a copper zinc or other catalyst to form hydrogen (and carbon dioxide), which is fed to the anode on demand.

Direct reformation of liquid fuels (e.g. methanol, ethanol) at the anode, although much preferred, is not efficient using prior art fuel cells. This is so because, in prior art fuel cells, a passivating layer rapidly forms on the surface of the anode due to reaction of the anode surface with intermediates of the electrolysis, i.e., the electrode is rendered passive, and as a result further reaction stops or is significantly impeded.

Despite extensive investigations over the past several decades, little progress has been made in developing direct reformation of a fuel at the electrode(s) of a fuel cell. This is particularly true in the case of direct reformation at ambient temperatures. This lack of progress is a direct consequence of the lack of resolution of the problem of electrode passivation. To date, almost all efforts to resolve this problem have focused on chemical techniques and methods, as opposed to the physical/magnetic approach adopted under the present invention.

Data presented below demonstrate that electrodes modified with a magnetic composite are either not passivated or passivated less than unmodified electrodes, i.e. such modified electrodes resist passivation; whereas unmodified electrodes are rapidly passivated, during oxidation of a liquid fuel. According to the present invention, the direct reformation of liquid fuel in fuel cell applications is possible. The present invention may also be broadly applicable to the prevention of passivation in the case of all electrolyses which proceed via either a free radical mechanism, or a multi-electron transfer process.

SUMMARY OF THE INVENTION

It is therefore an object of the invention to provide an improved electrode.

Another object of the invention is to provide a coating on an electrode to enhance the flux of magnetic species to the electrode.

Another object of the invention is to provide a separator to separate magnetic species from each other dependent upon magnetic susceptibility.

Another object of the invention is to provide a method for making a coating for an electrode to improve the flux of magnetic species to the electrode.

Another object of the invention is to provide a method for coating a surface of a device with a magnetic composite material responsive to an external magnetic field.

Another object of the invention is to provide a method for coating a surface of a device with a magnetic composite material having a plurality of boundary regions with magnetic gradients having paths to the coated surface when an external magnetic field is applied to the coated surface.

Another object of the invention is to provide an improved fuel cell.

Another object of the invention is to provide an improved cathode in a fuel cell.

Another object of the invention is to provide an improved battery.

Another object of the invention is to provide an improved membrane sensor.

Another object of the invention is to provide an improved flux switch.

Another object of the invention is to provide an improved fuel cell cathode with passive oxygen pressurization.

Another object of the invention is to provide an improved separator for separating paramagnetic species from diamagnetic species.

Another object of the invention is to provide an improved electrolytic cell.

Another object of the invention is to provide an improved electrolytic cell for an electrolyzable gas.

Another object of the invention is to provide an improved graded density composite for controlling chemical species transport.

Another object of the invention is to provide an improved dual sensor.

Another object of the invention is to provide an improved electrode for direct reformation of liquid or gaseous fuels.

Another object of the invention is to provide an improved electrode which does not passivate or which resists formation of a passivating layer on the electrode surface.

Another object of the invention is to provide an electrochemical cell having improved power generation and/or synthetic capability.

Another object of the invention is to provide an electrochemical cell having an electrode which is not passivated by electrolysis intermediates.

Another object of the invention is to provide an improved fuel cell having an electrode which resists passivation by electrolysis intermediates and which permits the direct reformation of a liquid or gaseous fuel.

Another object of the invention is to provide a magnetic composite material or composition for coating the surface of an electrode, wherein the electrode does not passivate or form a passivating layer on the electrode surface.

Another object of the invention is to provide a method for coating the surface of an electrode, wherein the electrode does not passivate or form a passivating layer on the electrode surface.

Another object of the invention is to provide a method for coating the surface of an electrode, wherein the electrode allows direct reformation of a liquid or gaseous fuel.

Another object of the invention is to provide a method for preventing an electrode from forming a passivating layer on the electrode surface.

Another object of the invention is to provide a method which enables direct reformation of a liquid or gaseous fuel at the electrode surface of a fuel cell.

Another object of the invention is to provide a method for direct reformation of a liquid or gaseous fuel at the surface of an electrode wherein the surface of the electrode is not passivated.

One advantage of the invention is that it can enhance the flux of paramagnetic species to an electrode.

Another advantage of the invention is that it can enhance the flux of oxygen to the cathode in a fuel cell, equivalent to passive pressurization.

Another advantage of the invention is that it can separate paramagnetic, diamagnetic, and nonmagnetic chemical species from a mixture.

Another advantage of the invention is that it can separate chemical species according to chemical, viscosity, and magnetic properties.

Another advantage of the invention is that it can take advantage of magnetic field gradients in magnetic composites.

Another advantage of the invention is that it can be designed to work with internal or external magnetic fields, or both.

Another advantage of the invention is that it avoids the formation of a passivating layer on the surface of an electrode.

Another advantage of the invention is that it permits the direct reformation of a liquid or gaseous fluid at the surface of a fuel cell electrode.

Another advantage of the invention is that it establishes magnetic fields at the surface of an electrode.

Another advantage of the invention is that it stabilizes free radicals generated during the electrolysis process.

One feature of the invention is that it includes a magnetically modified electrode.

Another feature of the invention is that it includes a process for coating a surface of a device with a magnetic composite material responsive to an external magnetic field, wherein the coating imparts increased electrochemical efficiency, and or increased flux, at said surface.

Another feature of the invention is that it includes magnetic composites made from ion exchange polymers and non-permanent magnet microbeads with magnetic properties which are susceptible to externally applied magnetic fields.

Another feature of the invention is that it includes magnetic composites made from ion exchange polymers and organo-Fe (superparamagnetic or ferrofluid) or other permanent magnetic and nonpermanent magnetic or ferromagnetic or ferrimagnetic material microbeads which exhibit magnetic field gradients.

Another feature of the invention is that it includes magnetic composites comprising particles containing platinum, wherein the platinum serves as a catalyst and/or an electron conductor.

Another feature of the invention is that it includes an improved electrode having a magnetic composite disposed thereon, wherein the electrode is not passivated by intermediates of electrolysis.

Another feature of the invention is that it includes a magnetic composite composition for coating a surface of an electrode, wherein the formation of a passivating layer at the surface of the electrode is avoided.

Another feature of the invention is that it includes a magnetic composite composition for coating the surface of an electrode which does not passivate or form a passivating layer on the electrode surface and permits the direct reformation of fuels by the electrode.

Another feature of the invention is that it includes magnetic composites, comprising carbon particles associated with a catalyst, in combination with an ion exchange polymer, and magnetic microbeads, which enable the direct reformation of liquid or gaseous fuels at the surface of a fuel cell electrode, without the formation of a passivating layer at the surface of the electrode.

Another feature of the invention is that it includes magnetic composites, comprising carbon particles associated with a catalyst, in combination with an ion exchange polymer, and magnetic microbeads, which enable the stabilization of free radicals generated during the electrolysis process, wherein the formation of a passivating layer at the surface of the electrode is avoided.

Another feature of the invention is that it includes an electrochemical cell having at least one electrode with a magnetic composite material disposed on the surface thereof, wherein the electrochemical cell provides enhanced power generation and/or synthetic capability.

These and other objects, advantages and features are accomplished by a separator arranged between a first region containing a first type of particle and a second type of particle and a second region, comprising: a first material having a first magnetism; a second material having a second magnetism; a plurality of boundaries providing a path between the first region and the second region, each of the plurality of boundaries having a magnetic gradient within the path, the path having an average width of approximately one nanometer (nm) to approximately several micrometers ($\mu$m), wherein the first type of particles have a first magnetic susceptibility and the second type of particles have a second magnetic susceptibility, wherein the first and the second magnetic susceptibilities are sufficiently different that the first type of particles pass into the second region while most of the second type of particles remain in the first region.

These and other objects, advantages and features are also accomplished by the provision of a cell, comprising: an electrolyte including a first type of particles; a first electrode arranged in the electrolyte; and a second electrode arranged in the electrolyte wherein the first type of particles transform into a second type of particles once the first type of particles reach the second electrode, the second electrode having a surface with a coating which includes: a first material having a first magnetism; a second material having a second magnetism; a plurality of boundaries providing a path between the electrolyte and the surface of the second electrode, each of the plurality of boundaries having a magnetic gradient within the path, the path having an average width of approximately one nanometer to approximately several micrometers, wherein the first type of particles have a first magnetic susceptibility and the second type of particles have a second magnetic susceptibility, and the first and the second magnetic susceptibilities are different.

These and other objects, advantages and features are also accomplished by the provision of a method of coating a surface with a magnetic composite material, comprising the steps of: preparing a casting mixture comprising magnetic microbeads and an ion exchange polymer; casting the casting mixture on the surface; and drying the casting mixture to yield a magnetic composite coating on the surface.

These and other objects, advantages and features are also accomplished by the provision of a method of coating a surface of a device with a magnetic composite material, comprising the steps of: mixing a first component comprising at least about 1% by weight of magnetic microbeads in a first solvent with a second component comprising at least about 2% by weight of an ion exchange polymer in a second solvent to yield a mixed suspension or casting mixture; applying the mixed suspension to the surface, the surface being arranged in an external magnetic field of at least about 0.5 Tesla and being oriented approximately 90° with respect to the normal of the electrode surface; and evaporating the first solvent and the second solvent to yield a surface coating having a plurality of boundary regions with magnetic gradients having paths to the coated surface.

These and other objects, advantages and features are also accomplished by the provision of a method of making an electrode with a surface coated with a magnetic composite with a plurality of boundary regions with magnetic gradients having paths to the surface of the electrode, comprising the steps of: mixing a first component which includes a suspension of at least approximately 1 percent by weight of inert polymer coated magnetic microbeads containing between approximately 10 percent and approximately 90 percent magnetizable material having diameters at least 0.5 $\mu$m in a first solvent with a second component of at least approximately 2 percent by weight of an ion exchange polymer in a second solvent to yield a mixed suspension; applying the mixed suspension to the surface of the electrode, the electrode being arranged in a magnetic field of at least approximately 0.05 Tesla and being oriented approximately 90 degrees with respect to the normal of the electrode surface; and evaporating the first solvent and the second solvent to yield the electrode with a surface coated with the magnetic composite having a plurality of boundary regions with magnetic gradients having paths to the surface of the electrode.

These and other objects, advantages and features are further accomplished by a method of making an electrode with a surface coated with a composite with a plurality of boundary regions with magnetic gradients having paths to the surface of the electrode when an external magnetic field is turned on, comprising the steps of: mixing a first component which includes a suspension of at least 5 percent by weight of inert polymer coated microbeads containing between 10 percent and 90 percent magnetizable non-permanent magnetic material having diameters at least 0.5 $\mu$m in a first solvent with a second component comprising at least 5 percent by weight of an ion exchange polymer in a second solvent to yield a casting mixture or mixed suspension; applying the mixed suspension to the surface of the electrode; evaporating the first solvent and the second solvent to yield the electrode with a surface coated with the composite having a plurality of boundary regions with magnetic gradients having paths to the surface of the electrode when an external magnet is turned on.

These and other objects, advantages and features are also accomplished by a method of forming a graded density layer, comprising the steps of: formulating a series of casting mixtures, each of the series of casting mixtures comprising a polymeric material and a solvent, wherein the series of casting mixtures have a range of concentrations of the polymeric material; applying to a surface a film of one of the series of casting mixtures and evaporating the solvent; and, further applying to the surface a film of another of the series of casting mixtures and evaporating the solvent, to yield a coating of the graded density layer on the surface.

These and other objects, advantages and features are also accomplished by an electrode for channeling flux of magnetic species comprising: a conductor; a composite of a first material having a first magnetism and a second material having a second magnetism in surface contact with the conductor, wherein the composite comprises a plurality of boundaries providing pathways between the first material and the second material, wherein the pathways channel the flux of the magnetic species through the pathways to the conductor.

These and other objects, advantages and features are further accomplished by an electrode for effecting electrolysis of magnetic species comprising: a conductor; and magnetic means in surface contact with the conductor for enhancing the flux of the magnetic species in an electrolyte solution to the conductor and thereby effecting electrolysis of the magnetic species.

These and other objects, advantages and features are further accomplished by an electrode for effecting electrolysis of magnetic species comprising: a conductor; and means in surface contact with the conductor for enhancing the flux of the magnetic species to the conductor and thereby effecting electrolysis of the magnetic species.

These and other objects, advantages and features are yet further accomplished by an electrode for electrolysis of magnetic species comprising: a conductor; a composite magnetic material in surface contact with the conductor, the composite magnetic material having a plurality of transport pathways through the composite magnetic material to enhance the passage of the magnetic species to the conductor and thereby effecting electrolysis of the magnetic species.

These and other objects, advantages and features are also accomplished by a system, comprising: a first electrolyte species with a first magnetic susceptibility; a second electrolyte species with a second magnetic susceptibility; and a means for channeling the first electrolyte species with a first magnetic susceptibility preferentially over the second electrolyte species with a second magnetic susceptibility, wherein the means comprises a first material having a first magnetism forming a composite with a second material having a second magnetism.

These and other objects, advantages and features are also accomplished by a system for separating first particles and second particles with different magnetic susceptibilities comprising: a first magnetic material with a first magnetism; and a second magnetic material with a second magnetism working in conjunction with the first magnetic material to produce magnetic gradients, wherein the magnetic gradients separate the first particles from the second particles.

These and other objects, advantages and features are accomplished by a composite material for controlling chemical species transport comprising: an ion exchanger; and a graded density layer, wherein the ion exchanger is sorbed into the graded density layer.

These and other objects, advantages and features are further accomplished by a magnetic composite material for controlling magnetic chemical species transport according to magnetic susceptibility comprising: an ion exchanger; a polymer coated magnetic microbead material; and a graded density layer, wherein the ion exchanger and the polymer coated magnetic microbead material are sorbed into the graded density layer.

These and other objects, advantages and features are further accomplished by a composite material for controlling chemical species viscous transport comprising: an ion exchanger; a graded viscosity layer, wherein the ion exchanger is sorbed into the graded viscosity layer.

These and other objects, advantages and features are further accomplished by a magnetic composite material for controlling magnetic chemical species transport and distribution comprising: an ion exchanger; a polymer coated magnetic microbead material; and a graded density layer, wherein the ion exchanger and the polymer coated magnetic microbead material are sorbed into the graded density layer forming a gradient in the density of the polymer coated magnetic microbead material substantially perpendicular to a density gradient in the graded density layer.

These and other objects, advantages and features are further accomplished by a magnetic composite material for controlling magnetic chemical species transport and distribution comprising: an ion exchanger; a polymer coated magnetic microbead material; and a graded density layer, wherein the ion exchanger and the polymer coated magnetic microbead material are sorbed into the graded density layer forming a gradient in the density of the polymer coated magnetic microbead material substantially parallel to a density gradient in the graded density layer.

These and other objects, advantages and features are also accomplished by an ion exchange composite with graded transport and chemical properties controlling chemical species transport comprising: an ion exchanger; and a staircase-like graded density layer having a first side and a second side, wherein the ion exchanger is one of sorbed into the graded density layer and cocast on the graded density layer and the staircase-like graded density layer and the ion exchanger are contained within the first side and the second side, wherein the first side is in closer proximity to the source of the chemical species and the second side is more distal to the source of the chemical species, and wherein the staircase-like graded density layer has lower density toward the first side and higher density toward the second side, substantially increasing in density in a direction from the first side toward the second side.

These and other objects, advantages and features are also accomplished by an ion exchange composite with graded transport and chemical properties controlling chemical species transport comprising: an ion exchanger; and a staircase-like graded density layer having a first side and a second side, wherein the ion exchanger is one of sorbed into the graded density layer and cocast on the graded density layer, and the ion exchanger and the stair case-like graded density layer are contained within the first side and the second side, wherein the first side is in closer proximity to the source of the chemical species and the second side is more distal to the source of the chemical species, and wherein the staircase-like graded density layer has higher density toward the first side and lower density toward the second side, substantially decreasing in density in a direction from the first side toward the second side.

These and other objects, advantages and features are accomplished also by a dual sensor for distinguishing between a paramagnetic species and a diamagnetic species comprising: a magnetically modified membrane sensor; and an unmodified membrane sensor, wherein the magnetically modified membrane sensor preferentially enhances the concentration of and allows the detection of the paramagnetic species over the diamagnetic species and the unmodified membrane sensor enhances the concentration of and allows the detection of the diamagnetic species and the paramagnetic species, enabling the measurement of the concentration of at least the paramagnetic species.

These and other objects, advantages and features are further accomplished by a dual sensor for distinguishing between a paramagnetic species and a nonmagnetic species comprising: a magnetically modified membrane sensor; an unmodified membrane sensor, wherein the magnetically modified membrane sensor preferentially enhances the concentration of and allows the detection of the paramagnetic species over the nonmagnetic species and the unmodified membrane sensor enhances the concentration of and allows the detection of the nonmagnetic species and the paramagnetic species, enabling the measurement of the concentration of at least the paramagnetic species.

These and other objects, advantages and features are further accomplished by a dual sensor for distinguishing between a first diamagnetic species and a second diamagnetic species comprising: a magnetically modified membrane sensor; and a differently magnetically modified membrane sensor; wherein the magnetically modified membrane sensor preferentially enhances the concentration of and allows the detection of the first diamagnetic species over the second diamagnetic species and the differently magnetically modified membrane sensor enhances the concentration of and allows the detection of the second paramagnetic species and the diamagnetic species, enabling the measurement of the concentration of at least the first diamagnetic species.

These and other objects, advantages and features are further accomplished by a dual sensor for distinguishing between a first paramagnetic species and a second paramagnetic species comprising: a magnetically modified membrane sensor; and a differently magnetically modified membrane sensor, wherein the magnetically modified membrane sensor preferentially enhances the concentration of and allows the detection of the first paramagnetic species over the second paramagnetic species and the differently magnetically modified membrane sensor enhances the concentration of and allows the detection of the second paramagnetic species and the first paramagnetic species, enabling the measurement of the concentration of at least the first paramagnetic species.

These and other objects, advantages and features are further accomplished by a dual sensor for distinguishing between a diamagnetic species and a nonmagnetic species comprising: a magnetically modified membrane sensor; and an unmodified membrane sensor, wherein the magnetically modified membrane sensor preferentially enhances the concentration of and allows the detection of the diamagnetic species over the nonmagnetic species and the unmodified membrane sensor enhances the concentration of and allows the detection of the nonmagnetic species and the diamagnetic species, enabling the measurement of the concentration of at least the diamagnetic species.

These and other objects, advantages and features are further accomplished by a flux switch to regulate the flow of a redox species comprising: an electrode; a coating on the electrode, wherein the coating is formed from a composite comprising: a magnetic microbead material with aligned surface magnetic field; an ion exchange polymer; and an electro-active polymer in which a first redox form is paramagnetic and a second redox form is diamagnetic, wherein the flux switch is actuated by electrolyzing the electro-active polymer from the first redox form ordered in the magnetic field established by the coating to the second redox form disordered in the magnetic field.

These and other objects, advantages and features are also accomplished by a flux switch to regulate the flow of a chemical species comprising: an electrode; and a coating on the electrode, wherein the coating is formed from a composite comprising: a non-permanent magnetic microbead material; an ion exchange polymer; and a polymer with magnetic material contained therein in which a first form is paramagnetic and a second form is diamagnetic, wherein the flux switch is actuated by reversibly converting from the paramagnetic form to the diamagnetic form when an externally applied magnetic field is turned on or off.

These and other objects, advantages and features are further accomplished by a magnetic composite comprising particles containing platinum, wherein the platinum serves as a catalyst and/or an electron conductor.

These and other objects, advantages and features are further accomplished by a magnetic composite material or composition for preventing or impeding electrode passivation, comprising: an ion exchange polymer; magnetic microbeads; and carbon particles in association with a catalyst, wherein the magnetic composite material is disposed on the surface of the electrode and prevents passivation of the electrode surface.

These and other objects, advantages and features are further accomplished by a magnetic composite material disposed on the surface of an electrode for preventing electrode passivation and enabling direct reformation of a fuel at the surface of a fuel cell electrode, comprising: an ion exchange polymer; magnetic microbeads; and/or carbon particles in association with a catalyst, wherein the magnetic composite material prevents passivation of the electrode surface and enables direct reformation of the fuel at the electrode surface.

These and other objects, advantages and features are also accomplished by the provision of a method of making an electrode with a surface coated with a magnetic composite, comprising the steps of: forming a casting mixture comprising an ion exchange polymer, magnetic microbeads, and/or carbon particles in association with a catalyst, and at least one solvent; casting the casting mixture on the surface of the electrode; and evaporating the solvent, to yield an electrode having a surface coated with the magnetic composite, wherein the magnetic composite prevents passivation of the electrode surface.

These and other objects, advantages and features are also accomplished by the provision of a method of making an electrode with a surface coated with a magnetic composite, comprising the steps of: forming a casting mixture comprising an ion exchange polymer, magnetic microbeads, carbon particles in association with a catalyst, and at least one solvent; casting the casting mixture on the surface of the electrode; before the solvent evaporates, arranging the electrode in an external magnetic field to orient the magnetic particles and form an ordered structure on the surface of the electrode; and evaporating the solvent, to yield an electrode having a surface coated with the magnetic composite, wherein the magnetic composite prevents passivation of the electrode surface.

These and other objects, advantages and features are also accomplished by the provision of a method for direct reformation of a liquid or gaseous fuel at the surface of a magnetically modified electrode of a fuel cell, comprising the step of: delivering the fuel directly to the surface of the electrode, the surface of the electrode having a magnetic composite coating disposed thereon which prevents passivation of the surface of the electrode and enables direct reformation of the fuel at the surface of the magnetically modified electrode.

These and other objects, advantages and features are also accomplished by the provision of a fuel cell, comprising: at least one electrode having a magnetic composite disposed on the surface of the at least one electrode; and delivering means for delivering a fluid (liquid or gaseous) fuel to the at least one surface of the electrode, wherein the fuel is oxidized (reformed) directly at the at least one anode, and the magnetic composite prevents passivation of the at least one electrode.

These and other objects, advantages and features are also accomplished by the provision of a fuel cell, comprising: an anode having a magnetic composite disposed on the surface of the anode; and delivering means for delivering fuel to the surface of the anode, wherein the fuel is reformed directly at the anode, and the magnetic composite prevents passivation of the anode surface.

The above and other objects, advantages and features of the invention will become more apparent from the following description thereof taken in conjunction with the accompanying drawings.

BRIEF DESCRIPTION OF THE DRAWINGS

FIG. 3 shows the influence of electrode orientation and solvent motion on magnetohydrodynamic fluid motion for a third geometry.

FIGS. 5A and 5B show the surface diffusion model assuming no limitations to the transport rate in the radial direction.

FIG. 14C shows a plot of the magnetic moments of d-shell transition metals as a function of the number of d-shell electrons.

FIGS. 16E1–16E3 show fuel cells 1220 in arrangements.

DETAILED DESCRIPTION OF PREFERRED EMBODIMENTS

Interfacial Gradients in General

Figure 1:
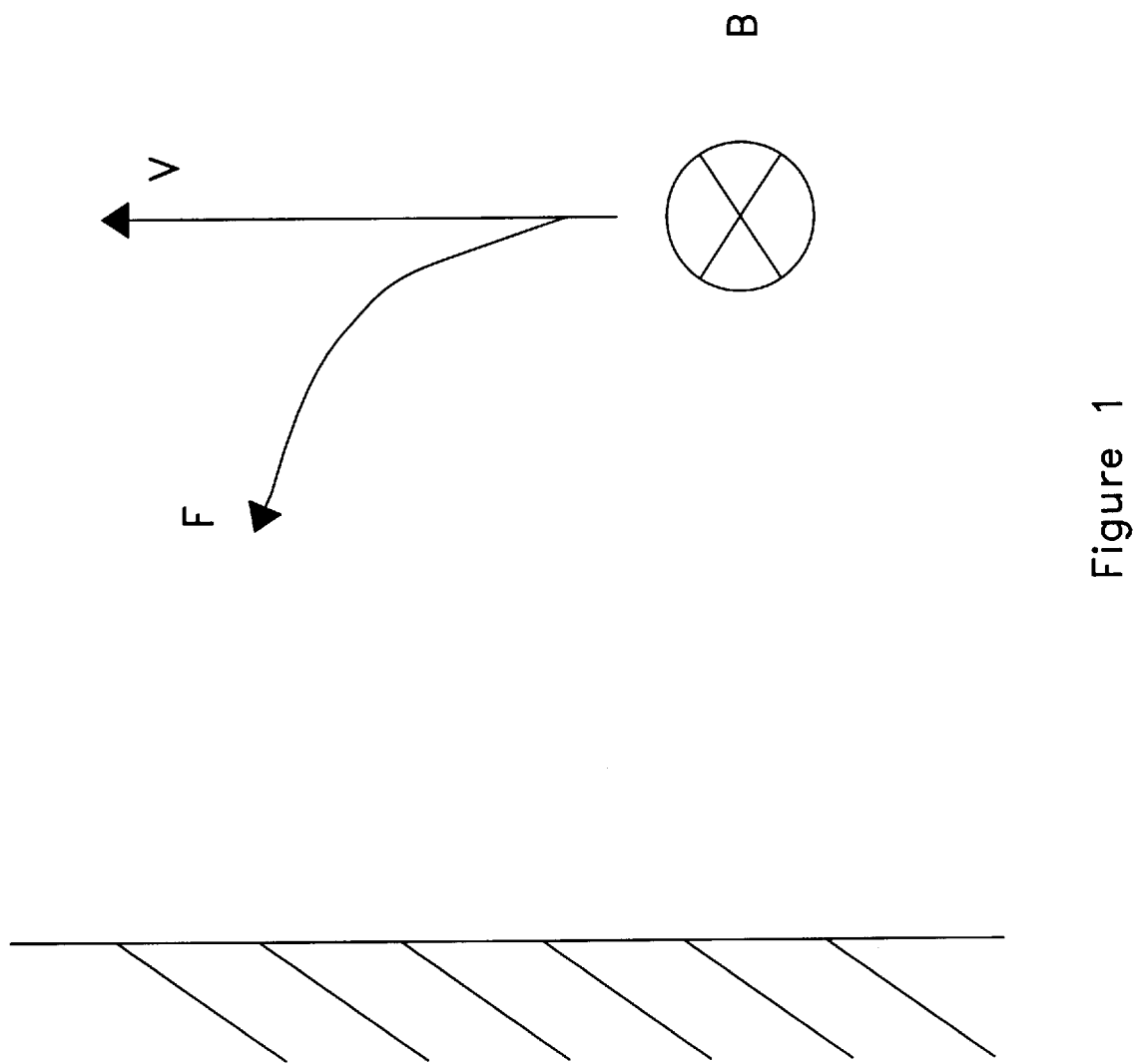
FIG. 1 shows the influence of electrode orientation and solvent motion on magnetohydrodynamic fluid motion for one geometry.

It has been found that interfacial gradients of concentration, charge, dielectric constant, and potential tend to establish strong, interfacial forces which decay over a microstructural distance (1 to 100 nm). (For example, for an applied potential of 10 mV to 100 mV past the potential of zero charge at an electrode in 0.1 M aqueous electrolyte, the interfacial potential gradient (|electric field|) is $10^5$ V/cm to $10^6$ V/cm, but it decays over a distance of about 1 nm.) In a homogeneous matrix, with few interfaces, interfacial gradients have a negligible effect on bulk material properties. However, in a microstructured matrix where the ratio of surface area to volume is high, interfacial gradients can have a large effect on, or even dictate the properties of a composite. Models appropriate to the description of bulk materials have been found to be unsatisfactory when applied to these composites. Moreover, such composites provide an opportunity to design matrices to perform functions and exhibit properties not found in homogeneous materials, as will be discussed.

The effects of gradients, associated with the interfaces between the ion exchanger and its support matrix, to enhance the transport of ions and molecules have been studied in ion exchange polymer composites. The composites were formed by sorbing ion exchange polymers into high surface area substrates with well-established geometries. The flux of solutes through the composites was determined voltammetrically. When the solute flux through the ion exchange portion of the composites and the flux through simple films of the ion exchanger were compared, flux enhancements were observed for the composites. These enhancements were often greater than an order of magnitude. Consistently, the ratio of surface area of the substrate to the volume of sorbed ion exchanger (SA/Vol) has been the critical factor in quantifying the flux enhancements. The flux enhancement characteristics were found to be dominated by the interface between the ion exchanger and the support. Several interfacial gradients have so far been identified as important: concentration gradients, leading to surface diffusion; electric potential gradients, leading to migration; and magnetic field gradients, leading to flux enhancements and electric potential shifts at electrodes.

Forming Composites

Composites were made by intimately mixing two or more components to form a heterogeneous matrix as will be discussed in more detail below. While composites retain some characteristics of their components, properties distinct from those of the starting materials have been demonstrated that make composites of special interest.

Results of Prior Studies

The impact of microstructure on transport and selectivity in ion exchange polymers and their composites has been found to be significant. Novel characteristics arose not from the individual components of the composites, but from gradients established at the interfaces between the components. Ion exchange polymers with inherent microstructure, such as Nafion, exhibit superior transport, selectivity, and stability characteristics compared to polymers with no inherent microstructure, such as poly(styrene sulfonate). When ion exchange polymers were supported on inert substrates with microstructural (5 to 100 nm) features similar in length scale to the microstructural features of the ion exchanger (e.g., 5 nm micelles in Nafion), the structure of the ion exchanger was disrupted in an ordered manner. The relationship between the flux characteristics of the composites and the microstructure imposed by the substrates has yielded information about how microstructure contributes to the properties of ion exchangers. This relationship allows the specification of design paradigms for tailoring composites with specific transport and selectivity characteristics.

Surface Diffusion

The first composites studied in this regard were formed by sorbing Nafion into the collinear cylindrical pores of neutron track etched polycarbonate membranes. The ion exchange polymer, Nafion is a perfluorinated, sulfonic acid polymer with the following structure:

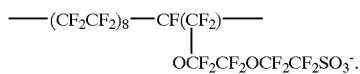

The $SO_3^-$ groups adsorb on the inert substrates to form a loosely packed monolayer of perfluorinated alkyl chains, $OCF_2CF_2OCF_2CF_2SO_3^-$, shown above in boldface. This creates a unique interfacial zone approximately 1 to 2 nm thick along the edge formed between the ion exchange polymer and the inert substrate. In systems with high ratio of surface area to volume, a large fraction of the molecules and ions which passed through these composites actually moved through this interfacial zone. That is, it was found that the molecules and ions have higher flux in this thin interfacial zone, where the interfacial fields were strongest.

Figure 4A:
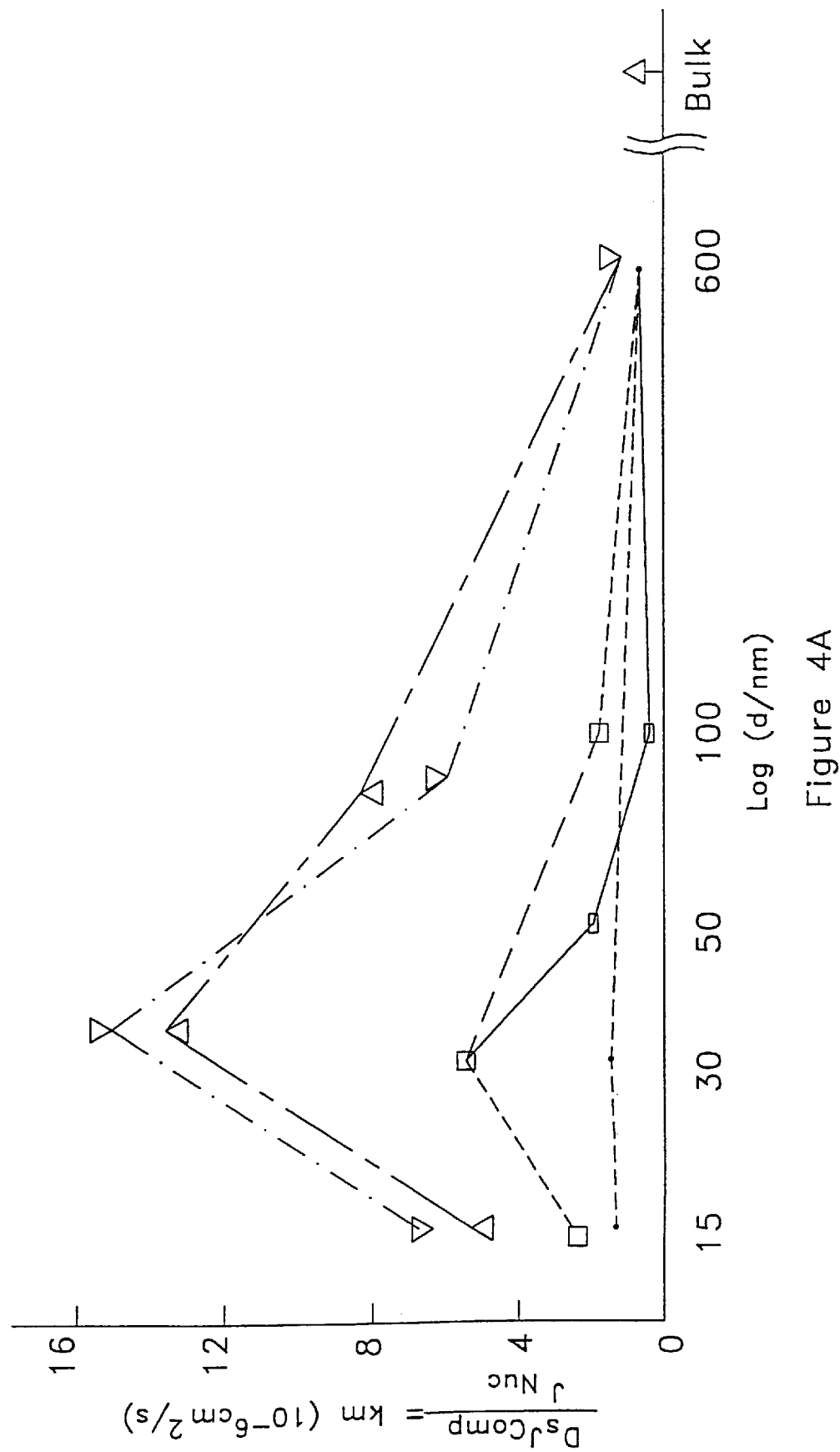
FIGS. 4A and 4B show plots of km values for neutron-track etched polycarbonate/Nafion composites versus functions of pore diameter, d.

In a given membrane, all pores had approximately the same diameter, d, ranging between 15 and 600 nm. The flux of electro-active species through the composites was determined by rotating disk voltammetry. In rotating disk voltammetry, the product $\kappa m$ (cm$^2$/s) parameterizes the flux of a redox species through the Nafion portion of the composites, where $\kappa$ is the partition coefficient of the species into the Nafion and $\kappa m$ (cm$^2$/s) is its mass transport coefficient. Simple Nafion films cast directly onto the electrode were also studied. The resulting plots of $\kappa m$ as a function of log (d) are shown in FIG. 4A. As indicated in FIG. 4A, as the pore diameter decreased towards 30 nm, the flux through the Nafion portion increased as much as 3600% over the simple films. These studies showed that the interface between Nafion and a support matrix was pivotal in determining the flux characteristics of the composites.

Figure 4B:
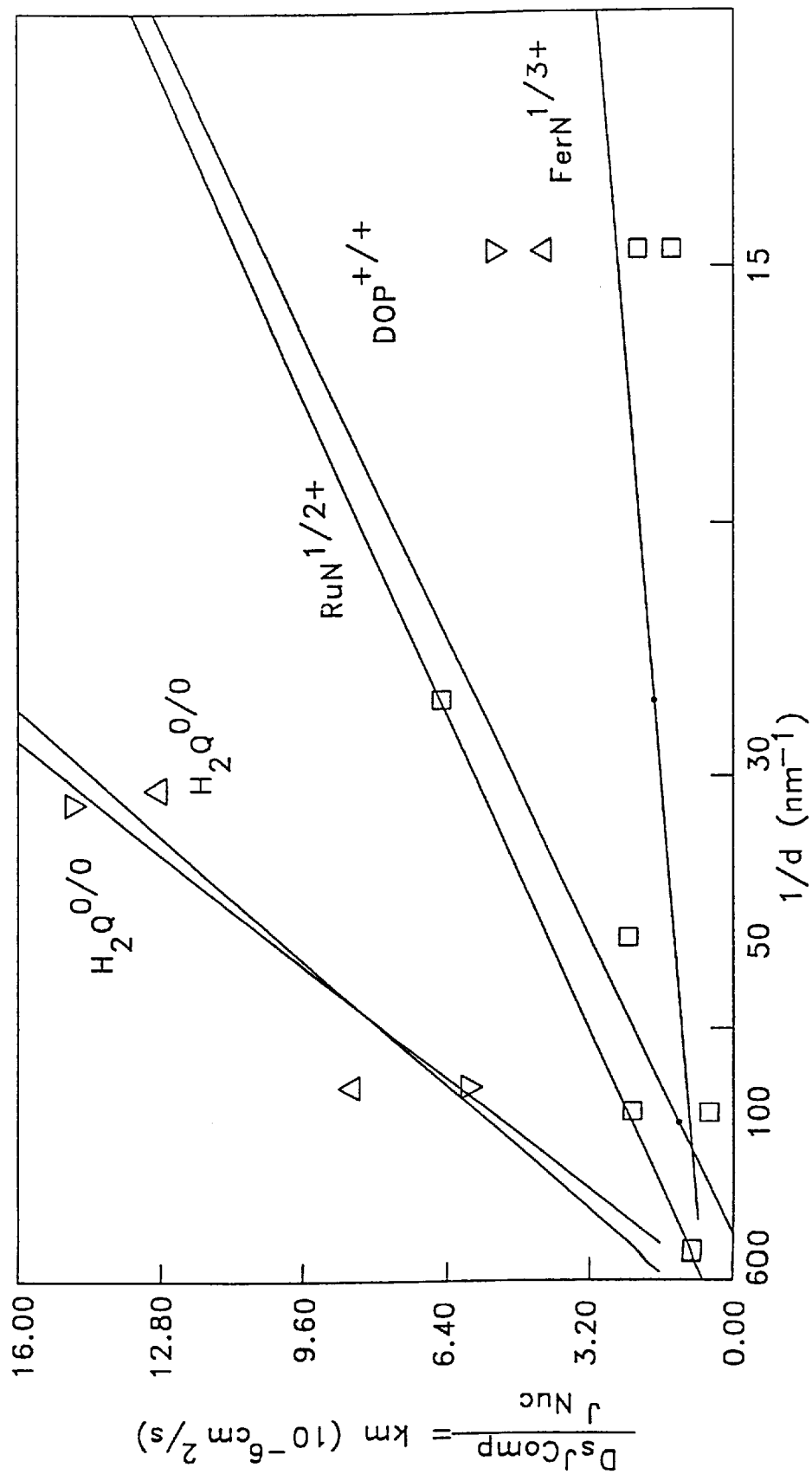

The flux enhancement model proposed here depends on the interface formed between the Nafion and the polycarbonate providing a facile transport pathway to the electrode for the redox species. Bulk Nafion located in the center of the pore had a smaller transport coefficient (m) than the support matrix wall, but provided a volume to extract redox species from the center of the pore to feed the wall transport zone. The critical parameter for flux enhancement was found to be (for a cylindrical cross section path) the ratio of the surface area of the wall providing facile transport ($\pi d\lambda$), where $\lambda$ is the layer thickness, to the volume of Nafion feeding the interface ($\pi d^2\lambda/4$), i.e., 4/d. Plots of $\kappa m$ versus 1/d are shown in FIG. 4B. Note that the plots are linear in FIG. 4B for d$\geq$30 nm, and with the exception of dopamine, the intercepts as d$\rightarrow\infty$ (1/d$\rightarrow$0) correspond to $\kappa m$ for bulk Nafion.

Predictive models of how interfaces and their associated concentration, field, etc. gradients dictate interface properties and function are provided below and further aid in the design of new composites tailored for specific applications. A simple surface diffusion model assuming no limitations to the transport rate in the radial direction is outlined. FIGS. 5A and 5B show the simple model where transport in the radial direction is not rate limiting. In the model, $J_{comp}$ is the total flux through the composites, $J_{Nuc}$ is the flux through an empty pore, and $J_{bulk}$ and $J_{wall}$ are the fluxes in the bulk (center) of the pore and along the surface of the pore, respectively. To analyze the flux, as in FIG. 4B, $J_{bulk}$ and $J_{wall}$ must be normalized to the cross sectional area of the pore used to determine $\kappa m$, the product of the effective extraction and transport coefficients. From the final equation, the plot in FIG. 4B can be interpreted to have the slope and intercept shown in FIGS. 5A and 5B. If $\delta$, the thickness of the interfacial zone, is taken as 1.5 nm, the values cited for $\kappa_{wall}m_{wall}$ and $\kappa_{bulk}m_{bulk}$ are found. The diffusion coefficients of each species in solution are also listed for comparison. In general, $\kappa_{wall}m_{wall}\cong(10$ to $10^2)\times\kappa_{bulk}m_{bulk}\cong(1$ to $10)\times D_{soln}$. In other words, for an interfacial zone thickness, $\delta$, of 1.5 nm, $\kappa_{wall}m_{wall}$ is up to one order of magnitude higher than $D_{soln}$, and one to two orders of magnitude higher than $\kappa_{bulk}m_{bulk}$.

The interfacial transport zone occurs because of the irreversible exchange of Nafion sulfonic acid groups to polycarbonate surface sites to form a monolayer of inactive sulfonic acid groups. The side chains linking the sulfonic acid sites to the Nafion backbone form a loosely packed monolayer along the pore wall which facilitates the flux through the transport zone compared to transport through the tortuous environment of bulk Nafion. Given the length of the chains, a $\delta$ value of about 1.5 nm is consistent with $\kappa_{wall}m_{wall}$ (and $\kappa m/D_{soln}$) decreasing as transport is more hindered with increasing diameter of the redox species; i.e., $\kappa_{wall}m_{wall}$ decreases as $H_2Q$ (0.6 nm)>$Ru(NH_3)_6^{3+}$ (0.8 nm)>$DOP^+$ (0.8 nm)>$FerN^+$ (1 nm). Discrimination between these species has also been observed based on molecular shape in the neutron track-etched composites. For example, disk shaped molecules exhibit higher flux than comparably sized spherical molecules.

Radial Migration

Figures 6A, 6B:
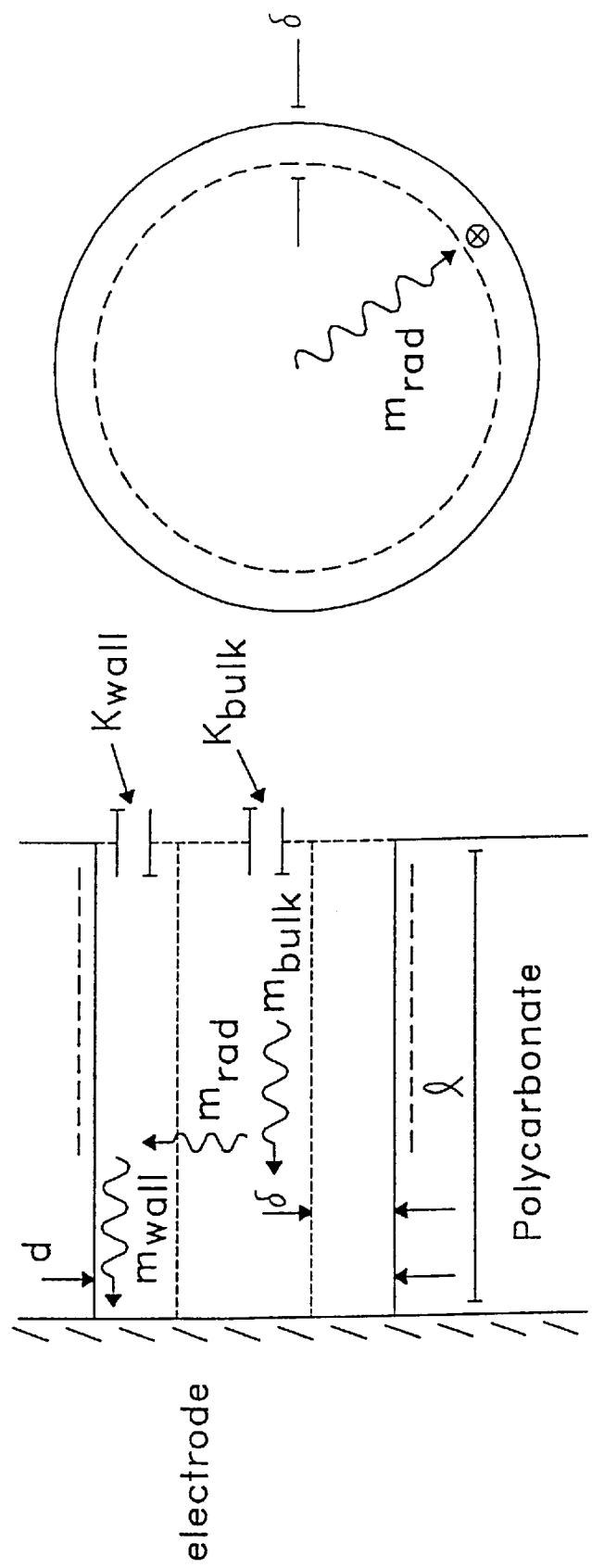
FIGS. 6A and 6B show the surface diffusion model including radial migration.

The pore walls have a surface charge density of -0.2 $\mu$C/cm$^2$. For a 30 nm pore diameter composite, the corresponding charge is 0.5% of the total charge in the pore, and will have negligible effect on the number of cations extracted from the solution to move into the pore. However, the surface charge establishes a potential gradient (electric field) from the pore to the wall which tends to move positively charged ions radially outward from the center of the pore to the wall. An issue is whether this radial, interfacial potential gradient can be coupled to the concentration gradient along the wall to enhance solute flux to the electrode, as illustrated in FIGS. 6A and 6B.

The model was tested by varying the concentration of the electrolyte, nitric acid, from 0.50 to 0.01 M, for fixed dopamine concentration (2 mM). Flux was determined by rotating disk voltammetry at 400 rpm for the bare electrode and at infinite rotation rate for the modified electrodes (See Table 1). The electrolyte concentration did not dramatically affect the flux for the bare electrode, the 30 nm membrane containing no Nafion, and the Nafion film.

TABLE 1

Flux (nmol/cm$^2$s$^{-1}$) for
Dopamine Oxidation at Various [H$^+$]

| [H$^+$]$_{soln}$ | Flux$_{unmodified}^{400\ rpm}$ | Flux$_{30\ nm}$ | Flux$_{film}^{Nafion}$ | Flux$_{30\ nm}^{Nafion}$ |
|---|---|---|---|---|
| 0.50 M | 38.6 | 54.8 | 4.2 | 2.4 |
| 0.10 M | 36.7 | 57.5 | 4.3 | 10.5 |
| 0.01 M | 44.6 | 73.1 | — | 39.0 |

However, for the 30 nm Nafion composite a fifty-fold decrease in electrolyte concentration led to >1600% increase in flux. Coupling of radial flux, driven by the interfacial potential gradient, to surface diffusion generates the enhancement. No enhancements were observed for a similar study of neutral hydroquinone. It should be noted that only charged species move by migration; dopamine is charged, while hydroquinone is not.

Since the selectivity coefficient for dopamine over protons is about 500 in Nafion, decreasing the electrolyte concentration fifty-fold only decreases the dopamine concentration by 10%. The dramatic effect produced by varying the proton concentration means that the protons, not the dopamine, compensate the wall charge to establish the interfacial potential gradient and enhance the radial flux of dopamine. This is possible because the dopamine, a cationic amine, is heavily ion paired to the sulfonic acid sites. With a dielectric constant of 20, substantial ion pairing can be anticipated in Nafion. Ion pairing may explain why the flux of cationic amines is lower than neutral hydroquinone as can be seen with reference to FIGS. 4A and 4B which show κm values for neutron-track etched polycarbonate/Nafion composites. FIG. 4A shows κm versus log(d), where d is the pore diameter. κm increases above the values for bulk Nafion as d approaches 30 nm. The concentrations are 2 mM redox species and 0.1 M electrolyte for RuN+—Ruthenium (II) hexamine (□), H$_2$Q—Hydroquinone (∆,∇), DOP+—Dopamine (○), and FerN+—Trimethylaminomethyl ferrocene (◇). The electrolyte is H$_2$SO$_4$ in all cases except for DOP+ and H$_2$Q(∇). Lines represent no model and are only intended to indicate the trend in the data. FIG. 4B shows κm versus d$^{-1}$, where 4d$^{-1}$ is the surface area of the pore/volume of Nafion in the pore. As illustrated in FIGS. 6A and 6B, the slopes in FIG. 4B are indicative of the surface flux, and the intercept corresponds to the flux in bulk Nafion. Note, all the redox species except hydroquinone are charged amines, and all have lower flux than hydroquinone.

Vapor Phase Electrochemistry/Microstructure in Two-Dimensions

One way to alter microstructure is to reduce the conduction matrix from three to two-dimensions. A two-dimensional system is made by sulfonating the nonionic, polymeric insulator between the electrodes of a microelectrode assembly. Conduction across the surface cannot be studied in either an electrolyte solution or a pure solvent as the liquid provides a conductive path between the electrodes. However, by supporting the microelectrode assembly in an evacuated flask, and injecting hydrogen or hydrogen chloride and a small amount (µL's) of water, conduction can be studied by electrolyzing the gas. In these lower dimensional systems, the role of the ion exchange site and its concentration, as well as the role of water in ionic conduction can be studied. Preliminary studies were performed to study conduction through solvent layers adsorbed from the vapor phase across the nonionic surface of a microelectrode assembly. Electrolysis of gas phase solvents required the solvent to adsorb at greater than monolayer coverage to bridge the gap between the electrodes. Solvents with high autoprotolysis and acidity constants sustain higher currents than solvents less able to generate ions. These studies provided information about gas phase electrochemical detection and systems as well as atmospheric corrosion.

Composites Formed with Polymerized Microspheres

Figure 7A:
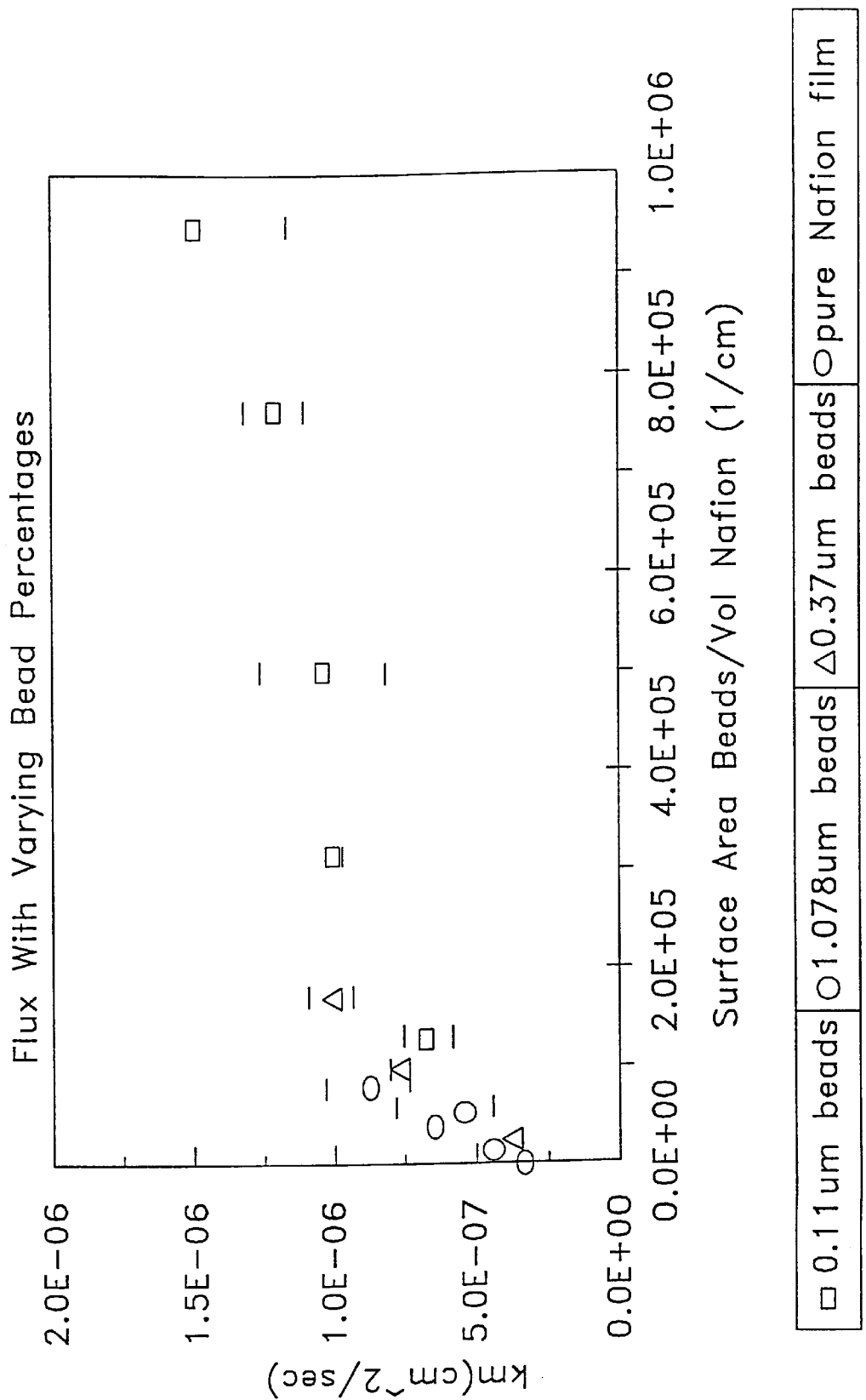
FIGS. 7A and 7B show κm values of hydroquinone through polystyrene/Nafion composites for ratios of surface area of the microbeads to volume of Nafion.
Figure 7B:
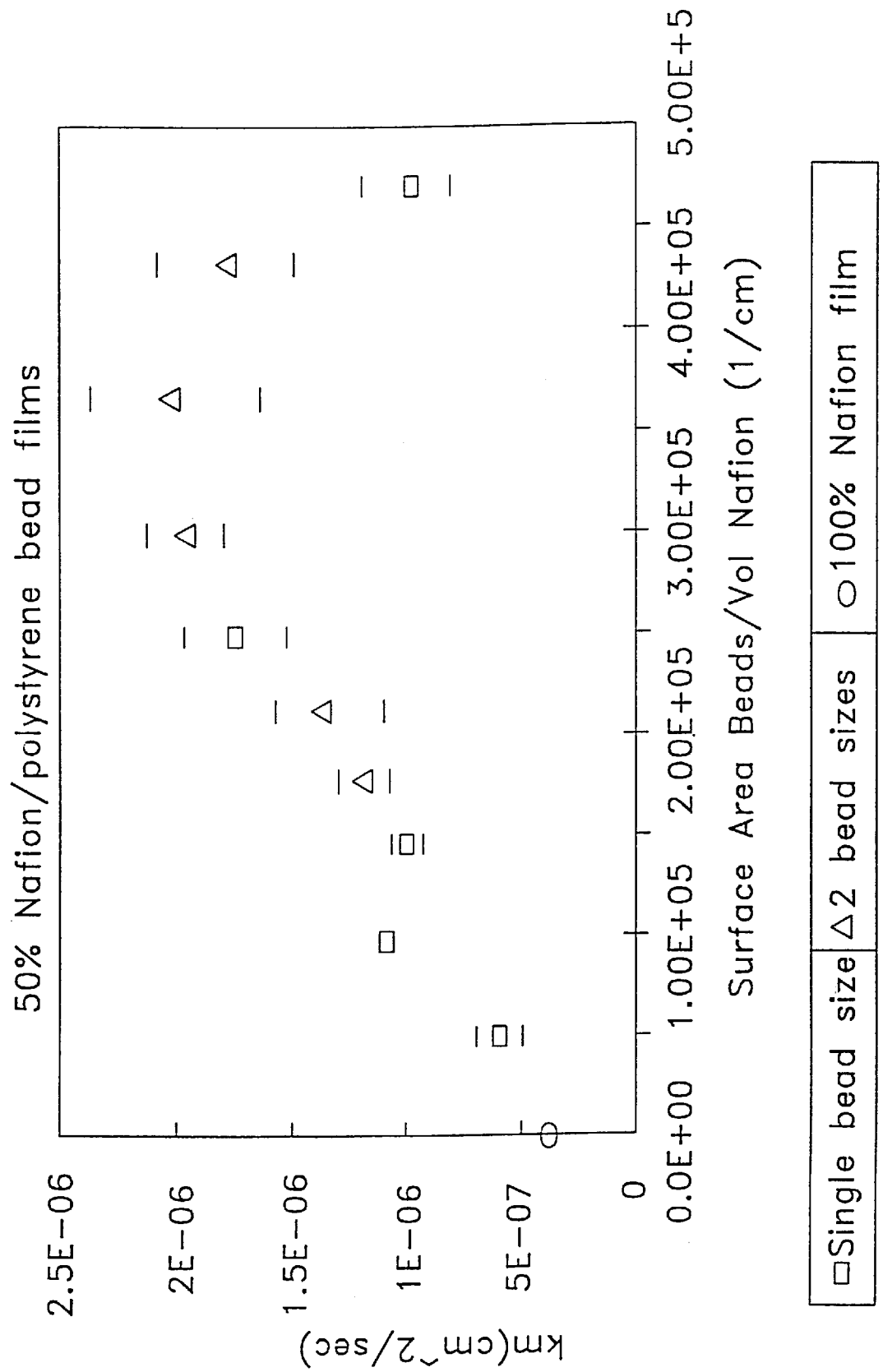

To test the generality of flux enhancement by interfacial forces, composites of Nafion and polymerized polystyrene microbeads or microspheres were formed; diameters of 0.11 to 1.5 µm were used. FIGS. 7A and 7B show κm of hydroquinone through polystyrene microbead/Nafion composites versus ratios of surface area of the microbeads to volume of Nafion. In particular, values of Km found for various ratios of bead surface area for transport to volume of Nafion for extraction (SA/Vol) are shown for three different bead diameters. As for the neutron track etched composites, linear plots were found, at least for the larger sizes, with intercepts comparable to bulk Nafion. Of these sizes, 0.37 µm beads exhibited the largest flux enhancement (600%). (Note: the terms "beads" and "microbeads" are used synonymously herein). FIG. 7A shows results for composites formed with single size beads, where the ratio of surface area to volume was varied by varying the volume fraction of beads in the composites. Positive slopes are shown consistent with flux enhancement by surface diffusion along the surface of the beads. The intercepts are consistent with transport through bulk Nafion.

The fraction of microbeads or microspheres in the composite can be varied and different sizes mixed to allow a continuous range of SA/Vol. In particular, FIG. 7B shows results for composites for a range of SA/Vol with 50% total fraction of Nafion by volume in the film. κm increases as SA/Vol increases to about 3.5×10$^5$ cm$^{-1}$, analogous to 1.3×10$^6$ cm$^{-1}$ found for the neutron track etched composites (FIG. 4A). Scanning electron micrographs of the 50% Nafion, single bead size composites showed packing of the 0.11 µm beads was different and may account for the lower κm values found for d$^{-1}$>3.5×10$^5$ cm$^{-1}$, where 0.11 µm beads were used. FIG. 7B shows results for composites formed with 50% Nafion by volume. The ratio of surface area to volume was varied by making composites with beads of the same size and with beads of two different sizes. Flux increases as the ratio of surface area to volume increases to 3.5×10$^5$ cm$^{-1}$; at the highest ratio, the composite contains 0.11 µm beads.

Figure 8A:
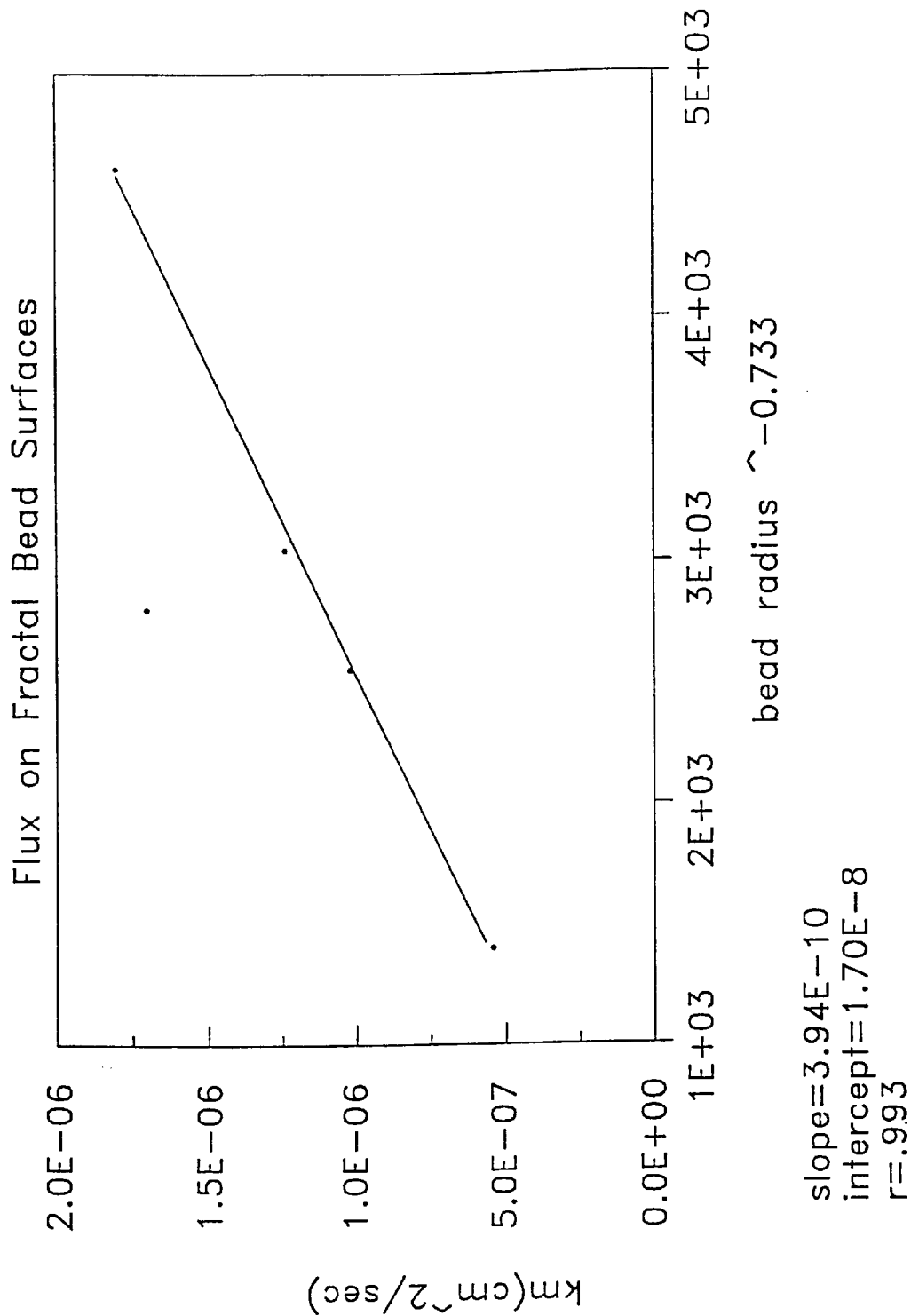
FIG. 8A shows an analysis of fractal diffusion along the surface of the microbeads in polystyrene Microbead/Nafion composites.

From the scanning electron micrographs, composites of beads larger than 0.11 µm exhibit the self-similarity typical of fractal materials. When ln(κm) for these beads is plotted versus log(d), where d is the bead diameter, a linear plot with a slope of −0.733 was obtained; κm versus d$^{-0.733}$ is shown in FIG. 8A. For diffusion on a fractal of finitely ramified structure (e.g., the Sierpinski gasket), this is the power dependence expected for diffusion in a two-dimensional system. Thus, microbead composites exhibit transport typical of fractal diffusion along the microbead surface. This system confirms that surface diffusion provides a mechanism of flux enhancement. It also introduces the concept of fractal transport processes and the importance of surface dimensionality in ion exchange composites.

Poly(4-Vinylpyridine) Composites Formed on Neutron Track Etched Membranes

To investigate surface diffusion in other ion exchangers, composites were formed of protonated poly(4- vinylpyridine) (PVP) and neutron track etched membranes. Flux enhancements in these composites also increased as the ratio of surface area of the pores to volume of PVP decreased. This result is consistent with the results found for Nafion composites, where facile surface transport enhanced flux.

Thermal Processing of Nafion

While commercial Nafion is heat (or hot) cast, a process that yields inverted micelles, the vast majority of academic studies of Nafion have been performed on cold cast Nafion which produces normal micelles. A study of the mechanical properties of Nafion hot cast from organic solvents has been reported. Attempts have been made to hot cast Nafion films with microwave heating. In the highly ionic casting solution, the glass transition temperature of Nafion (105° C.) should be reached as the water evaporates. Plots of flux as a function of the time microwaved have a break at approximately 15 minutes. The flux changed by no more than a factor of three with a decrease in the flux of hydroquinone, and from preliminary studies, an increase in the flux of $Ru(NH_3)_6^{3+}$. This may indicate different transport mechanisms for the two species in the film. Microwaved, cold cast and commercial hot cast films have been compared.

Magnetic, Demagnetized, and Nonmagnetic Composites

Polystyrene-coated, 1 to 2 $\mu$m Fe/Fe oxide (nonpermanent magnetic material) or organo-Fe (superparamagnetic or ferrofluid or permanent magnetic) microbeads are available (Bangs Labs, Polyscience, or Delco-Remy) as a 1% suspension in water, and Nafion (C.G. Processing) is available as a 5% suspension in alcohol/water. Other inert or active polymer coatings besides polystyrene, as well as non-polymeric materials may also be used as encapsulating materials for the microbeads or magnetic particles. Examples of such encapsulating materials may include, for example: various polymers, silanes, thiols, silica, glass, etc. On the other hand, in some situations a polymeric or other coating material on the microbeads or magnetic particles may be completely eliminated, as described below. This discussion holds for superparamagnetic or ferrofluid or permanent magnetic or nonpermanent magnetic or ferromagnetic or ferrimagnetic material microbeads in general. This discussion also holds for other magnets and other magnetic materials which include, but are not limited to, superconductors, and magnetic materials based on rare earth metals such as cobalt, copper, iron, samarium, cerium, aluminum and nickel, and other assorted metal oxides, and magnetic materials based on neodymium, e.g., magnequench, which contains iron and boron in addition to neodymium.

Under certain circumstances, some microbeads or magnetic particles for use in carrying out the invention may require coating with, e.g. a polymeric material. For example, in aqueous environments a coating of an inert material may serve to inhibit or prevent oxidation of the microbead material. In other circumstances the application of a coating to the microbead material is not required (see, for example, the section below on Iron Oxide Microbead Composites).

Magnetic composites incorporating organo-Fe material microbeads are formed by casting appropriate volumes of each suspension onto an electrode centered inside a cylindrical magnet (5 cm inside diameter, 6.4 cm outside diameter, 3.2 cm height; 8 lb pull). Once the solvents evaporate and the magnet is removed, the oriented beads are trapped in the Nafion, stacked in pillars normal to the electrode surface. To minimize interbead repulsion, pillars form by stacking the north end of one bead to the south end of another; to minimize interpillar repulsion, the pillars arrange in a roughly hexagonal array. These aligned composites were formed with microbead fractions of $\leq 15\%$. Aligned composites were compared to other composites: unaligned composites—formed as above but with Fe/Fe oxide microbeads and without the magnet; nonmagnetic composites—formed with 1.5 $\mu$m nonmagnetic polystyrene beads; simple Nafion films; and demagnetized composites—aligned composites that were demagnetized. Demagnetized composites had the pillared structure, but it is not clear if they were fully demagnetized. Nonmagnetic composites had a coral-like structure (i.e., they do not form pillars). Note, composites may be formed wherein at least one component is reversibly changeable between a paramagnetic form and a diamagnetic form with, for example, a temperature variation and with or without the presence of an externally applied magnetic field.

Iron Oxide Microbead Composites

Magnetic composites comprising particles of various materials, such as, for example iron oxides, encapsulated or coated with a polymeric or other inert material may be used to modify the interface of electrode surfaces to provide systems or devices with new and improved characteristics. Such systems and devices lend themselves to a broad range of useful and commercially valuable applications including, but not limited to, the separation of transition metal species from other species, and improved fuel cells and batteries.

Composites formulated for the purpose of surface modification of electrodes may also comprise non-coated (naked or uncoated) particles of materials such as iron oxides. The preferred iron oxides, under the invention, are iron(III) oxide ($Fe_2O_3$) and magnetite ($Fe_3O_4$). Electrodes with surface modifications employing composites which comprise non-coated iron(III) oxide or non-coated magnetite provide flux enhancements comparable in magnitude to those produced by coated (encapsulated) magnetic particles. Indeed, from a theoretical standpoint, uncoated (i.e. non-coated) magnetic particles are expected to yield higher flux enhancements than similarly sized coated magnetic particles; the coating on encapsulated particles increases the distance between the source of the magnetic field and the reactant molecules and/or ions, and thus the effect of the decaying magnetic field is diminished.

These results, showing flux enhancements with composites comprising non-coated magnetic particles, suggest that a large variety of magnetic materials may be readily incorporated into composites without the need for coating or other specialized preparatory step(s). In this regard, it should be noted that the use of non-coated particles eliminates much of the cost (perhaps in the region of 50%) of the cost of manufacturing magnetic composites. At the same time, these results indicate that other magnetic materials, with stronger fields than iron-based magnets, may be similarly incorporated into composites to produce even larger effects.

Iron oxides such as aged $Fe_2O_3$ are chemically inert and insoluble in most solvents, suggesting that composites comprising iron oxides exhibit sufficient durability for many commercial applications.

Composites comprising non-coated magnetic particles are formed in a manner similar to that reported herein for the formation of composites comprising encapsulated (coated) magnetic particles. The difference is that non-coated magnetic materials, such as those described below, are used in place of the coated (encapsulated) magnetic microbeads or particles. In the case of particles of iron (III) oxide, material that has "aged" to some extent is preferred over freshly prepared iron (III) oxide. Apparently, the surface of slightly aged iron oxide materials have a surface behavior similar to that observed for polyethylene, a fairly inert material. Newly prepared iron oxide appears to be more susceptible to reaction with solution species than aged material.

Composites were formed with 15% by volume iron(III) oxide ($Fe_2O_3$) (Aldrich Chemical Co.) and Nafion. The composites are formed by casting the Nafion and the magnetic material (here, uncoated iron oxide particles with diameters of a few microns) onto the electrode surface. An external magnetic field, such as that provided by an external cylindrical magnet, may be positioned around the electrode at this stage. When an external magnet is used, the casting mixture dries as a film which includes pillared magnetic structures on the surface of the electrode, as described in more detail elsewhere herein. The external magnet, if any, is removed.

Other percentages of iron(III) oxide and Nafion, as well as other iron oxides (e.g., $Fe_3O_4$) and other magnetic materials may also be used in forming such composites, provided that the magnetic material is chemically inert in the proposed environment in which it is to be used. For example, under the invention, magnetic composites may be formed comprising from 85% to 0.01% by weight of magnetic material, and from 15% to 99.99% of an ion exchange polymer. The magnetic material component in the casting mixture which is used to make-up the composite may be in the form of magnetic particles, beads or microbeads of iron oxides (e.g. $Fe_2O_3$, $Fe_3O_4$), and may be coated or non-coated (encapsulated or non-encapsulated). Depending on the application, the composite may optionally further comprise carbon particles, or other electron conductors, in association with a catalyst. The amount of electron conductor, e.g. carbon particles, in association with a catalyst in the composite, according to the invention, may range from 0% to about 80% by weight (or mass). An example of carbon particles in association with a catalyst according to the invention is carbon particles in association with platinum (i.e. platinized carbon).

Figure 8B:
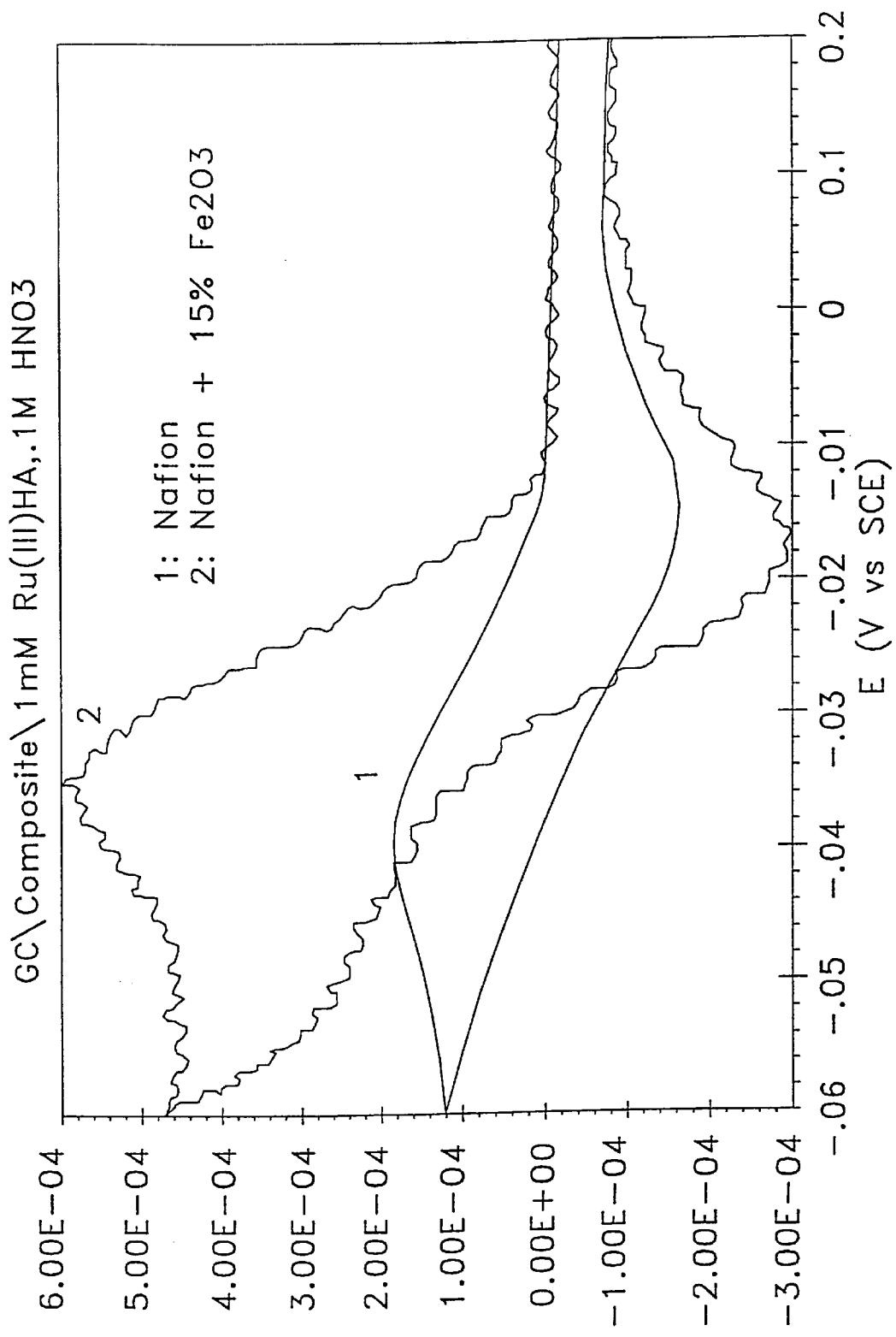
FIG. 8B shows flux measurements by cyclic voltammetry for two electrodes bearing surface modifications of Nafion plus 15% by volume of non-coated particles of iron(III) oxide, or Nafion alone. Voltammogram 1 is for the electrode bearing a simple film of Nafion coated on the surface of the electrode. Voltammogram 2 is for an electrode bearing the composite comprising Nafion and 15% non-coated particles of iron(III) oxide.

An electrode with surface modifications including a composite comprising 15% by volume of non-coated iron(III) oxide, and prepared as described above, was placed in a solution of ruthenium (III) hexamine (a paramagnetic species with one unpaired electron) as redox probe, and the flux was measured by cyclic voltammetry. An electrode bearing a film of Nafion only was used for comparative purposes. The results are presented in FIG. 8B, in which two voltammograms are shown. Voltammogram 1 is for the electrode bearing a simple film of Nafion coated on the surface of the electrode. Voltammogram 2 is for an electrode bearing the composite comprising Nafion and 15% non-coated particles of iron(III) oxide. It can be seen from FIG. 8B that the current at approximately −350 mV is about 3 times as large in voltammogram 2 as compared to voltammogram 1. Also, the peak potential differences are smaller in the case of voltammogram 2, suggesting some impact on the rate of the reaction. Similar narrowing of the peak splitting has been observed for all of the magnetic materials we have tested (both coated and non-coated). Composites comprising magnetic materials of the type described above may prove useful in facilitating or catalyzing a broad range of surface chemical reactions, both electrochemical and otherwise.

Other Composites

Similar effects to composites formed with Nafion have been observed using a different polymer and a solvent other than water. One such system is poly(styrene sulfonate) (PSS) in acetonitrile solvent. The electrolyte is tetraalkylammonium tetrafluoroborate which is different than the inorganic electrolytes that were used in water. Redox probes that have also been used in this system, include $Fe(bpy)_3^{2+}$ and $Fe(bpy)_3^{3+}$. Some additional redox species that have been used as probes with these PSS composites (magnets on electrodes) include $Fe(II)(bpy)_3^{2+}$, $Fe(III)(bpy)_3^{3+}$, $Co(II)(bpy)_3^{2+}$, and $Co(III)(bpy)_3^{3+}$.

Magnetic Composites

Electrochemical Studies of Magnetic Composites

A composite was equilibrated in a solution of 1 mM electro-active species and 0.1 M electrolyte. The mass transport-limited current for the electrolysis of the redox species through the composite ($i_{meas}$) was then determined by steady-state rotating disk voltammetry at several different rotation rates ($\omega$). A plot of $i_{meas}^{-1}$ versus $\omega^{-1}$ yielded a slope characteristic of transport in solution, and an intercept characteristic of transport through the composite as:

$$\frac{nFA}{i_{meas}} = \frac{v^{1/6}}{0.62 c^* D_{soln}^{2/3}} \omega^{-1/2} + \frac{l}{\kappa m \epsilon c^*} \quad (3)$$

In Equation (3), n is the number of electrons, F is the Faraday constant, A is the electrode area, $c^*$ and $D_{soln}$ are the concentration and diffusion coefficient of the redox species in solution, respectively, $v$ is the kinematic viscosity, l is the composite thickness, $\kappa$ is the partition coefficient of the redox species, m is the mass transport rate of the redox species in the composite, and $\epsilon$ is the porosity of the composite. The partition coefficient, $\kappa$, is the ratio of the equilibrium concentration in the ion exchange portion of the composite to the solution concentration, in the absence of electrolysis. Equation (3) is appropriate for rate-limiting transport perpendicular to the electrode. This is ensured by choosing l and $D^{1/3}_{soln}\omega^{1/2}v^{1/6}$ large compared to the microstructural dimensions of the composite, and is verified by the slope. Then, the composite can be treated as homogeneous with an effective $\kappa m$, and microstructural effects can be ascertained with rotating disk studies. Cyclic voltammetry yielded quantitative information for scan rates, v, sufficient to contain the transport length within the composite. For a reversible couple, the peak current, $i_{peak}$, is given by equation (4):

$$i_{peak} = 0.4463(nF)^{1/2}[v/RT]^{1/2}, \quad (4)$$

where R is the gas constant and T is the temperature. When both rotating disk and cyclic voltammetry data are obtainable, $\kappa$ and m are separable because of their different power dependencies in Equations (3) and (4).

The flux of redox species through magnetic composites is enhanced in proportion to the absolute value of the difference in the magnetic susceptibilities of the products and reactants of the electrolysis. From cyclic voltammetry, the $\Delta E_p$ observed for reversible species, whether paramagnetic or diamagnetic, was little changed, but $E_{0.5}$ was shifted, where $E_{0.5}$ is the average of the anodic and cathodic peak potentials, and is a rough measure of the free energy of the electron transfer reaction. For a quasireversible, diamagnetic species which passed through a radical intermediate, dramatic changes in $\Delta E_p$ were found. The shifts and peak splittings were consistent with the stabilization and the concentration of the paramagnetic species. Results are summarized below.

Flux Enhancements for Paramagnetic Species

Values of κm found by rotating disk voltammetry for diamagnetic hydroquinone and $Ru(bpy)_3^{2+}$, and paramagnetic $Ru(NH_3)_6^{3+}$ using Nafion films, nonmagnetic polystyrene microbead composites, and magnetic microbead composites are summarized in Table 2. Both bead composites contained 15% beads of 1 to 2 μm diameter; all modifying layers were 3.6 to 3.8 μm thick.

TABLE 2 km ($10^{-6}$ cm²/s) for Various Magnetic/Nonmagnetic Species and Films

|  | $km_{Nafion\ film}$ | $km_{Nonmagnetic}$ | $km_{magnetic}$ |
| --- | --- | --- | --- |
| Hydroquinone | 0.925 | 1.02 | 2.21 |
| $Ru(bpy)_3^{2+}$ | 0.290 | 0.668 | 0.869 |
| $Ru(NH_3)_6^{3+}$ | 0.570 | 1.01 | 3.80 |

Table 2A shows cyclic voltammetric results for other species. These results are summarized in FIG. 9.

In these examples, as in general, when flux of redox species through the magnetic composite was compared to flux through either Nafion films or composites formed with nonmagnetic beads, the flux was enhanced. In general, we find the flux enhancement is not dependent on whether the electrolysis is converting a diamagnetic to a paramagnetic species or a paramagnetic to a diamagnetic species, but that the enhancement increases as the absolute value of the difference in the molar magnetic susceptibilities of the product and reactant.

Figure 10:
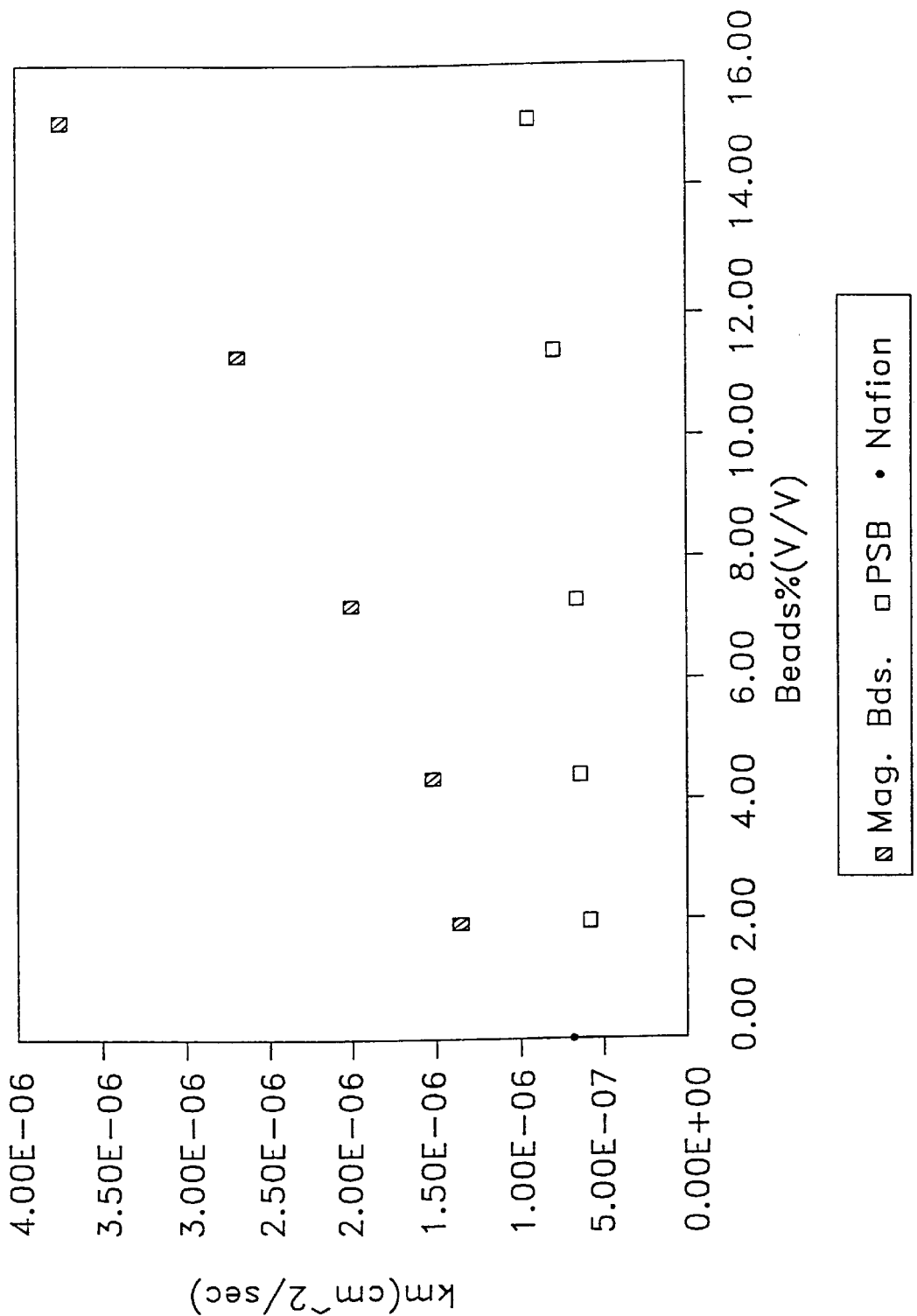
FIG. 10 shows κm values for $Ru(NH_3)_6^{3+}$ as a function of volume fraction of microbeads in magnetic and nonmagnetic composites.

To further investigate paramagnetic $Ru(NH_3)_6^{3+}$, κm values were found for magnetic and nonmagnetic composites made with various fractions of beads. Results are shown in FIG. 10. First, in FIG. 10 the flux of $Ru(NH_3)_6^{3+}$ increased strongly with the fraction of magnetic beads, but not with the fraction of nonmagnetic beads. Second, since the enhancement is not linear with the magnetic bead fraction, the enhancement was not due to either a simple concentration increase of the paramagnetic species about each bead or a simple increase in surface diffusion associated with more pillars at higher bead concentration. (Data are equally well linearized with correlation coefficient >0.99 as either ln[κm] versus percent beads, or κm versus volume of Nafion/ surface area of the beads. Plots of both showed intercepts comparable to κm for simple Nafion films.) Third, substantially higher flux was achieved with the magnetic beads than with the same fraction of nonmagnetic beads.

Figure 11:
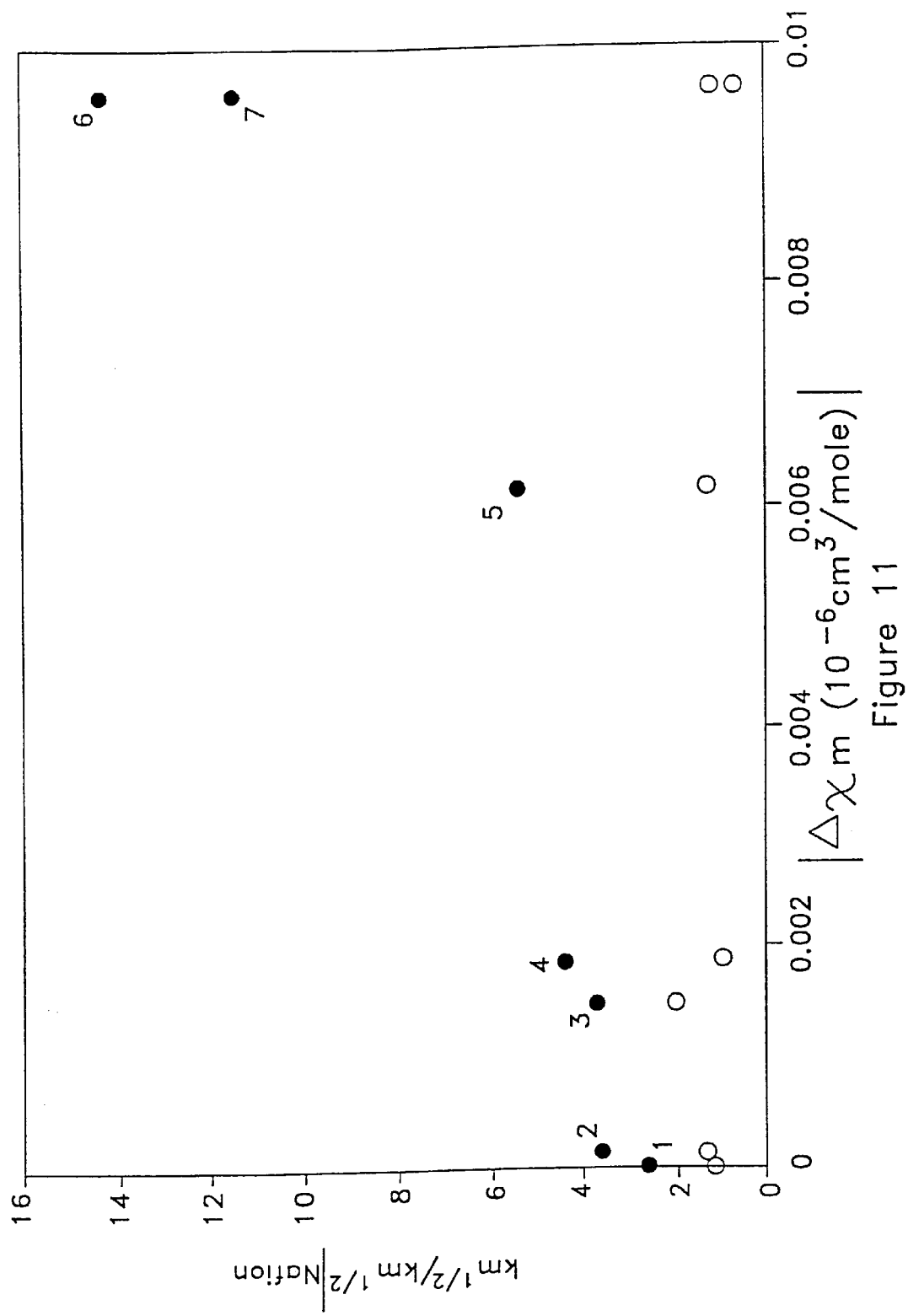
FIG. 11 shows flux increases with magnetic content of microbeads for $Ru(NH_3)_6^{3+}$.

In another series of experiments, composites were formed with magnetic microbeads of similar size, but containing different amounts of magnetic material. In these studies, as magnetic content increased, the values of κm and $κm^{1/2}$ increased. The magnetic content was measured with a Guoy balance and is characterized by $\chi_{bead}$ (see FIG. 11).

Magnetohydrodynamic models neither account for the discrimination between paramagnetic and diamagnetic species by the magnetic composites, nor do they predict the shape of the curve shown in FIG. 10. Magnetohydrodynamics predicts an effect proportional to the charge on the redox probes. No such dependence is found here.

Electrochemical flux of various redox species from solution through either composites or films to the electrode surface was determined by cyclic and steady-state rotating disk voltammetry. Electrochemical flux of species through the composites is parameterized by κ and m, where κ is the extraction coefficient of the redox species from solution into the composite, and m (cm²/s) is its effective diffusion coefficient. For steady-state rotating disk voltammetry, the parameterization is κm (determined from the intercept of a Koutecky-Levich plot); and for cyclic voltammetry, the parameterization is $κm^{1/2}$ (extracted from the slope of peak current versus the square root of the scan rate (20 to 200 mV/s). All measurements were made in solutions containing 1 to 2 mM redox species at a 0.45 cm² glassy carbon electrode. The electrolyte was 0.1 M $HNO_3$, except for the reduction of $Co(bpy)_3^{2+}$ (0.2 M $Na_2SO_4$) and for the oxidation of $Co(bpy)_3^{2+}$ and reduction of $Co(bpy)_3^{3+}$ (0.1 M sodium acetate/acetic acid buffer at pH=4.5). Anionic ferricyanide was not detected electrochemically through the anionic Nafion films and composites, consistent with defect-free layers. All potentials were recorded versus SCE (SCE is a standard calomel reference electrode; it has a standard potential of −0.24 V with respect to the reduction potential of hydrogen ions to hydrogen molecule at unit activity).

First, κm values were determined for the oxidation of paramagnetic $Ru(NH_3)_6^{3+}$ to diamagnetic $Ru(NH_3)_6^{2+}$ through magnetic and nonmagnetic composites as the bead fraction was increased. $|\Delta\chi_m|=1,880\cdot10^{-6}$ cm³/moles. From FIG. 10, κm for the nonmagnetic composites varies little with bead fraction, while κm for the magnetic composites increases superlinearly by several fold.

Figure 9:
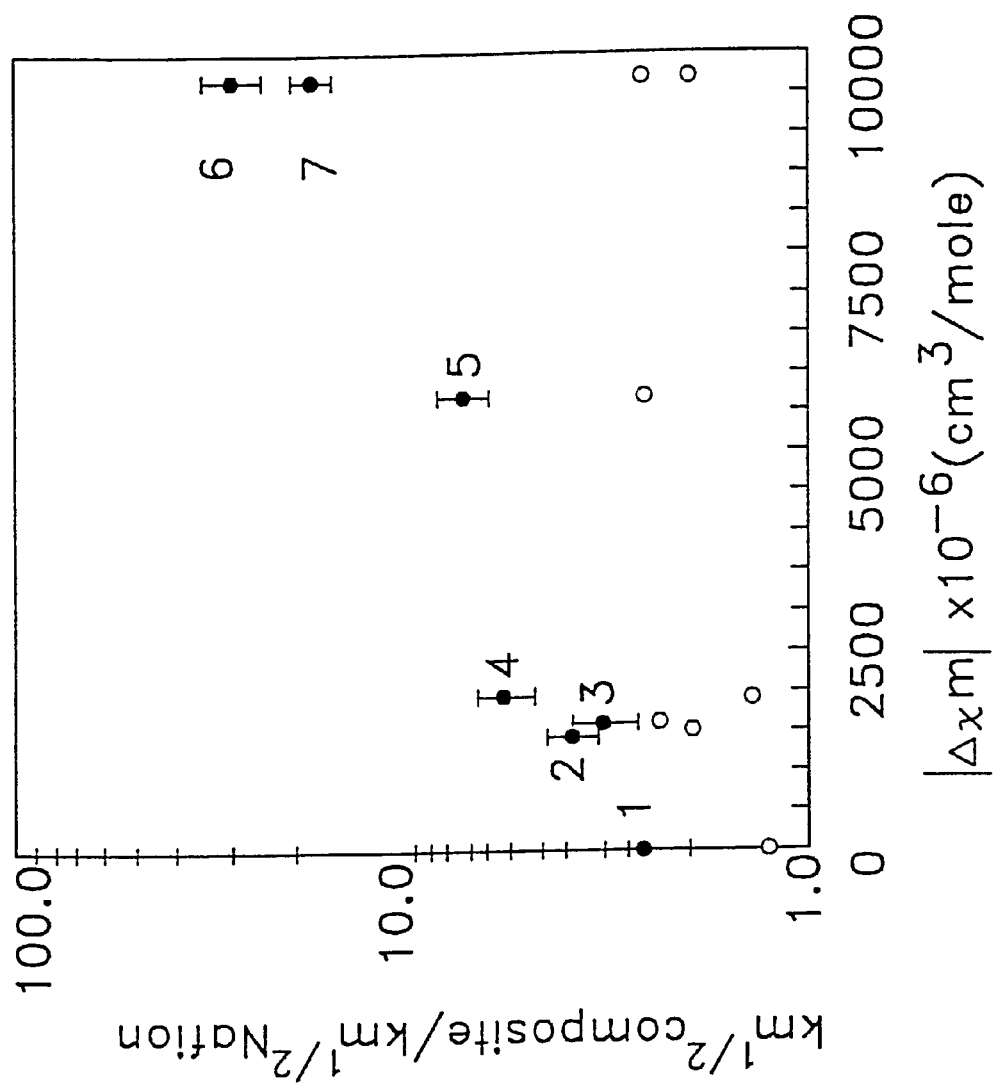
FIG. 9 shows the relative flux of redox species on the y-axis, where the maximum cyclic voltammetric current for a composite with magnetic microbeads is normalized by the maximum cyclic voltammetric current for a Nafion film containing no magnetic material, with the ratio giving the flux enhancement.

Second, $κm^{1/2}$ values were determined for various redox reactions for magnetic composites, nonmagnetic composites, and Nafion films. Exclusive of any magnetic field effects, electrochemical flux through Nafion can be altered by the size, charge, and hydrophobicity of the transported species, interaction and binding with the exchange sites, and intercalation into the hydrated and perfluorinated zones of the Nafion. To minimize effects not related to interactions between the redox moieties and the magnetic beads, $κm^{1/2}$ values for the magnetic and nonmagnetic composites are normalized by $κm^{1/2}$ for the Nafion films. The normalized $κm^{1/2}$ values are plotted in FIG. 9 with error bars versus $|\Delta\chi_m|$ for the various redox reactions. FIG. 9 illustrates the relative flux of redox species on the y-axis, where the maximum cyclic voltammetric current for a composite with magnetic microbeads is normalized by the maximum cyclic voltammetric current for a Nafion film containing no magnetic material. The ratio is the flux enhancement. On the x-axis is the absolute value of the difference in the molar magnetic susceptibilities of the products and reactants of the electrolysis, $|\Delta\chi_m|$. The composites contain 15% magnetic microbeads and 85% Nafion by volume. The redox species are numbered as follows, where the reactant products are listed sequentially: (1) hydroquinone to benzoquinone; (2) $Cr(bpy)_3^{3+}$ to $Cr(bpy)_3^{2+}$; (3) $Ru(bpy)_3^{2+}$ to $Ru(bpy)_3^{3+}$; (4) $Ru(NH_3)_6^{3+}$ to $Ru(NH_3)_6^{2+}$; (5) $Co(bpy)_3^{2+}$ to $Co(bpy)_3^{1+}$; (6) $Co(bpy)_3^{2+}$ to $Co(bpy)_3^{3+}$; and (7) $Co(bpy)_3^{3+}$ to $Co(bpy)_3^{2+}$. All redox species are 1 mM to 2 mM. Film thicknesses are 3.6μ to 3.8 μm. For the nonmagnetic composites, the normalized $κm^{1/2}$ values are independent of $|\Delta\chi_m|$. This suggests the normalization is effective in minimizing steric and electrostatic differences in the interactions of the various redox species with Nafion. For the magnetic composites, normalized $κm^{1/2}$ increases monotonically with $|\Delta\chi_m|$, with the largest enhancements approaching 3000%.

The logarithmic increase of electrochemical flux in FIG. 9 with $|\Delta\chi_m|$ is consistent with a free energy effect of a few kJ/mole. Effects of this magnitude have not been generated in uniform, macroscopic magnetic fields. Strong, nonuniform magnetic fields established over short distances (a few nanometers) at the interface between Nafion and magnetic microbeads could produce local effects of this magnitude. Magnetic concepts appropriate to uniform macroscopic magnetic fields and to molecular magnetic interactions are not applicable to this system, and instead, a microscopic parameterization is necessary. Establishing sufficiently strong and nonuniform local magnetic fields at interfaces in microstructured systems makes it possible to orchestrate chemical effects in micro-environments which cannot otherwise be achieved with uniform fields applied by large external magnets.

Cyclic Voltammetric Peak Splittings for Quasireversible Species

Figure 12A:
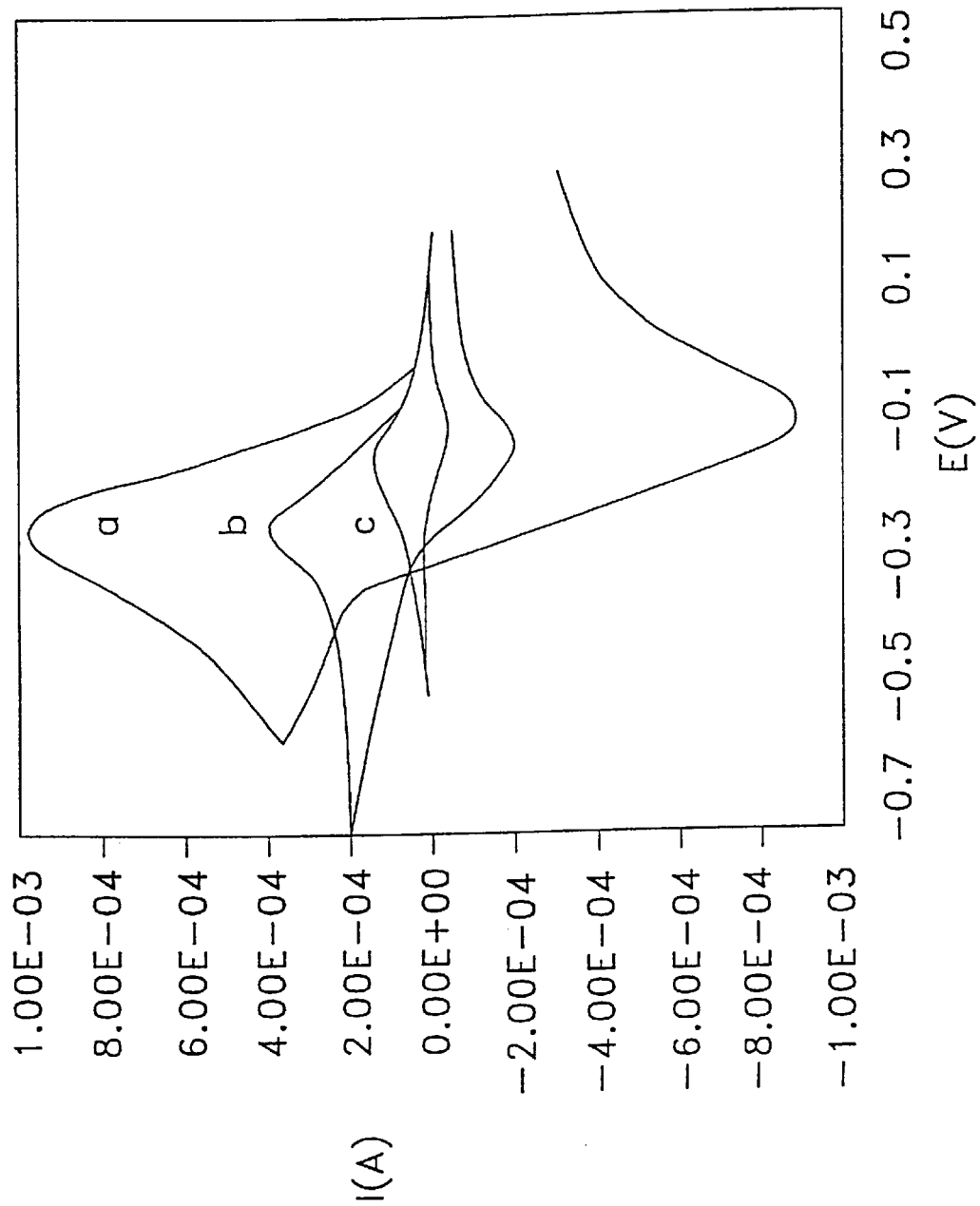
FIGS. 12A, 12B, and 12C show cyclic voltammetric results for the reversible species $Ru(NH_3)_6^{3+}$ and $Ru(bpy)_3^{2+}$ and for the quasireversible species hydroquinone.
Figure 12B:
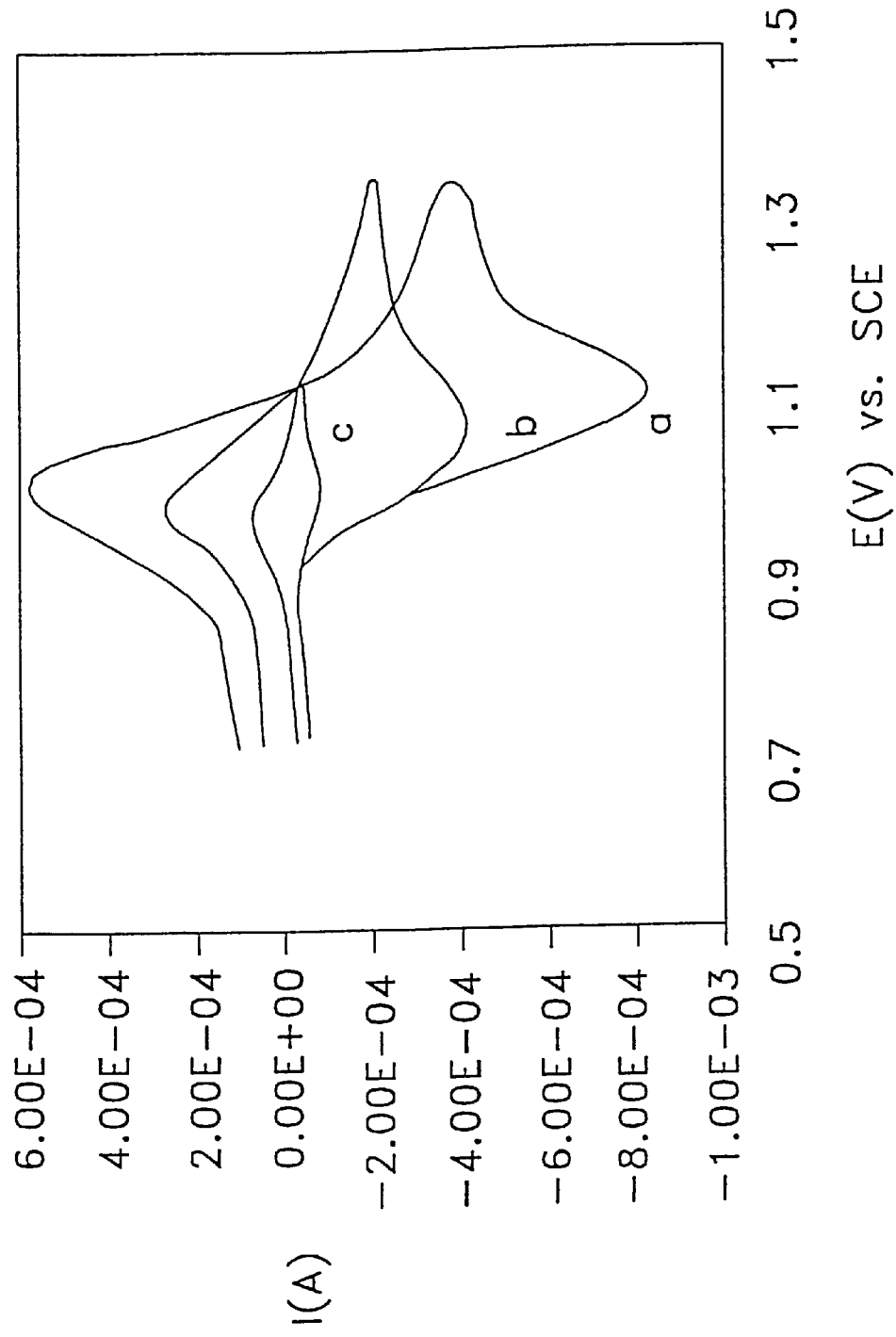

Peak splittings in cyclic voltammetry are used to determined heterogeneous electron transfer rates. FIGS. 12A and 12B show cyclic voltammetric results for the reversible species $Ru(NH_3)_6^{3+}$ and $Ru(bpy)_3^{2+}$, respectively. Cyclic voltammograms at 100 mV/s are shown for $Ru(NH_3)_6^{3+}$ (FIG. 12A) and $Ru(bpy)_3^{2+}$ (FIG. 12B) for magnetic composites, Nafion films, and the bare electrode. Cyclic voltammetric results are shown for the reduction of paramagnetic $Ru(NH_3)_6^{3+}$ in FIG. 12A. The concentration of the redox species is 1 mM, and the electrolyte is 0.1 M $HNO_3$; the reference is an SCE; and the films are 3.6 $\mu$m thick. For both species, when $E_{0.5}$ is compared for the magnetic composite and the Nafion films, the shift in $E_{0.5}$ is to positive potentials. The electron transfer kinetics for $Ru(NH_3)_6^{3+}$ are fairly strong with $k^0 > 0.2$ cm/s. Note that the peak splittings for the magnetic composites and Nafion film are similar, consistent with the resistance of the two layers being similar. Similar peak splittings are also observed for $Ru(bpy)_3^{2+}$, as shown in FIG. 12B. Therefore, when compared to the Nafion films, the magnetic composites have little effect on the rate of electron transfer of reversible species.

Figure 12C:
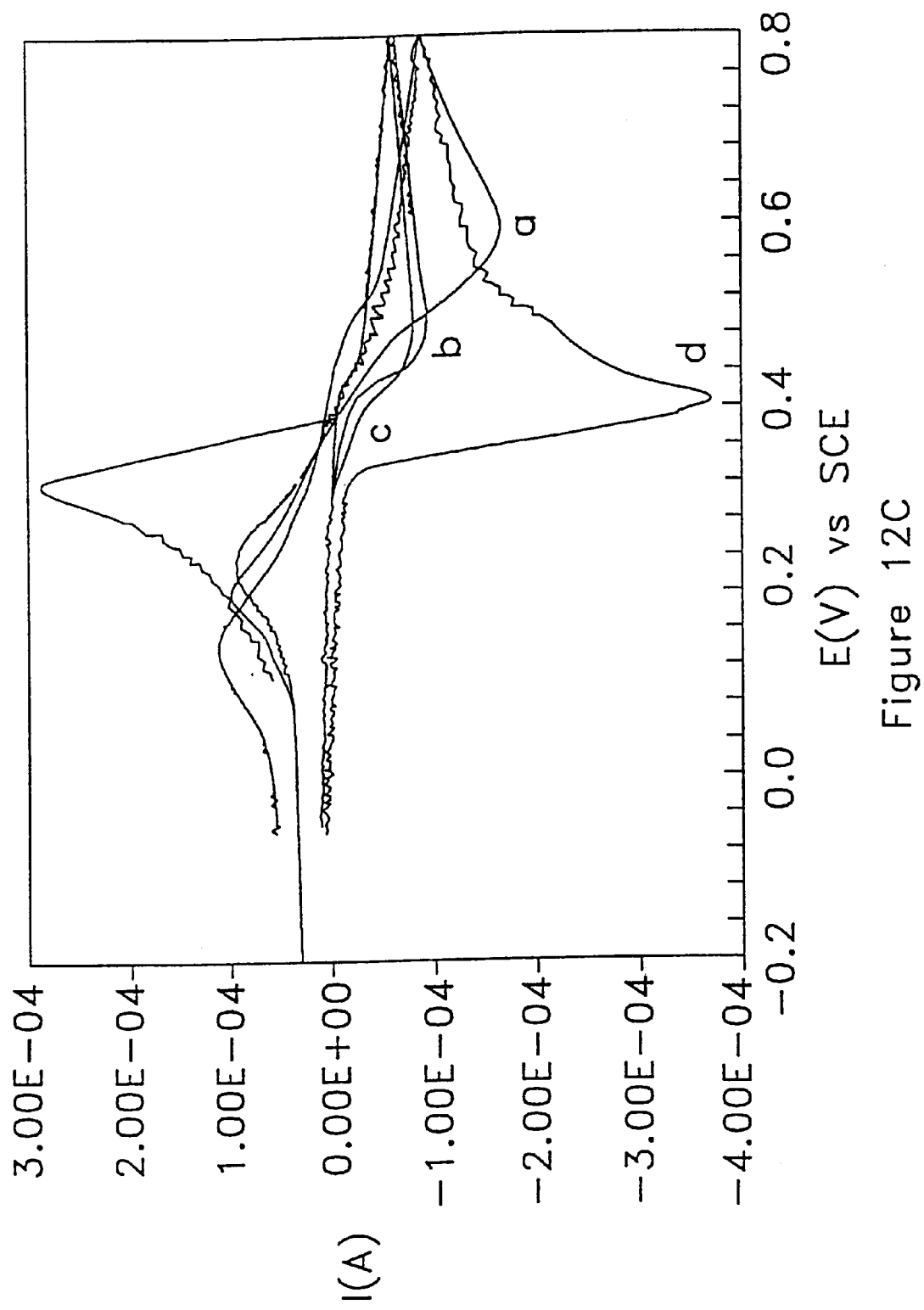

In particular, FIG. 12C shows cyclic voltammograms at 100 mV/s for 1 mM hydroquinone in 0.1 M $HNO_3$ for magnetic composites, nonmagnetic composites, Nafion films, and the bare electrode. The films are 3.6 $\mu$m thick. It is observed in the voltammogram of FIG. 12C that the peak splitting is almost doubled for the magnetic composite compared to the Nafion film. The question arises as to whether the enhanced peak splitting is consistent with the stabilization of the paramagnetic semiquinone intermediate in the two electron/two proton oxidation. In FIG. 12C, voltammograms are shown at 0.1 V/s for hydroquinone, a diamagnetic species that undergoes quasireversible, two electron/two proton oxidation to diamagnetic benzoquinone while passing through a radical, semiquinone intermediate. The voltammograms for the Nafion film and the nonmagnetic composites are fairly similar, with $\Delta E_p$ values of 218 and 282 mV, respectively. For the magnetic composite, $\Delta E_p = 432$ mV, or twice that of the Nafion film. From the results for the reversible couples above, this is not due to a higher resistance in the magnetic composites. The asymmetry in the peak shifts compared to the other three systems shown in FIG. 12C also argues against a resistance effect. (Note that the interpretation of the kinetics can be complicated by the proton concentration. However, there is no reason to think the concentration is drastically different in the magnetic and nonmagnetic composites.) The peak shift may be due to the stabilization of the paramagnetic semiquinone intermediate.

While the hydroquinone electrolysis is too complex to interpret cleanly, it does raise the interesting question of whether quasireversible electron transfer rates can be influenced by an applied magnetic field. Reversible rates will not be affected, but it is not clear what would happen with quasireversible rates. There are many quasireversible electron transfer species uncomplicated by homogeneous kinetics and disproportionation reactions which can be used to better resolve this question. If the kinetics of quasireversible processes can be influenced by magnetic fields, numerous technological systems could be improved. Oxygen reduction by two and four electrons are examples of a system where quasireversible kinetics may be susceptible to alteration by an applied magnetic field gradient.

Cyclic Voltammetric Peak Shifts

When magnetic composites and Nafion films were compared, voltammograms taken at 0.1 V/s for the reversible species exhibited no change in $\Delta E_p$. However, the peak potential for reduction, $E_p^{red}$, for $Ru(NH_3)_6^{3+}$ was shifted 14 mV positive. Similarly, the oxidation potential peak, $E_p^{ox}$, for $Ru(bpy)_3^{2+}$ was shifted 64 mV positive. Shifts of $E_{0.5}$ while $\Delta E_p$ is unchanged are consistent with one species being held more tightly in the composites, and thereby, having a lower diffusion coefficient. In general, a shift in potential of approximately +35 mV is observed for all reversible redox species, whether the electron transfer process converts the redox species from diamagnetic to paramagnetic or paramagnetic to diamagnetic. Larger potential shifts are observed with less reversible electron transfer processes. Shifts as large as 100 mV have been observed. (Note that for the film thicknesses used herein ($\cong 3.6$ $\mu$m) and a scan rate of 0.1 V/s, $m \leq 10^{-8}$ cm$^2$/s is needed for the diffusion length to be confined within the film during the sweep. Since m is not known in these systems, it is not clear whether the voltammetric results also probe behavior at the composite/solution interface.)

The above discussion further shows that interfacial gradients other than concentration and electric potential, e.g., magnetic gradients, can be exploited effectively in microstructured matrices. In composites formed with magnetic materials, locally strong (and nonuniform) magnetic fields could alter transport and kinetics. The influence of the magnetic field on species in composites may be substantial because the species are concentrated in a microenvironment, where the distance between the field source and chemical species is not large compared to the field decay length. Magnetic composites were made by casting films of polystyrene coated magnetic beads and the perfluorinated, cation exchange polymer, Nafion, onto an electrode. Approximately 1 $\mu$m diameter magnetic beads were aligned by an external magnet as the casting solvents evaporated. Once the solvents evaporated and the external magnet was removed, the beads were trapped in the Nafion, stacked as magnetic pillars perpendicular to the electrode surface.

Preliminary voltammetric studies comparing the magnetic composites to simple Nafion films (i.e. containing 0% magnetic microbeads) yielded several interesting results. First, flux of redox species through magnetic microbead composites is enhanced compared to flux through both simple Nafion films (i.e. Nafion alone) and composites formed with nonmagnetic microbeads. Second, for species which underwent reversible electron transfer (i.e., $Ru(NH_3)_6^{3+}$ and $Ru(bpy)_3^{2+}$), the cyclic voltammetric peak potential difference ($\Delta E_p$) was unaffected, but the average of the peak potentials ($E_{0.5}$) shifted consistent with the stabilization of the paramagnetic species. Third, hydroquinone oxidation was quasireversible and proceeded through paramagnetic semiquinone. For hydroquinone at 0.1 V/s, voltammograms for the magnetic composites exhibited a 40 mV positive shift of $E_{0.5}$ and a $\Delta E_p$ twice that of Nafion. The potential shifts and flux enhancements, while consistent with concentration and stabilization of the paramagnetic form of the redox couples, are as yet unexplained.

Electrochemical flux of ions and molecules through magnetic composites formed of Nafion ion exchange and polystyrene coated Fe/Fe oxide particles has been observed to be as much as twenty-fold higher than the flux through simple Nafion films. Flux enhancements have been observed with increasing difference in the magnetic susceptibility of the halves of the redox reaction.

Figure 13:
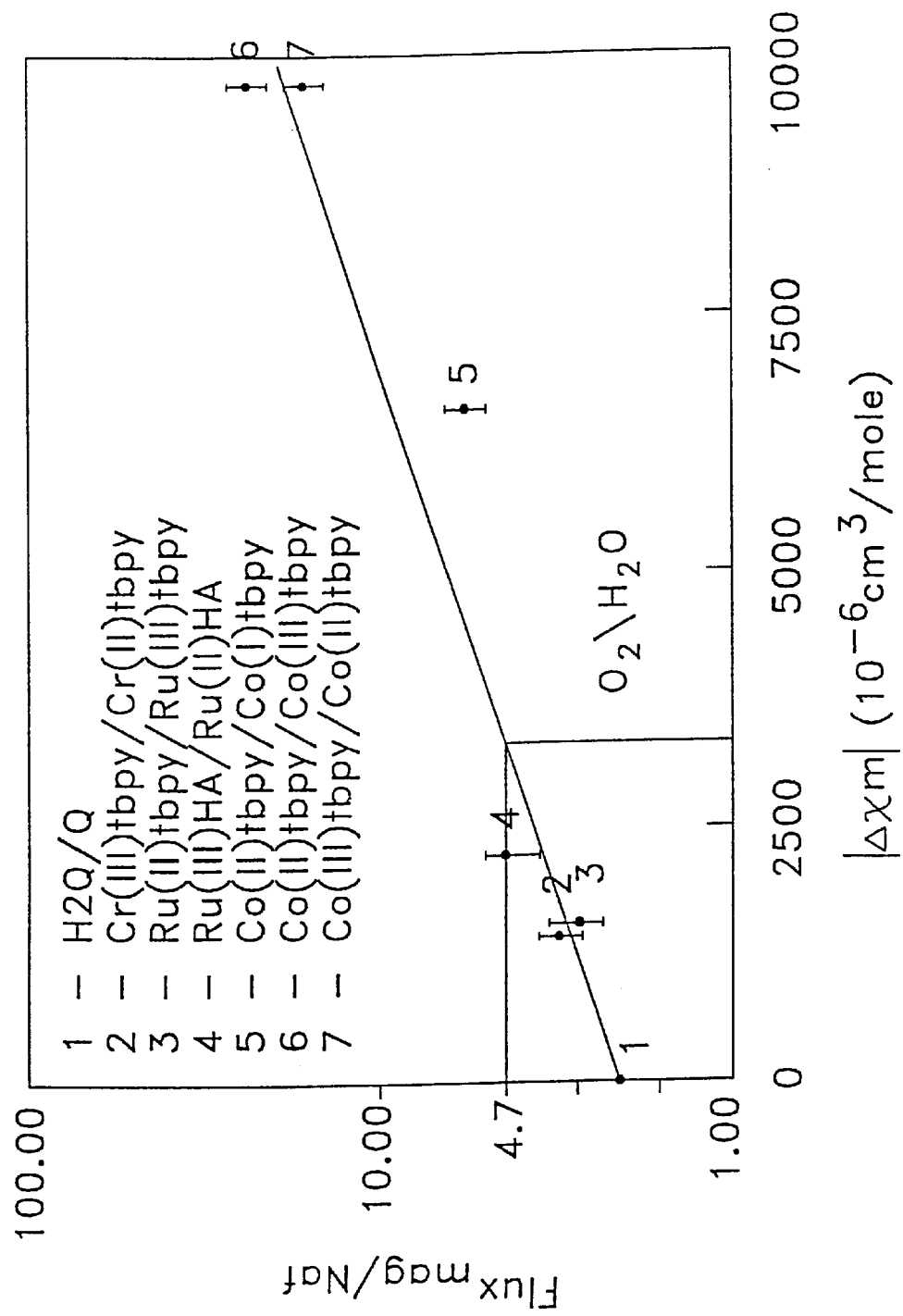
FIG. 13 shows a plot of the flux for seven redox species that is used for predicting a roughly five-fold flux enhancement of oxygen through a 15% magnetic Nafion composite over Nafion.

A passive, magnetic composite may be used to enhance the flux of oxygen at the cathode in a fuel cell. Oxygen has two unpaired electrons, and is therefore susceptible to this magnetic field in the same way as described in the experiments above. If oxygen is consistent with the observations made thus far for other ions and molecules, the electrochemical flux of oxygen to a magnetically modified cathode can be enhanced by approximately 500% as compared to a nonmagnetically modified cathode (FIG. 13). Such an enhancement would be comparable to that achieved by pressurization to 5 atmospheres at the cathode.

Based on the above discussion, it is possible to predict a roughly five-fold flux enhancement of oxygen through a 15% magnetic/Nafion composite over Nafion. This is understood by considering the fluxes through magnetic/Nafion composites and Nafion films of the seven redox species listed in the upper left hand corner of FIG. 13. These are the same species as listed in FIG. 9. The fluxes were determined by cyclic voltammetry. The flux ratio for magnetic composites to Nafion films is the y-axis and the absolute value of the difference in the molar magnetic susceptibilities ($|\Delta\chi_m|$) of products and reactants of the electrolysis reaction is the x-axis of FIG. 13. (The larger the value of $\Delta\chi_m$, the more susceptible a species is to interaction with a magnetic field.) From FIG. 13, the flux increases exponentially as $|\Delta\chi_m|$ increases. For the most extreme case, the flux is increased about twenty-fold. For the reduction of oxygen to water, $|\Delta\chi_m| \approx 3500 \cdot 10^{-6}$ cm$^3$/mole. This point on the x-axis is extrapolated to therefore suggest that the flux enhancement for oxygen in the magnetic composite will approach five-fold.

Figure 14:
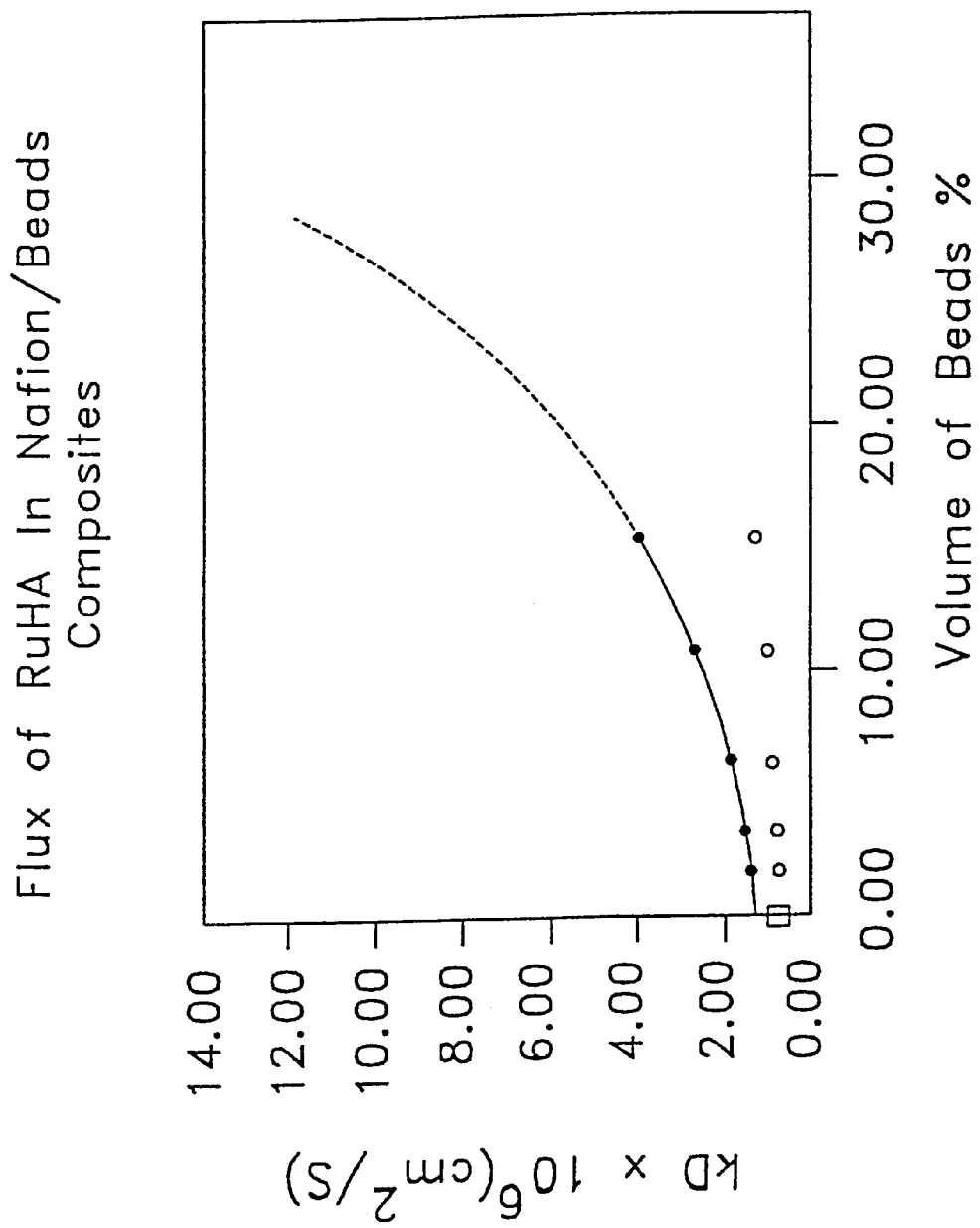
FIG. 14 shows a plot of the flux of $Ru(NH_3)_6^{3+}$ in magnetic bead/Nafion composites increasing as the fraction of magnetic beads increases.

Experiments have been conducted with Nafion composites of up to 15% Fe/Fe oxide particles or beads. FIG. 14 shows a curve of the increase in flux based on the percentage of magnetic beads. The dotted line on FIG. 14 is the projected effect on flux of higher bead concentrations.

For paramagnetic species, the flux through the magnetic composites increases as the fraction of magnetic beads increases. In FIG. 14, the flux of Ru(NH$_3$)$_6^{3+}$ through magnetic bead/Nafion composites (●) increases as the fraction of magnetic beads in the composite is increased to 15%. Larger enhancements may be possible with higher bead fraction composites or composites formed with magnetic beads containing more magnetic material. Compared to a simple Nafion film (□), the flux is 4.4 fold larger. Ru(NH$_3$)$_6^{3+}$ is less paramagnetic than oxygen. For comparison, composites formed with nonmagnetic polystyrene beads (○) were examined; these exhibited no flux enhancement as the bead fraction increased. The line shown on the plot is generated as a logarithmic fit to the data for the magnetic composites. It illustrates the flux enhancement that might be found for composites formed with a higher fraction of magnetic beads. The extrapolation suggests that at 30% magnetic beads, the flux through the magnetic composites of Ru(NH$_3$)$_6^{3+}$ might approach twenty times its value in simple Nafion films. As oxygen is more paramagnetic than Ru(NH$_3$)$_6^{3+}$ even larger enhancements might be anticipated for oxygen.

Oxygen Susceptibility to Magnetic Composites and Magnetic Concepts

Paramagnetic molecules have unpaired electrons and are drawn into (aligned by) a magnetic field (i.e., a torque will be produced; if a magnetic field gradient exists, magnetic dipoles will experience a net force). Radicals and oxygen are paramagnetic. Diamagnetic species, with all electrons paired, are slightly repelled by the field; most organic molecules are diamagnetic. (Metal ions and transition metal complexes are either paramagnetic or diamagnetic.) How strongly a molecular or chemical species responds to a magnetic field is parameterized by the molar magnetic susceptibility, $\chi_m$ (cm$^3$/mole). For diamagnetic species, $\chi_m$ is between ($-1$ to $-500$)$\cdot 10^{-6}$ cm$^3$/mole, and is temperature independent. For paramagnetic species, $\chi_m$ ranges from 0 to $+0.01$ cm$^3$/mole, and, once corrected for its usually small diamagnetic component, varies inversely with temperature (Curie's Law). While ions are monopoles and will either move with or against an electric field, depending on the sign of the potential gradient (electric field), paramagnetic species are dipoles and will always be drawn into (aligned in) a magnetic field, independent of the direction of the magnetic vector. A net force on a magnetic dipole will exist if there is a magnetic field gradient. The magnetic susceptibilities of $O_2$, $H_2O$ and $H_2O_2$ are summarized in Table 3.

TABLE 3

Molar Magnetic Susceptibilities, $\chi_m$

| Species | Temperature (°K) | $X_m$ (10$^{-6}$cm$^3$/mole) |
|---|---|---|
| $O_2$ | 293 | 3449 |
| $H_2O$ | 293 | $-13$ |
| $H_2O_2$ | — | $-18$ |

Figure 2:
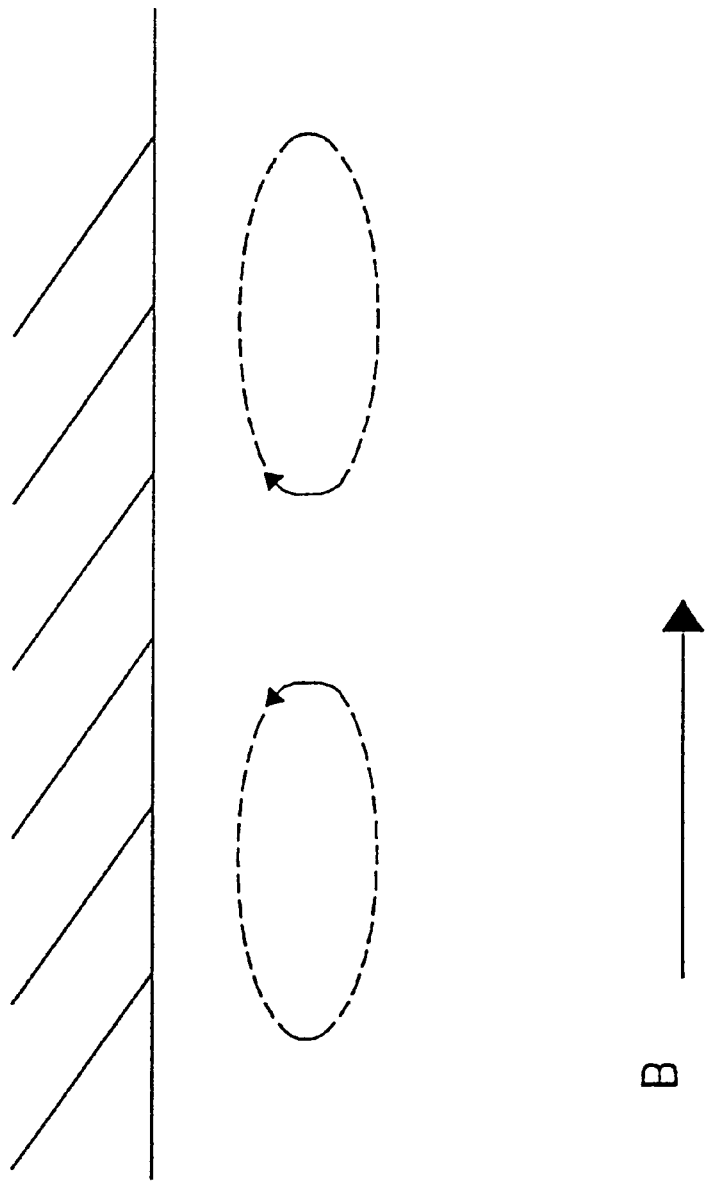
FIG. 2 shows the influence of electrode orientation and solvent motion on magnetohydrodynamic fluid motion for a second geometry.

Magnetic field effects were observed in electrochemical systems. Because electrochemistry tends to involve single electron transfer events, the majority of electrochemical reactions should result in a net change in the magnetic susceptibility of species near the electrode. Little has been reported, however, in electrochemistry on magnetic fields. What has been reported relates to magnetohydrodynamics. Magnetohydrodynamics describes the motion of the charged species (i.e., an ion) perpendicular to the applied magnetic field and parallel to the applied electric field (Lorentz force). In the composites described herein, the magnetic field, the direction of motion, and the electric field were all normal to the electrode. Because magnetohydrodynamics (see FIGS. 1–3) does not predict a motion dependence on the magnetic susceptibility of the moving species and requires that all the field and motion vectors are perpendicular (i.e., for magnetic effects), the effects described here are unlikely to be macroscopic magnetohydrodynamic effects.

Graded Density Composites

The following protocol is used to form density layers on electrodes with the density layers parallel to the electrode surface or other surface: Solutions of Ficoll (a commercially available copolymer of sucrose and epichlorhydrin used to make macroscopic graded density columns for separations of biological cells by their buoyancy) are made in water at concentrations varying from a few percent to 50% by weight. The viscosity of the solution is a monotonic function of the weight percent polymer. Small volumes of polymer solution (5 to 100 $\mu$l) are pipetted onto an electrode surface and the electrode spun at 400 rpm for two minutes; this creates a single polymer layer. By repeating this process with polymer solutions of different concentrations, a graded interface, with density and viscosity varied as a function of the composition of the casting solution or casting mixture, can be created. The thickness of each step in the staircase structure depends on the number of layers cast of a given concentration, and can range from 200 nm to several micrometers.

A similar structure with graded layers of ion exchange sites in ion exchange polymers can be formed by either (1) spin casting or coating a mixture of density gradient polymer and ion exchange polymer on the electrode or other surfaces as described above; (2) forming a density graded layer of density gradient polymer first, and then adsorbing the ion exchange polymer into the matrix; or (3) spin casting or coating layers of ion exchange polymer on surfaces from solutions of different concentrations. It should be possible to cast such layers, and then peel them off surfaces to form free standing films. Such films would have utility in controlling solvent transport across electrochemical cells, including fuel cells.

A protocol is proposed to form density gradient layers on electrodes with the density layers perpendicular to the electrode surface or other surface. Electrodes and surfaces can be envisioned in which more than one gradient is established on the surface for purposes of separating molecules in more than one spatial and temporal coordinate and by more than one property. One example is to form composites with a magnetic gradient in one coordinate and a density gradient in another coordinate. These materials could be formed by creating a magnetic gradient perpendicular to the electrode surface by placing magnetic beads on an electrode or surface and allowing the composite to be cast in a nonuniform field, where the external magnet is aligned so the beads are on the surface but not in columns perpendicular to the surface. A density layer could be cast (as opposed to spun cast or coated) by pipetting small volumes of different concentrations of density gradient polymer and/or ion exchange polymer and allowing the solvents to evaporate, thereby building up a graded layer parallel to the electrode surface. Once the entire layer is cast, the external magnet can be removed if the magnetic material is superparamagnetic, and left in place if the magnetic material is paramagnetic.

These would be fairly sophisticated composites, and complex to understand, but unusual flux enhancements and separations should be possible in several dimensions. It should be possible to design even more complex structures than these. For example, embodiments may combine two effects such as magnetic field gradient effects with density gradient effects to make a more sophisticated separator to perform multiple separations of similar materials. This would be an example of an apparatus and method for separating similar things in a mix which involves a graded matrix instead of separate chambers (such as for lighter transition metals and heavier transition metals or other species as discussed below).

Modified Ion Exchangers

The surface of the magnetic microbeads have ion exchange groups on them which would allow ready chemical modification, e.g., coating with a magnetically oriented liquid crystal for a local flux switch. Embodiments of such modified structures may have use in the quest to build microstructured devices and machines.

Separation of Lanthanides and Actinides

Lanthanides and actinides are the heaviest transition metals having atomic numbers in the ranges 58–71 and 90–103, respectively. The lanthanides and actinides include metals such as plutonium, uranium, and thorium. Various isotopes of these transition metals are radioactive, and either are used as the fissionable material in nuclear reactors or are generated by nuclear decay processes.

Some of the isotopes of lanthanides and actinides (e.g., $^{227}$Ac, $^{232}$Th, $^{235}$U, $^{238}$U, $^{231}$Pa, $^{237}$Np, $^{244}$Pu, $^{242}$Pu, $^{239}$Pu, $^{238}$Pu, $^{243}$Am, $^{241}$Am, $^{244}$Cm, $^{242}$Cm, $^{249}$Bk, and $^{252}$Cf) have significant (long) half-lives, and pose a significant environmental remediation problem, especially when the radioactive materials are present in a complex matrix of waste sludge or mine tailings. A most extreme example is the storage vats at Hanford, Washington. Thus, separation of lanthanides and actinides is important. Note, separation here means separation of ions and metals rather than isotopes.

The environmental problems could at least be simplified if the heavier transition metals could be removed selectively from the matrix. Even if the separation process simultaneously removes metal species other than the lanthanides and the actinides, the separation would still be advantageous. The separation does not have to be specific, only selective, to be useful. For example, removing the heavier transition metals from the waste sludge greatly reduces the level of radioactive hazard in the remaining sludge. The separated radioactive material would be concentrated and much reduced in volume, and, therefore, easier to contain.

Radioactive isotopes are also employed in various imaging processes, especially for medical diagnosis. These processes typically use isotopes with half-lives of a few days or hours. Therefore, isotopes must be generated either on-site or elsewhere to be shipped and used rapidly. If longer half-life isotopes could be used, some of these constraints might be simplified. Also, better images could be obtained with higher concentrations and stronger emitters of radioactive material. Currently, higher concentrations are not used because the detoxification protocol involves isotope decay in the body, rather than a removal process. Therefore, if a method for removing the heavy transition metals from the body could be developed, the range with respect to the type and concentration of isotopes could be expanded.

Difficulty of Separating Lanthanides and Actinides

All of the prior discussion of FIGS. 10 to 14 apply to the lighter transition metals which have been studied. However, the notions concerning magnetism discussed so far in relation to FIGS. 10 to 14 (which directly support these notions) may also apply to the heavier transition metals as well. The heavier transition metals (lanthanides and actinides) are expected to have similar properties to the lighter transition metals, only more exaggerated.

The lanthanides and actinides have high nuclear mass, and the differences in the chemistries of these heavier transition metals in either row of the periodic chart is established by the number of electrons in the fourth and fifth f-shells, respectively. However, the f-shell electrons are shielded by the fifth (lanthanide) and sixth (actinide) s- and p-shell electrons, and the chemistries of the metals in each row of heavier transition metals are not highly differentiated.

Although traditional methods for separating metals and metal ions are based on selectively plating the metal ions, or using various chromatographic methods, these methods have not been very successful with lanthanides and actinides. Plating methods are not successful because the reduction potentials of the lanthanides and actinides are all within 200 millivolts of each other. For the lanthanides, the three electron reduction of the trivalent cation to the metal occurs at −2.3+0.1 Volts versus NHE (normal hydrogen electrode—a reference electrode defined to the thermodynamic scale of 0 Volts for proton reduction as is well-known in the art) for all the members of the series.

Separations can be achieved by various methods, based on, amongst other things, charge, mobilities, and complex formation with chelating agents. Chromatographic separations can be driven, amongst other things, by charge and mobilities. For heavier transition metals such as lanthanides and actinides, charge-based chromatographic separations will not work because these transition metals all have similar charge and similar reduction potentials, which means that they will have similar charge even after they are all reduced. The same redox potential means that you cannot selectively reduce or oxidize only some of the species.

Because the lanthanides and actinides form similarly sized ions, the mobilities are all very similar, and species, therefore, cannot be well-separated by mobility. Nonchromatographic separation methods involving chelating methods will also be difficult. For example, as the f-shell electrons are shielded by the s- and p-electrons of the next principal shell, the binding constants of the ions of either series with various chelating agents are very similar, resulting in species not being well-separated by chelation. Therefore, another separation technique for these series, such as magnetic separation, is required.

Magnetic Separations of Lanthanides and Actinides

The response of a molecule or ion to a magnetic field is measured by its molar magnetic susceptibility ($\chi_m$) or equivalently, by its magnetic moment, $\mu$. As the number of unpaired electrons in the species increases, $\mu$ increases. The lanthanides and actinides have f-shell electrons, which can contain between 0 and 14 electrons. Therefore, the maximum number of unpaired electrons in the f-shell is 7. The properties of the lighter transition metals in the main body of the periodic table are such that they have only d-shell electrons, which can number as many as 10 with a maximum number of five unpaired electrons. Inherently, therefore, lanthanides and actinides can have higher numbers of unpaired electrons than the transition metals with only d-shell electrons. Thus, lanthanides and actinides can have higher magnetic moments than transition metals from the main body of the periodic table. The higher magnetic moments arise from unpaired electrons and, to some extent, nuclear magnetic moments. The higher magnetic moments, as well as the greater range in oxidation states (prior discussion of paramagnetic and diamagnetic redox species is applicable here) and should allow lanthanides and actinides to be separated from the lighter transition metals. In some cases, this separation may require an additional oxidation and/or chelation step.

In particular, if a separation yields a mixture of heavier transition metals and transition metals from the main part of the periodic table (lighter transition metals), a change in oxidation state, achieved by either adding an oxidant or reductant or by electrolysis at an electrode, will change not only the charges (and number of electrons in the d- (for main transition metals) and f-shells (for heavier transition metals)) on the metal ions or their complexes, but it can also change the number of unpaired electrons in the heavier and main transition metals. Because the main transition metals have only 10 d-shell electrons and the heavier transition metals have 14 f-shell electrons, ions, metals and complexes which have at least a few electrons in either the d- or f-shells are likely to have different numbers of unpaired electrons when electrons are added or removed. This will allow the main transition metals to be separated from the heavier transition metals in a large number of cases.

Figure 14A:
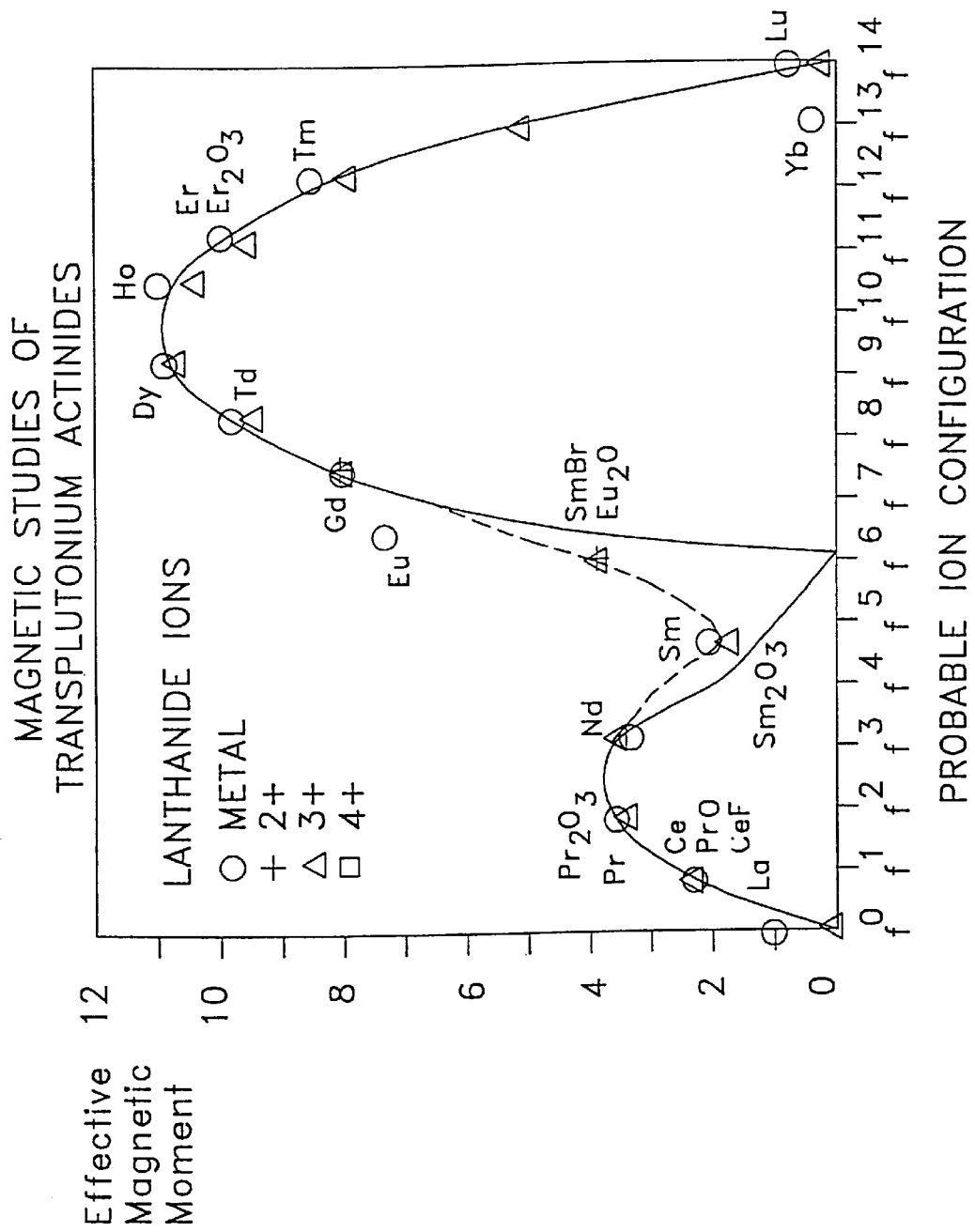
FIG. 14A shows a plot of the paramagnetic effective moments of lanthanide metals and compounds as a function of the number of f-shell electrons.
Figure 14B:
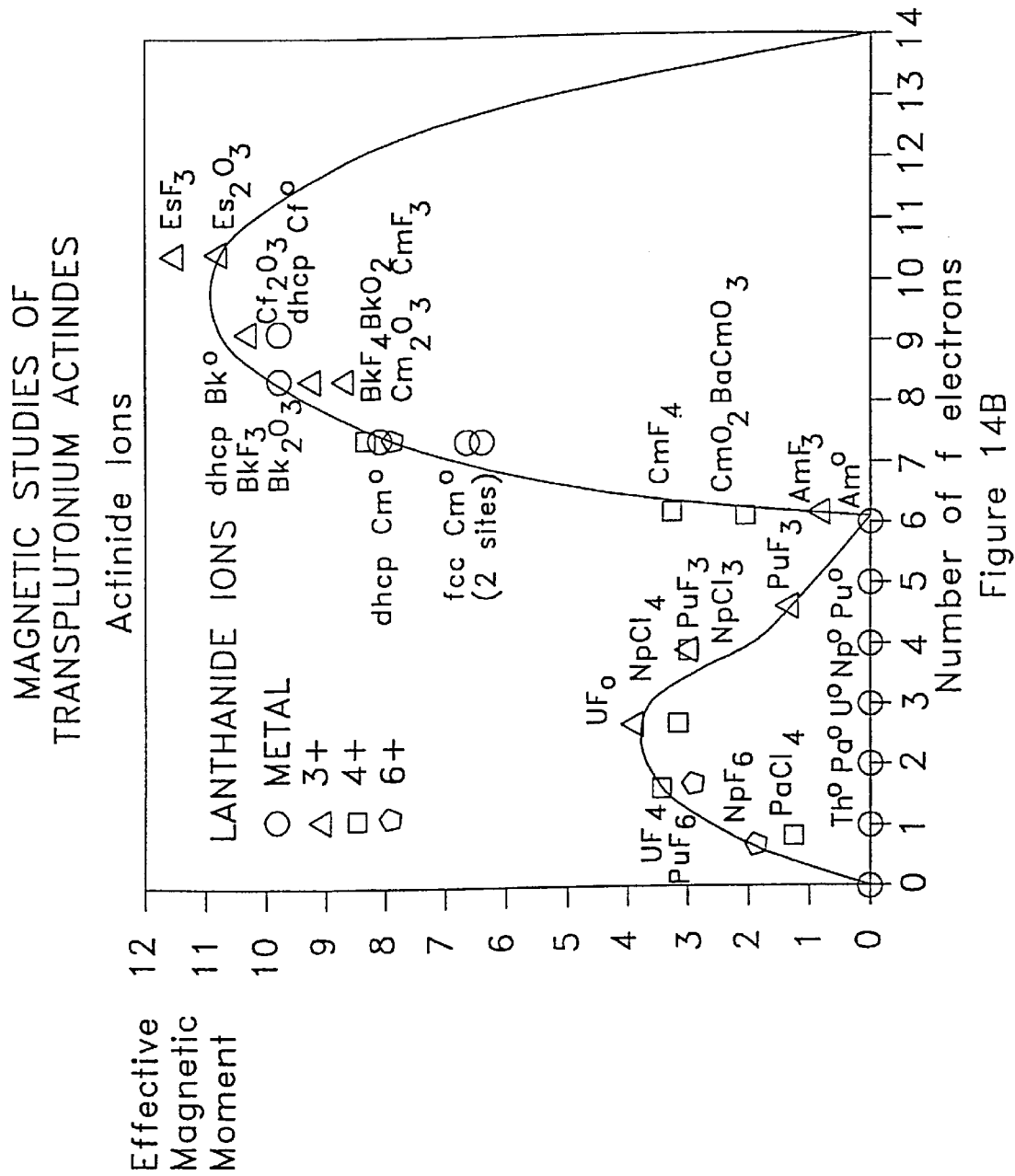
FIG. 14B shows a plot of the paramagnetic effective moments of actinide metals and compounds as a function of the number of f-shell electrons.

Plots of magnetic moments for the lanthanides, actinides, and lighter transition metals are appended in FIGS. 14A, 14B, and 14C, respectively, for representative metal ion complexes. FIGS. 14A and 14B were taken, respectively, from pp. 329 and 369 of "Advanced Inorganic Chemistry" by F. A. Cotton and G. Wilkinson, Third Edition, Interscience Publishers, NY, 1972, the contents of which are incorporated herein by reference. Data for FIG. 14C were taken from pp. 38–239 of "The Magnetic Properties of Transition Metal Complexes" by B. N. Figgis and J. Lewis in "Progress in Chemistry," vol. 6, F. A. Cotton, ed., Interscience Publishers, NY, 1964 and from F. H. Burstall and R. S. Nyholm, J. Chem. Soc., 1952, pp. 3570–3579, both of which are incorporated herein by reference. An examination of FIGS. 14A–C shows that the magnetic moments of the heavier transition metals are higher than those of the lighter metals. Clearly, however, there is some overlap of magnetic moments between the two categories of transition metals. For example, Cr(III), $UF_4$, $UF_3$, and $Pr_2O_3$ have similar magnetic moments, as do Cr(II) and $PuF_4$. The magnetically-based separation would, therefore, not distinguish very well between these species, and they may be grouped together before and after the separation step.

However, additional separation steps involving chelation or electrolysis before a subsequent separation step would certainly remove the lighter transition metals from the heavier ones. Nevertheless, the separation of uranium from plutonium species might be more difficult, because the method may not be sufficiently selective. Additional tuning of the method might improve the separation, or repetitive separations might help. Even without additional improvements, it is at least possible to separate trivalent and tetravalent uranium and plutonium species from species such as iron, for example.

One possible way to separate some heavier transition metal species is to use the fact that they can form gaseous species and that certain separations lend themselves to the gas phase. For example, separation of the gas $UF_6$ (uranium hexafluoride) or various isotopes thereof may be accomplished using such a separation technique. Previously, isotopes of uranium were separated by making $UF_6$ and allowing the gases to diffuse down extremely long tubes. Because of the slight differences in mass, the lighter isotopes got to the end of the tubes first.

It should be noted that temperature could have a very great effect on what drives magnetic separations in general and, in particular, what drives magnetic separations of heavier transition metals. Operation at lower temperature can be a real advantage because magnetic susceptibility (moment) of molecular species increases as reciprocal temperature. Dropping temperature from room temperature to just above freezing increases the magnetic moments about 10% (see the discussion about Curie Temperature above). Perhaps this temperature sensitivity may be exploited with thermal gradients to drive magnetic separations of heavy transition metals and other magnetic species.

It is also possible to build a sensor based on the temperature sensitivity, including a sensor for hot (radioactive) heavier transition metals. A differentiation of some of the various radioactive species in a mix may be realizable from (1) flux enhancement and (2) temperature increases. Perhaps a combination of flux enhancement and temperature-based magnetic separation could be made with parallel or perpendicular magnetic and thermal gradients.

Achieving Separations

Separations can be thought of in several steps:

1. Species are separated because they have different degrees of interaction with some external agent or force (here, magnetic composites and magnetic fields).
2. If one interaction enhances separations, but it does not achieve complete separation, the process should be repeated to improve separation efficiency (here, it may be necessary to set up a sequence of separation vats and magnetic composite separators)..
3. If, after several iterations, separation has been partially successful, but several species are still mixed together, try another separation process on this mixture which has already been refined by the first process (here, this could be a, for example, a chelation process to bind either the lighter or heavy transition metals, e.g., to selectively precipitate one set or the other, or a plating process might be used, or a change in oxidation states followed by another separation step, based on either magnetic properties or some other properties).

For the present invention, the principles described herein may be applied in conjunction with the use of magnetic composites to separate lanthanides and actinides from other metal ions and to separate lanthanides and actinides into smaller groups based on their magnetic moments. The behavior and formation of one class of magnetic composites has been previously outlined above.

Based on the previously demonstrated behavior of these composites with the lighter transition metal complexes, it should be possible to separate the heavy transition metal ions or complexes formed by chelation thereof with organic or inorganic ligands. It may be ions, metals, or metal complexes (charged and uncharged) which can be separated, although ions and organometallic complexes are most likely.

The efficiency of the separation will be prescribed, at least in part, by the magnetic moment of the species separated. In an electrochemically-based process, the efficiency may be dictated by the difference in the magnetic moments of the oxidized and the reduced forms of the species. Two basic separation processes are outlined:

Electrochemical processes in which a magnetic composite controls access of the species in the solution to the electrode.

Magnetochromatographic processes in which a magnetic composite is used as a separation membrane between two vats, where one vat has the mixture to be separated, and the species to be separated passes through the separator to a second vat, where the selectively passed or separated species are collected.

Either of the above processes are possible processes for achieving the separation. Other chromatographic processes, where the carrier is a gas, liquid, solid, or plasma and the stationary phase is any magnetically modified microstructured material, also possibly a gas, liquid/suspension, solid, or plasma, are feasible. Here, the roles of the carrier and the stationary phase are not differentiated and may be interchanged.

Figure 14D:
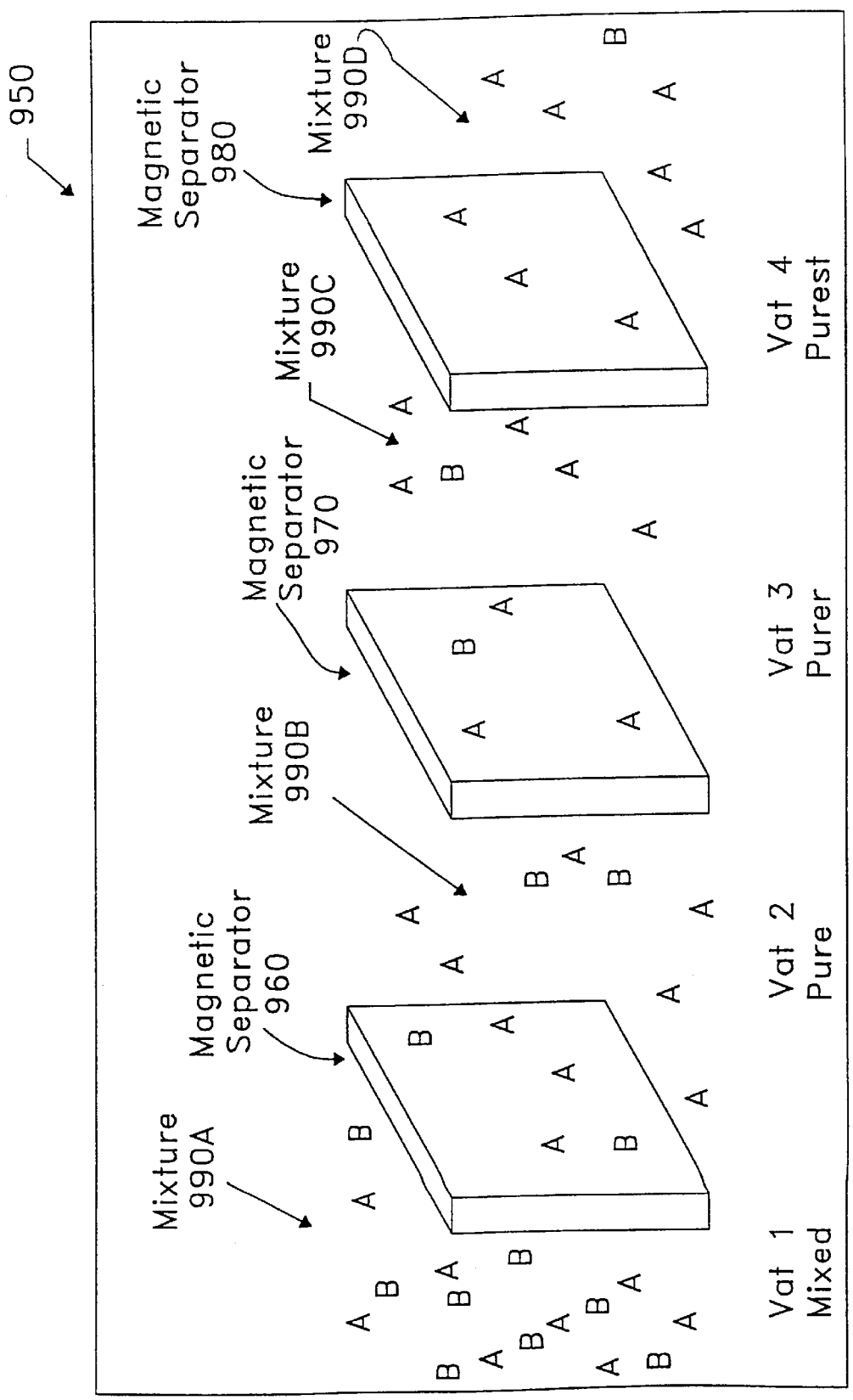
FIG. 14D shows a series of vats separated by magnetic separators used to separate mixtures to increase constituent purity according to the instant invention.

Single step separations are possible either chromatographically or electrochemically. However, in a multistep process, as will most likely be needed, several chambers or vats are set up in sequence as illustrated in FIG. 14D so that the most mobile species will be concentrated in the last vat. Here, the magnetic separator may be either simply chromatographic or it may be a magnetically modified porous electrode that allows flow through the electrode. In FIG. 14D which will be discussed in detail below, the separator lets species A pass through the separator with twice the efficiency of species B. After three separation steps, the concentration of species A is enhanced 8:1 ($[2/1]^3$:1) compared to species B, where species A and B were in equal concentrations initially. The efficiencies of magnetic separators will depend on the magnetic properties of the species being separated as discussed above and should be at least as good as the situation just illustrated. Note that the initial, relative concentrations of the species in the initial mixture, like species A and B, will also play a role.

It may be necessary to add ligands before or after the magnetic separation. Ligands added before separation may change selectivity through a separation membrane, probably for reasons other than magnetic properties. For example, if binding is favored for the lighter transition metal species and they can be bound to form negatively charged lighter transition metal complexes, these complexes would be excluded from the composites if a positively charged ion exchange polymer, or equivalent positively charged material, were used as the binder to form the composite.

It is also possible to increase the magnetic moment of some transition metal complexes if ligands are used which force the metal center to switch from a low to a high spin electron configuration. Lower magnetic moments can be achieved if the ligands force the metal center into the low spin configuration. Cobalt is the most common example of a species capable of forming low and high spin complexes. However, not all metals have low and high spin configurations.

Ligands may be added after the separation, where the selective binding to a ligand would allow the chemistries of the lanthanides and the actinides to be distinguishable from the lighter transition metal species. For example, if large binding constants allow the actinides and the lanthanides to form complexes with large ligands, the lanthanides and actinides might be precipitated selectively from the mixture. Other separation processes are also possible. Magnetic separations involving ligands may be applied to lanthanides and actinides as will be discussed in detail below (see discussion involving FIGS. 16A, 16B, and 16C below).

APPLICATIONS OF THE INVENTION

General Applications

Figure 15A:
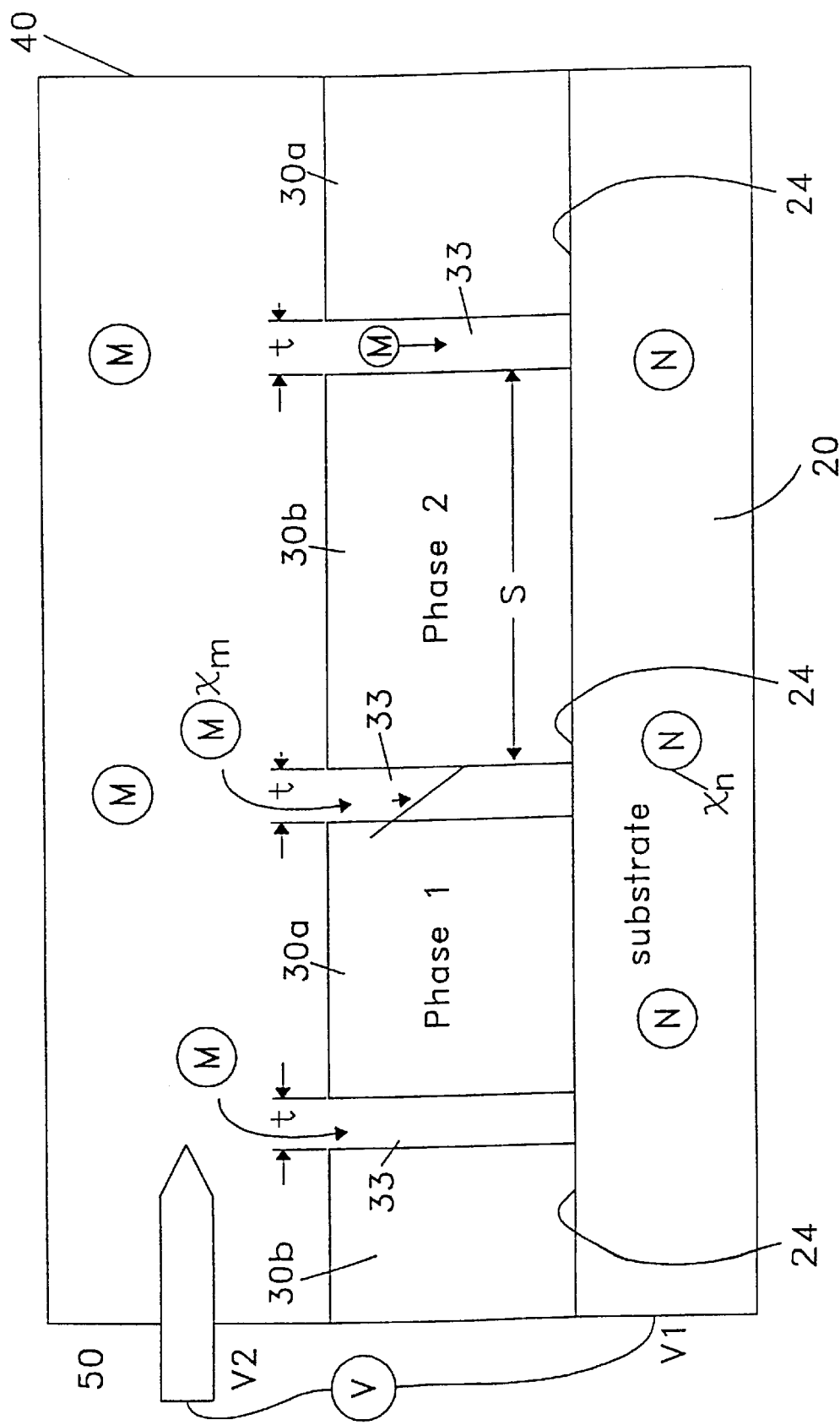
FIG. 15A shows a simplified representation used to describe how magnetic microboundaries influence a standard electrochemical process.

FIG. 15A shows a simplified representation which will be used to describe how magnetic microboundaries 10a, 10b, and 10c influence a standard electrochemical process. Here, a substrate 20 with a surface 24 serves as a conductor and hence can electrically conduct like a metal, a semiconductor or a superconductor. Substrate 20 is maintained at a first potential V1. Two different phases of materials 30a and 30b have two different magnetic fields, i.e., are in two different magnetic phases, phase 1 and phase 2 and are applied to surface 24 of substrate 20. Since materials 30a and 30b have different magnetic fields, boundary regions or boundaries 33 have magnetic gradients. Boundary regions 33 are not necessarily sharp or straight, but the magnetic field of material 30a smoothly changes into the magnetic field of material 30b according to electromagnetic boundary conditions. Therefore, width t represents an average width of boundaries 33. Width t should be approximately between a few nanometers to a few micrometers and preferably between one nanometer and approximately 0.5 $\mu$m. Boundary regions 33 are separated from each other by varying distances and S represents the average of these distances. The effect of varying distances S will be described below.

Particles M have a magnetic susceptibility $\chi_m$ and are in an electrolyte 40 which is at a potential V2 due to an electrode 50. This makes a potential difference of V between electrolyte 40 and substrate 20 (substrate 20 can effectively act as a second electrode). Boundary regions 33 are paths through which particles M can pass. Particles M are then either driven electrically or via a concentration gradient toward substrate 20. Once particles M reach substrate 20, they either acquire or lose electrons, thereby turning into particles N with magnetic susceptibility $\chi_n$. The absolute value of the difference between the magnetic susceptibilities of phase 1 and phase 2 is a measure of the magnitude of the magnetic gradient in region 33 and will be referred to as the magnetic gradient of boundary region 33. It will be shown below that the flux of particles M increases approximately exponentially with respect to increasing the magnetic gradient of boundary region 33 with materials 30*a* and 30*b* when compared to the flux without materials 30*a* and 30*b*. This increase in flux can be greater than 35-fold or 3500%, resulting in significant improvements in efficiency of many electrochemical processes.

Specific examples of electrochemical systems where magnets might improve an electrochemical cell or process include: chloralkali processing, electrofluoridation, corrosion inhibition, solar and photocells of various types, and acceleration of electrochemical reactions at the electrode and in the composite matrix. Potential shifts of $E_{0.5}$ are always observed and suggest an energy difference is generated by the magnetic fields and gradients in the composites; generically, this could improve performance of all electrochemical energy devices, including fuel cells, batteries, solar and photocells. Other applications include, sensors, including dual sensors for paramagnetic species; optical sensors; flux switching; and controlled release of materials by control of a magnetic field, including release of drugs and biomaterials, or in medical dosing. There may also be applications in imaging and resonance imaging technologies.

Boundaries 33 do not have to be equally spaced and do not have to have equal widths or thicknesses t. Materials 30*a* and 30*b* can be liquid, solid, gas or plasma. The only restriction is that a boundary 33 must exist, i.e., materials 30*a* and 30*b* must have two different magnetic fields to create the magnetic gradient within the width t. The magnetic gradient of region 33 can be increased by (1) increasing the magnetic content of the microbeads; (2) increasing the magnetic microbead fraction in the composite; (3) increasing the magnetic strength of the beads by improving the magnetic material in the beads; and (4) enhancing the field in the magnetic microbeads by means of an external magnet. In general, the flux of particles M and N is correlated with magnetic susceptibility properties, $\chi_m$ and $\chi_n$. The above phenomena can be used to improve performance of fuel cells and batteries.

Figure 15B:
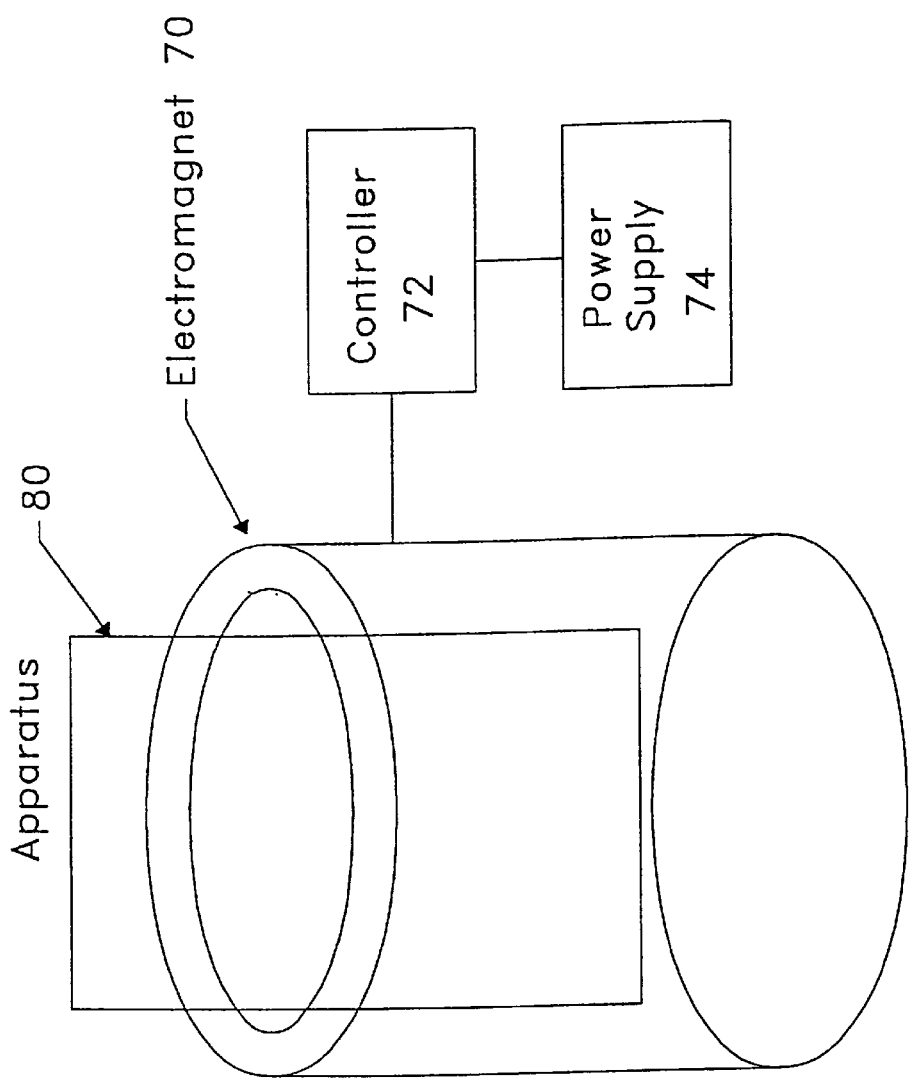
FIG. 15B shows a simplified representation of embodiments of the invention placed in an externally applied magnetic field provided by an electromagnet to alter the magnetic properties of those embodiments, where the field may be turned on or off, or it may be oscillated.
Figure 16:
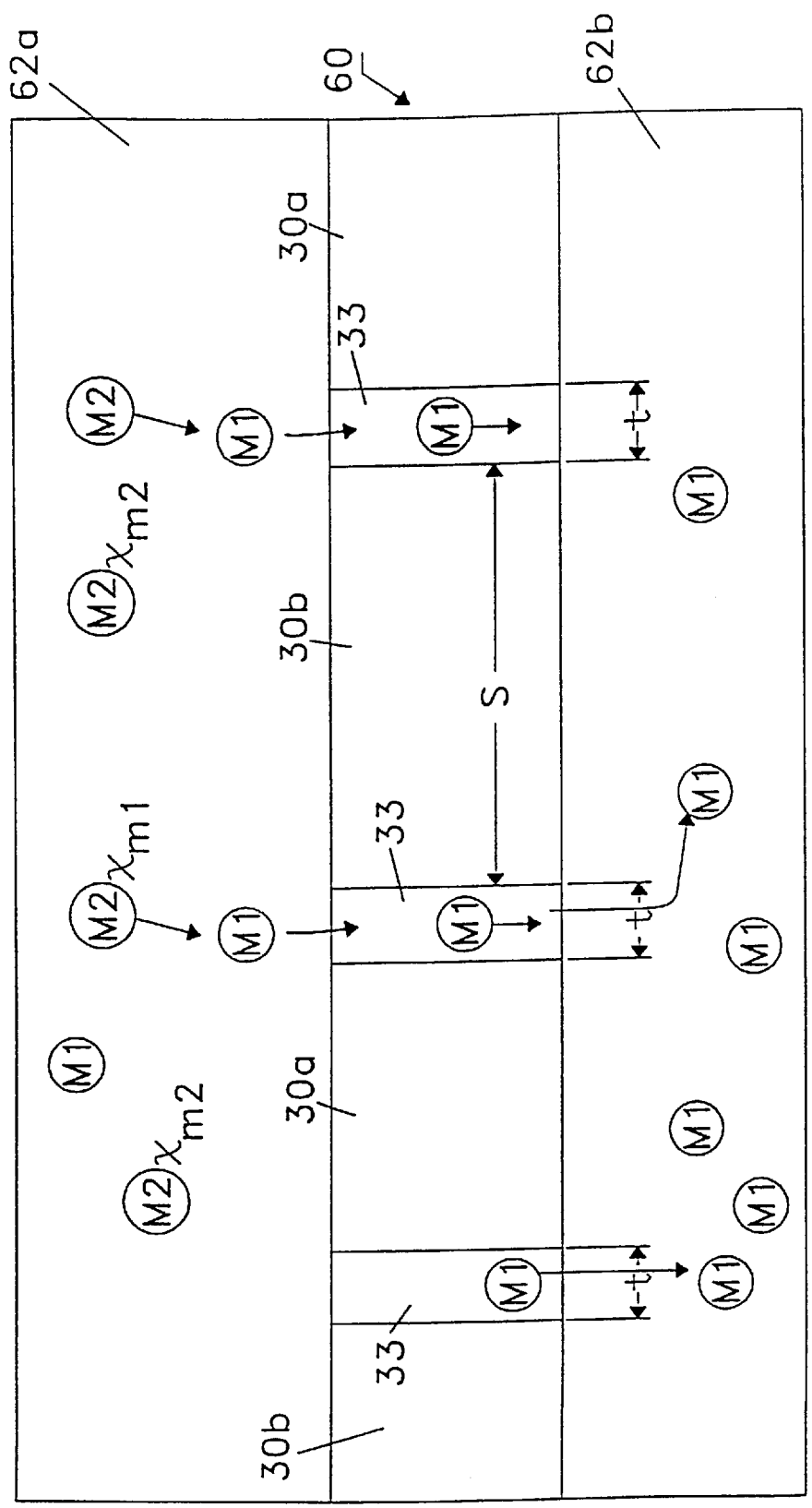
FIG. 16 shows a simplified diagram of a separator with no electrode or conductive substrate which separates a mixture of particles between a first solution and a second solution.

FIG. 15B shows apparatus 80 which corresponds to any of the above discussed embodiments as well as the embodiments shown in FIG. 16 or thereafter. The implementation of some of the embodiments of the invention requires the presence of a magnetic field such as that produced by electromagnet 70, while other embodiments may not require electromagnet 70. Apparatus 80 corresponds to, for example, some embodiments of the magnetically modified electrode, the fuel cell, the battery, the membrane sensor, the dual sensor, and the flux switch. Electromagnet 70 can be any source of a magnetic field. Electromagnet 70 can also be used in the above discussed methods of forming the composite magnetic materials that require the presence of an externally applied magnetic field. Electromagnet 70 can be controlled by controller 72 to produce a constant or oscillating magnetic field with power supplied by power supply 74.

An external magnetic field such as could be applied by electromagnet 70 may be useful in various embodiments of the invention. Switches and further enhancements might be possible in cases where the external field is concentrated in the magnetic microbeads or particles. For example, flux switches might be useful, especially as actuated by an external magnet or electromagnet 70 in such applications as: (1) release of materials in medical applications; (2) recollection of hot isotopes in medical imaging applications as explained above; (3) microreactors and separators as a means of mixing—perhaps to control a micronuclear reactor or a heat source driven by hot materials; and (4) make a re-usable system for cleaning and collecting heavier transition metals in hot storage tanks.

For this last idea, once something is contaminated with a hot (radioactive) material, it becomes radioactive itself, and is handled as waste to be stored or cleaned. Since cleaning is a complex issue that is not completely presently understood and since there is a major emphasis on controlling the amount of contact with hot materials, an alternative embodiment might be small heavy transition metal "scrubbers" having located therein magnetic separators, flux switches, and/or other examples of structures described herein. These scrubbers would be jettisoned or dispensed into a radioactive tank (or other environment), allowed to collect the heavy transition metals (radioactive or not), then recollected and allowed to release their contents by turning on/off their flux switches. One way the scrubbers could be caused to release their magnetically held materials would be to increase the temperature because magnetic effects are reduced at higher temperatures. The switches would then be reset and the scrubbers repositioned or redispensed to scrub again. There would be no new waste and the scrubbers would provide a collector/cleaner/concentrator.

The scrubbers could be exposed to the species to be collected or the species could be distributed amongst the scrubbers by flowing the species over, through, past, or amongst the scrubbers. Moreover, the scrubbers could be contained in a container, released externally to collect the species to be collected, then be recollected within the container for releasing the collected species, and then be recycled or re-used to collect more of the species. It should be understood that the scrubbers of this type need not be restricted to heavier transition metal applications or storage tanks. For instance, the scrubbers may be employed to "scrub" or remove uranium ions and salts from mine tailings.

FIG. 16 shows another simplified diagram showing a second manifestation of the above described phenomenon and hence a second broad area of application. Namely, FIG. 16 shows a separator 60 disposed between a first solution 62*a* and a second solution 62*b*. Here, there is no electrode or conductive substrate 20. Solution 62*a* has at least two different types of particles $M_1$ and $M_2$ with two different magnetic susceptibilities $\chi_{m1}$ and $\chi_{m2}$, respectively. Once particles $M_1$ or $M_2$ drift into an area near any one of boundaries 33, they are accelerated through the boundaries 33 by the magnetic gradient therein. Here, $\chi_{m1}$ is greater than $\chi_{m2}$, which causes the flux of particles $M_1$ through separator 60 to be greater than the flux of particles $M_2$ through separator 60. This difference in flux can again be greater than 3500%, and may will tend to cancel out or override any difference in acceleration due to different masses of particles $M_1$ and $M_2$. Consequently, if the above process is allowed to proceed long enough, most of the particles $M_1$ will have passed through separator 60 before particles $M_2$, thereby making first solution 62*a* primarily made up of particles $M_2$ and second solution 62b primarily made up of particles $M_1$. Note, separation of particles $M_1$ and $M_2$ may require some special tailoring of the separator 60 and also depends on how much time is allowed for particles $M_1$ and $M_2$ to separate. In an infinite amount of time, both particles $M_1$ and $M_2$ may cross separator 60. Particle size may also have a bearing on the ultimate separation of particles $M_1$ and $M_2$ by separator 60.

The above discussion with respect to FIG. 16 involves two types of particles, $M_1$ and $M_2$, but the discussion also holds for any number of particles. Consider, for example, solution 62a having particles $M_1$, $M_2$, $M_3$ and $M_4$ with susceptibilities $\chi_{m1}$, $\chi_{m2}$, $\chi_{m3}$ and $\chi_{m4}$, respectively. If $\chi_{m1} > \chi_{m2} \chi_{m3} > \chi_{m4}$, then $M_1$ would pass more easily through separator 60, followed by $M_2$, $M_3$ and $M_4$. The greater the difference between magnetic susceptibilities, the better the separation. Multistep chamber separations employing various separators like separator 60 with similar or different properties may also be envisioned as will be discussed below.

The above phenomenon can be used to improve performance of fuel cells and batteries. Other applications include separation technology in general, chromatographic processes—including separation of higher transition metal species (lanthanides and actinides), and photography.

To more particularly illustrate the relevant ideas for the magnetic separation of lanthanides and actinides as previously discussed, further consideration of FIG. 14D is appropriate. FIG. 14D shows a system 950 having a series of vats, i.e., vat 1, vat 2, vat 3, and vat 4 (although any number of vats are possible). Between each of vats 1–4 are magnetic separators with magnetic separator 960 between vat 1 and vat 2, magnetic separator 970 between vat 2 and vat 3, and magnetic separator 980 between vat 3 and vat 4. Magnetic separators 1–4 may be of the same type or each a different type. Any one of magnetic separators 960, 970, or 980 may also be a membrane, a porous electrode, or a magnetically modified electrode. A combination of a porous electrode or a magnetically modified electrode with other types of magnetic separators may be possible.

Species or particles A and B are initially in a mixed state or mixture 990A in vat 1 in FIG. 14D in equal or unequal concentrations. The idea is to separate species or particles A from species or particle B by using the selectivity of the combination of vats 1–4 and magnetic separators 960, 970, and 980 (in some circumstances a single magnetic separator like magnetic separators 960, 970, or 980 and two vats like vats 1–4 may suffice for separating species). The properties of magnetic separators 960, 970, and 980 are such that species or particles A preferentially and selectively pass therethrough. Over time, or by virtue of this selectivity, the concentration of species or particles A increases in vat 4 as the separation proceeds from vat 1 having mixture 990A therein to vat 2 having mixture 990B therein, and then from vat 2 to vat 3 having mixture 990C therein, and then finally from vat 3 to vat 4 having mixture 990D therein. Mixtures 990A, 990B, 990C, and 990D of species or particles A and B become more pure in species or particles A as the separation proceeds from vat 1 to vat 4 with vat 4 having mixture 990D of species or particles A and B most pure in species or particles A.

It is possible that vat 4 may contain species or particles A alone (allowing for other impurities) in mixture 990D and no species or particles B. It is also possible that as the concentration of species or particles A is maximized relative to the concentration of species or particles B in mixture 990D in vat 4, simultaneously the converse may be occurring in mixture 990A in vat 1 as species or particles B are left behind by species or particles A, although this is not required. A variation of how the accumulation of species or particles B in mixture 990A in vat 1 occurs is to have preferential transport of species or particles B from any and all of vats 2–4 toward vat 1. For example, both mixture 990A in vat 1 and mixture 990D in vat 4 may include species or particles A and B initially in some initial concentrations. Due to the properties of magnetic separators 960, 970, and 980 and over a period of time, the concentration of species or particles A increases in mixture 990D in vat 4 while the concentration of species or particles B increases in mixture 990A in vat 1 over their respective initial concentrations. The net transport of species or particles A and B is towards vat 4 from vats 1–3 and towards vat 1 from vats 2–4, respectively.

Figure 16A:
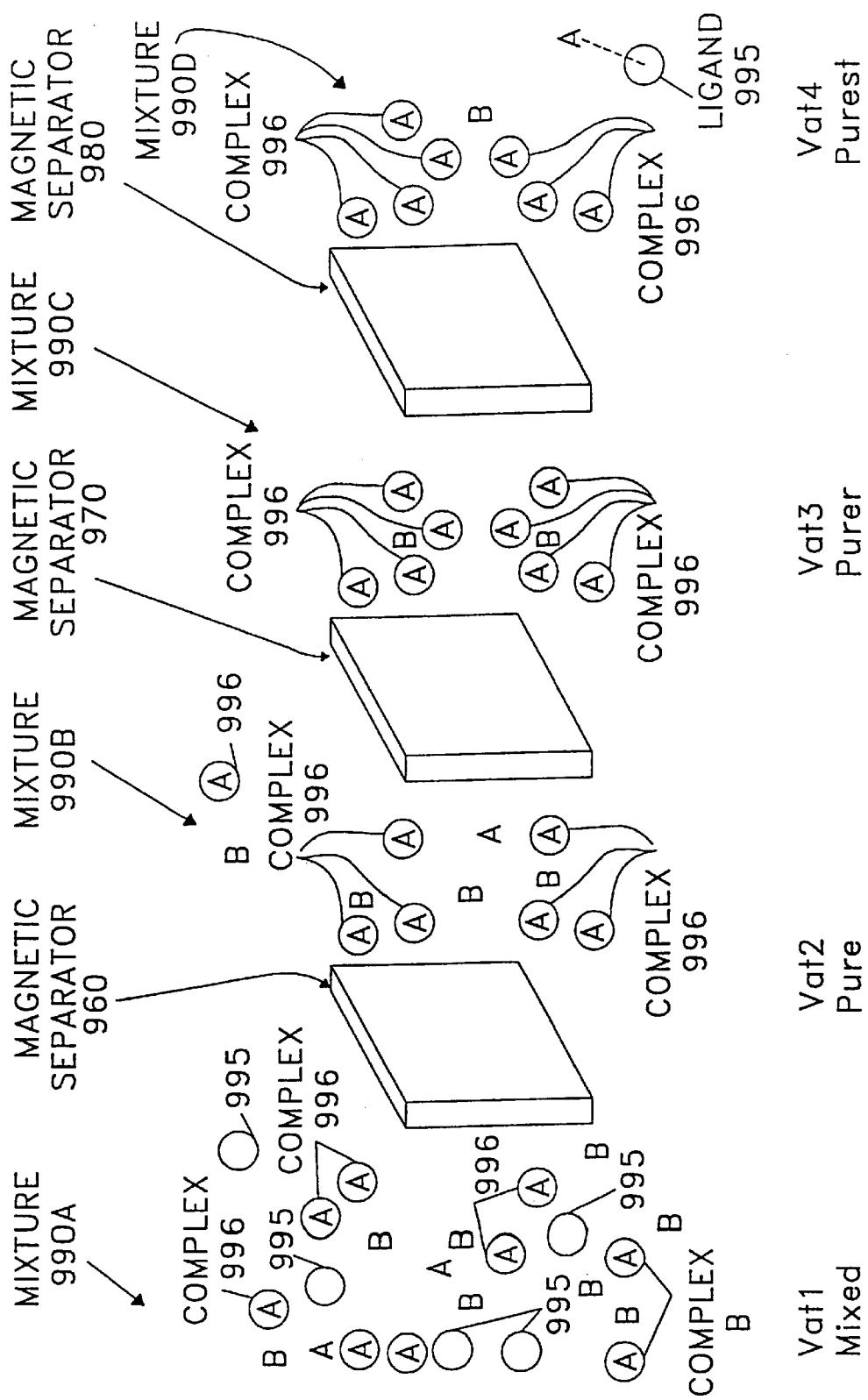
FIG. 16A shows a series of vats separated by magnetic separators used to separate mixtures to increase constituent purity similar to FIG. 14D, but which uses a ligand to form complexes that aid in the separation according to the present invention.
Figure 16B:
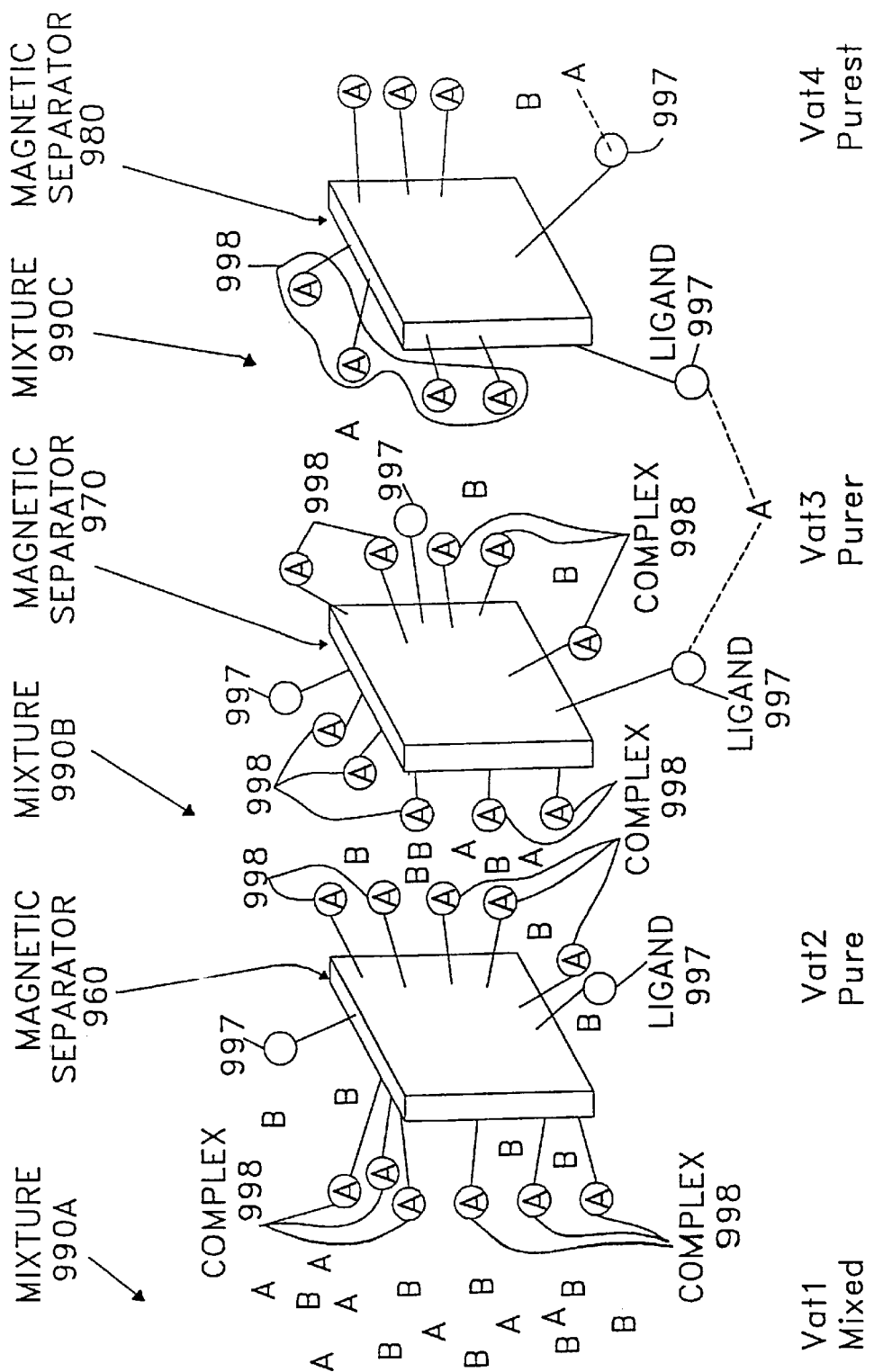
FIG. 16B shows a series of vats separated by magnetic separators used to separate mixtures to increase constituent purity similar to FIG. 14D, but which uses a ligand associated with the magnetic separators to form complexes that aid in the separation according to the present invention.
Figure 16C:
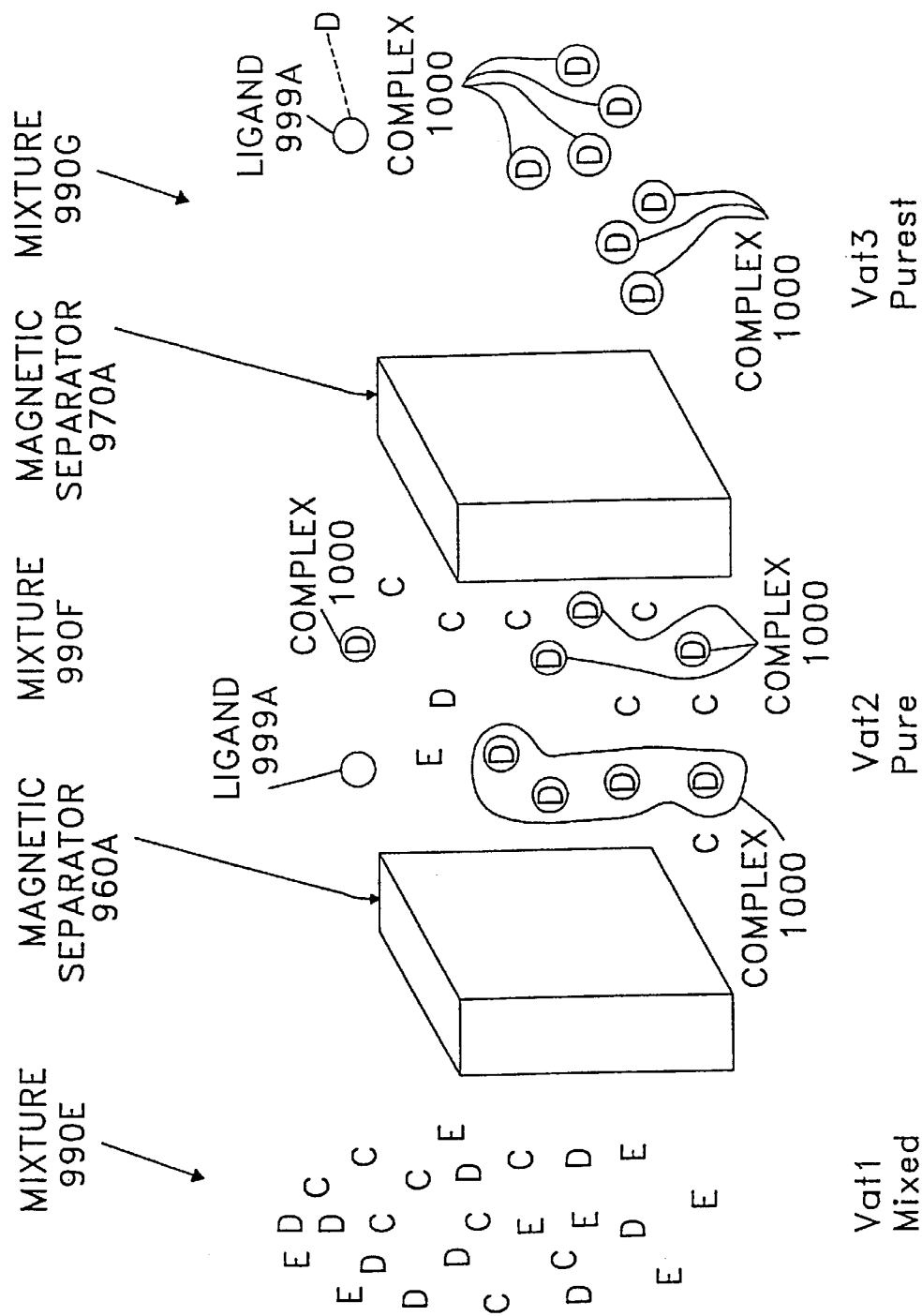
FIG. 16C shows a series of vats separated by magnetic separators used to separate mixtures that combines separation similar to FIG. 14D with separation using a ligand to form complexes that aid in the separation according to the present invention.

FIGS. 16A, 16B, and 16C illustrate possible uses of ligands in the selectivity of a separation. Ligands 995 may be involved to aid in the selectivity of the separation, whether ligands 995 are used in mixtures 990A–D or with any component thereof, i.e., species or particles A or B, or they are bound to or used in some way in magnetic separators 960, 970, or 980. FIG. 16A depicts ligands being used to preferentially aid in the transport of species or particles A from mixture 990A in vat 1 to mixture 990D in vat 4. In vat 1, ligands 995 form complexes 996 with species or particle A. Complexes 996 are preferentially transported through magnetic separators 960, 970, and 980. Once complexes 996 reach vat 4, a decoupling of ligands 995 and species or particles A may or may not occur (it is shown to occur in FIG. 16A). Of course, an alternative embodiment (not shown) would be to have ligands 995 form complexes with species or particles B instead, such complexes preventing species or particles B from being transported from vat 1 having mixture 990A ultimately to vat 4 having mixture 990D while species or particles A are so transported.

Another alternative embodiment is shown in FIG. 16B, wherein ligands 997 are associated with magnetic separators 960, 970, and 980 to form complexes 998 with either of species or particle A and B so as to allow only one of these species or particles to be transported from vat 1 to vat 4. FIG. 16B illustrates complexes 998 formed with species or particles A that allow transport of species or particles A through magnetic separators 960, 970, and 980. It is understood that any of magnetic separators 960, 970, or 980 may instead have associated ligands 997 form complexes 998 with species or particles B that prevent species or particles B from passing therethrough while the passage of particles A is not so prevented.

FIG. 16C shows another embodiment wherein lighter transition metals C and heavy transition metals D such as the heavy transition metal lanthanides and actinides are separated from a mixture 990E in vat 1 that includes other species or particles E. This separation through magnetic separator 960A leaves mixture 990F in vat 2. Once this first separation occurs, heavy transition metals D are then separated from lighter transition metals C with the use of ligands 999A forming complexes 1000 with either lighter transition metals C or heavy transition metals D (complexes 1000 with heavy transition metals D are shown in FIG. 16C). In FIG. 16C complexes 1000 pass through magnetic separator 970A more easily than the lighter transition metals D, this separation leaving mixture 990G in vat 3. In FIG. 16C magnetic separators 960A and 970A are shown separating vat 1 from vat 2 and vat 2 from vat 3, respectively.

Figure 16D:
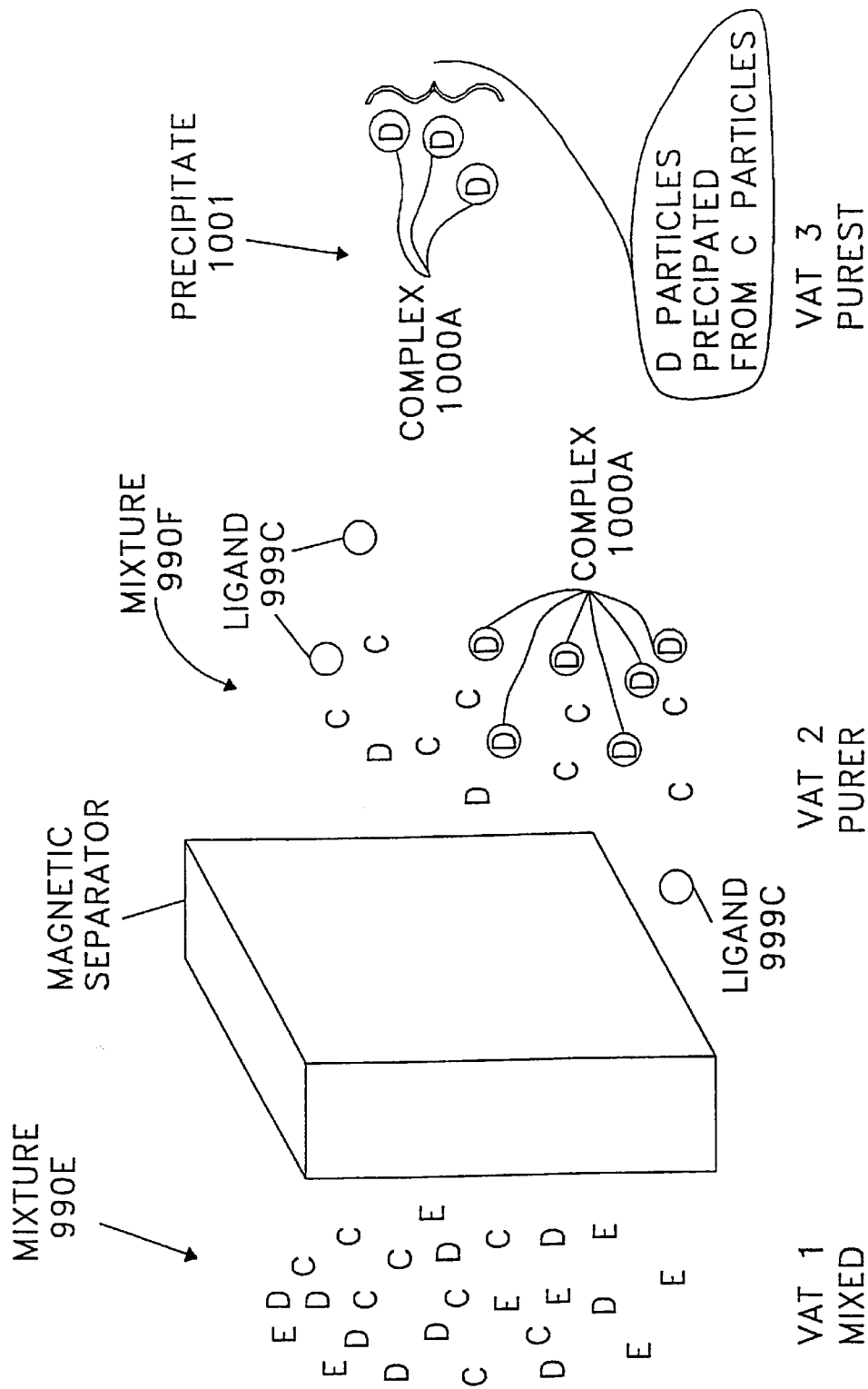
FIG. 16D shows two vats separated by a magnetic separator used to separate mixtures that combines separation similar to FIG. 14D with separation using a ligand to form complexes that aid in the separation along with particle precipitation.

FIG. 16D shows an alternative embodiment without magnetic separator 970A or vat 3 having mixture 990G. In this embodiment starting from mixture 990E in vat 1, magnetic separator 960A separates lighter transition metals C and heavier transition metals D from other species or particles E leaving mixture 990F in vat 2. In vat 2 ligands 999C form complexes 1000A only with heavy transition metals D. Complexes 1000A facilitate the precipitation of heavy transition metals D as precipitate 1001 as shown in FIG. 16D. In this way heavy transition metals D are separated from lighter transition metals C. Note that in facilitating the precipitation of heavy transition metals D as precipitate 1001, complexes 1000A may or may not precipitate along with heavy transition metals D (i.e., complexes 1000A may or may not separate into ligands 999C and heavier transition metals D while the precipitation is occurring). It is to be understood that other ligands that are different from ligands 999A or 999C may be used in addition to ligands 999A or 999C to form complexes with lighter transition metals C to aid in the separation of lighter transition metals C from heavier transition metals D, although this is not shown in either FIGS. 16C or 16D.

Figure 19:
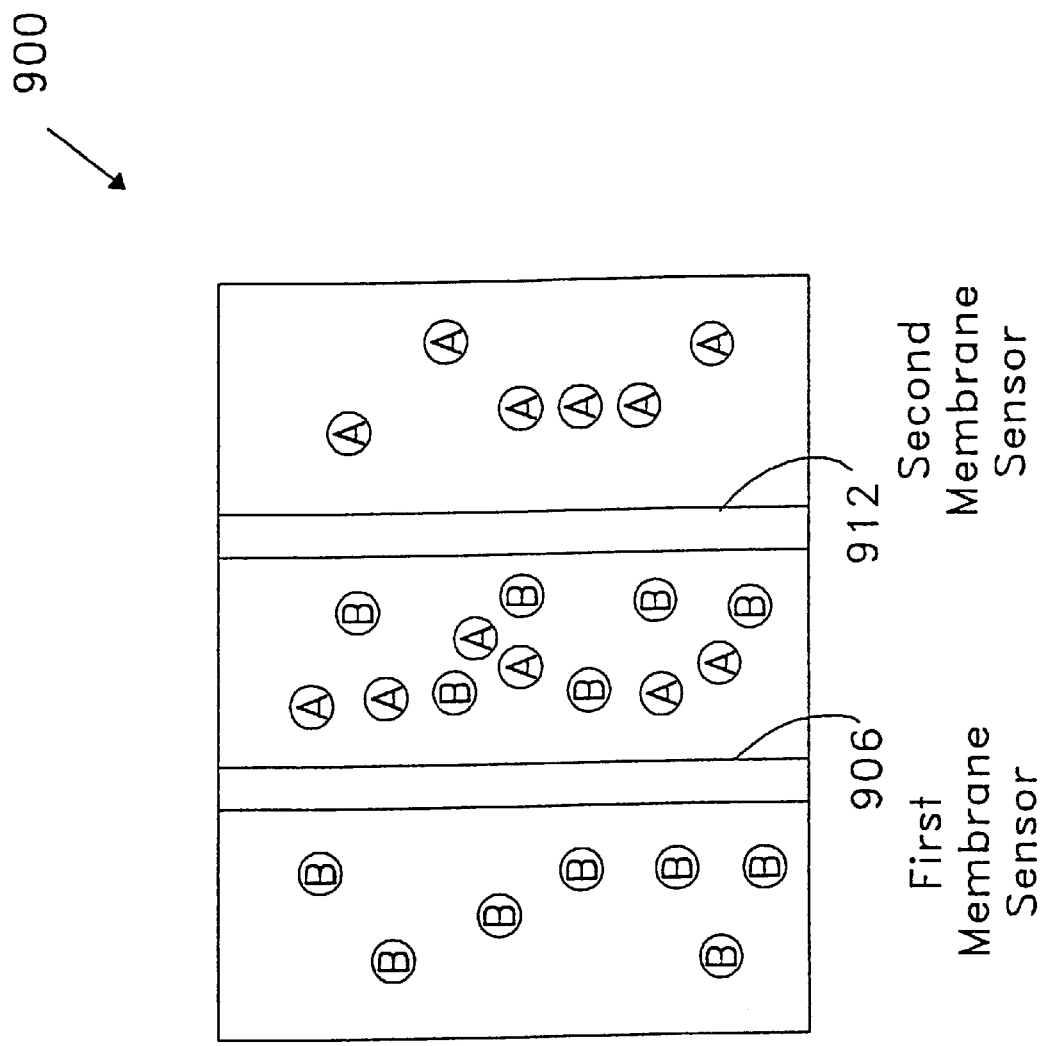
FIG. 19 shows a dual sensor 900 for distinguishing between a first species (particles A) and a second species (particles B).

All of the embodiments discussed above in relation to FIGS. 14D, 16A, 16B, 16C, and 16D correspond to the embodiments shown in FIGS. 16 and 19 and discussed herein which were also included in the parent application, i.e., copending U.S. application Ser. No. 08/294,797 filed Aug. 25, 1994.

Additional variations of the illustrations involving different configurations of vats, magnetic separators, mixtures, and/or ligands or chelating agents may be envisioned by those skilled in the art. These variations include the use of different magnetic separators between any of the vats, different ligands within each vat forming complexes with particular species or types of species therein, different ligands associated with any of the magnetic separators that form complexes with particular species or types of species, or other vectors or separators in 2 or 3 dimensions, or any other variations that would occur to those skilled in the art.

More complex systems than those illustrated in FIGS. 16A–16D may be envisioned to separate materials, e.g., combined density gradients, thermal gradients, magnetic composite gradients, etc. (with or without vectorial transport), but not limited thereto. For example, complex matrices may be employed if there exists a mixture having iron species and heavier transition metals therein. In these matrices, by separating according to size and weight, it may be possible to better separate these materials from other materials. After the initial separation, separation of iron from the heavier transition metals would be enhanced in the matrices by specifically adding charge and change of charge with the use of electrolysis. Iron is more readily electrolyzed than the heavier transition metals, so despite being collected in the initial separation with the heavier transition metals, it can be removed by electrolysis to either plate out, or change its number of unpaired electrons so as to change its magnetic moment, whereby it could be separated out on the next step.

In the above discussion with respect to FIGS. 15 and 16, the greater the number of boundary regions 33 per unit area (i.e., the smaller S), the greater the effects due to the presence of boundary regions 33 macroscopically manifest themselves. S can vary from fractions of a micrometer to hundreds of micrometers. In quantum systems with smaller structures, S is further reduced to less than approximately 10 nm.

Design paradigms are summarized below to aid in tailoring composites for specific transport and selectivity functions:

Forces and gradients associated with interfaces, which are of no consequence in bulk materials, can contribute to and even dominate the transport processes in composites.

Increasing the microstructure of composites can enhance the influence of interfacial gradients.

The closer a molecule or ion is placed to the interface, the stronger the effect of the interfacial field on the chemical moiety. Systems should be designed to concentrate molecules and ions near interfaces.

The ratio of surface area for transport to volume for extraction parameterizes surface transport.

Fields in a microstructural environment can be nonuniform, but locally strong.

Strong but short range electrostatic and magnetic fields are better exploited in microstructured environments than in systems with externally applied, homogeneous fields.

Vectorial transport is plumbed into microstructured matrices by coupling two or more field or concentration interfacial gradients, the result being advantageous compared to homogeneous matrices; the largest effects will occur when the gradients are either perpendicular or parallel to each other.

Control of surface dimensionality (fractality) is critical in optimizing surface transport in composites.

Several advantages are inherent in ion exchange composites over simple films. First, composites offer properties not available in simple films. Second, composites are readily formed by spontaneous sorption of the ion exchanger on the substrate. Third, while surfaces dominate many characteristics of monolayers and composites, three-dimensional composites are more robust than two-dimensional monolayers. Fourth; interfaces influence a large fraction of the material in the composite because of the high ratio of surface area to volume. Fifth, composites offer passive means of enhancing flux; external inputs of energy, such as stirring and applied electric and magnetic fields, are not required. Sixth, local field gradients can be exploited in composites because the fields and molecular species are concentrated in a micro-environment where both the decay length for the field and the microstructural feature length are comparable. In some of the composites, the field may be exploited more effectively than by applying an homogeneous field to a cell with an external source.

SPECIFIC EXAMPLES

Fuel Cells

It would be very beneficial to achieve high efficiency compressor/expander power recovery technology. One way to improve the efficiency of the compressor/expander would be to reduce the pressure requirement. If a passive pressurization process could be provided within a fuel cell itself, at no cost to the power output of the fuel cell, power production from present day fuel cells would be increased by approximately 20%.

Magnetically modified cathodes may reduce the need for pressurization as oxygen is paramagnetic. The field may also alter oxygen kinetics as discussed below. Potential shifts of +35 mV to +100 mV represent a 5% to 15% improvement in cell efficiency and comparable savings in weight and volume. Also, in fuel cells, as hydrated protons cross the cell, the cathode floods and the anode dehydrates. Water transport may be throttled by composite separators of graded density and hydration.

In addition to the probability of enhancing flux at a magnetically modified electrode, oxygen reduction kinetics in the case of fuel cells may be altered. The kinetics for oxygen reduction are outlined here:

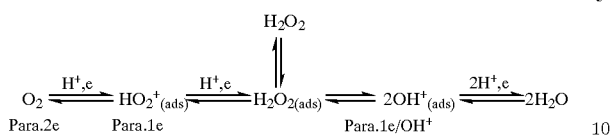

There is a difficulty with the oxygen reduction kinetics that arises, in large part, because $H_{2I\ O2}$ (peroxide) desorbes as peroxide in solution, and does not dissociate on the catalyst surface to form 2OH. Peroxide is not paramagnetic, but $HO_2$ and OH are paramagnetic. However, the presence of a magnetic field will tend to stabilize the $HO_2$, slowing the formation of peroxide. Once adsorbed peroxide is formed, the magnetic field will shift the equilibria in a direction that favors the formation of 2OH. This should drive a larger fraction of the reacting molecules toward the formation of water, where the full potential of oxygen reduction can be realized as discussed above in regard to $E^0_{cathode}$ for water formation and $E^0_{H2O2}$. For these reasons, oxygen will be susceptible to the enhancements that have been observed from other similar paramagnetic species as discussed above.

It may also be important to make a fuel cell with little or no thermal signature, especially in an environment, where, for instance, a minimal thermal signature would be beneficial. Fuel cells are operated at temperatures approaching 100° C. to improve kinetic efficiency. While this temperature is much lower than the temperatures of other refuelable power sources such as internal combustion engines (about 400° C.), 100° C. is still hotter than the human body (about 37° C.) or ambient temperature. However, if kinetic efficiency is improved by a magnetically modified cathode, then fuel cell operating temperatures can be lowered toward ambient temperature without substantial effect on power output. Also, magnetic effects will be larger at lower temperatures. A fuel cell mounted on highly thermal conductive materials, like materials used on the Space Shuttle, might be a way to maintain its temperature closer to body or ambient temperature. Note that although a reduced thermal signature and a reduced operating temperature may be desirable for a fuel cell, there may be an optimal operating temperature for the fuel cell based on performance enhancements, and the method of reducing the thermal signature may have to be accommodating thereof.

The following summarizes some of the salient advantages and features of an ambient pressure PEM fuel cell in operation according to the instant invention:

Reduces the weight of the fuel cell system by removing the compressor pumps;

Reduces the size of the fuel cell system by removing compressor pumps and reduces the size of the fuel cell stack required to reach the same output power;

Allows the production of fuel cells that are ⅜ inches thick and as flexible as a plastic transparency;

Increases the efficiency of the fuel cell system by 20%;

Increases the voltage—may be driven by a positive shift in the cathode potential or improved kinetics associated with shorter lifetimes of $H_2O_2$ adsorbed on the electrode surface with the reaction equilibria shifted toward formation of OH;

Reduces the likelihood of system failure by removing all mechanical parts, i.e., removing mechanical pumps;

Lowers operating temperature—reduces the thermal signature by improving the performance at lower operating temperatures; fuel cells are normally run at higher temperatures to improve the oxygen reduction kinetics, but if kinetic enhancement occurs, then the fuel cell operating temperature can be lowered without a net performance reduction; magnetic effects are larger at lower temperatures which may increase the flux of oxygen even greater and, therefore, make up for performance deficits associated with lower fuel cell operating temperature;

Is scalable—can be used with the same effect on any size fuel cell stack; and

Increases the mean time between failures (MTBF) of the power system by removing mechanical pumps.

It is important to recall that the above advantages and benefits are achieved while eliminating the need for compressor pumps. Also, if the potential shift or kinetic enhancement are not realized to their fully anticipated degree, then the fuel cell will still operate more efficiently with the flux enhancement that is produced. The minimum result will be a fuel cell that operates at the same performance level of current fuel cells without the added weight of the compressor pumps and the 15% parasitic power loss associated with running the pumps.

In a PEM fuel cell (or in any other apparatus requiring an electrode described herein or otherwise) it may also be beneficial to tailor the electrode-magnetic composite interface for electrical conductivity. For example, the direct coating of the magnetic beads of the composite with platinum or any other conductor, or semiconductor, or superconductor may significantly increase electrical conductivity of the interface over a random mixing of magnetic beads with fixed quantities of carbon and platinum (or any other conductor, or semiconductor, or superconductor (e.g. carbon) and catalyst (e.g. platinum), hereinafter referred to simply as electron conductor plus catalyst). It would then be possible to test and evaluate oxygen reduction at magnetically and electrically modified electrodes made with platinum-coated magnetic microbeads mixed with carbon.

Platinum coating of the beads could be accomplished by sputtering platinum on the beads or by any means known in the art. The oxygen reduction results of the directly coated bead system may be compared to oxygen reduction at electrodes made by mixing carbon and platinum powder with magnetic beads, and a determination made as to whether platinum-coated beads offer significant enhancement over the simple mixture. To optimize the magnetic bead fraction and platinum content, the point at which increasing the platinum content does not significantly increase oxygen reduction would be determined, as well as the point at which increasing the magnetic bead content (fraction) does not increase flux or becomes unstable. All the above results would be compared to similar results obtained for platinum electrode-magnetic composite interfaces.

Carbon Particle/Catalyst Magnetic Composites

There now follows a description of an embodiment of the invention which includes the incorporation of carbon particles in association with a catalyst in the cathode interface, and the effects thereof on enhancement of oxygen reduction. An example of a catalyst which may be used in this context is platinum. However, other catalysts that can be employed include palladium, ruthenium, and rhodium, as well as other transition metals including cobalt and nickel. Other species could also catalyze the reaction such as porphyrins.

It is known that power generation by hydrogen oxygen fuel cells is limited by poor kinetics for oxygen reduction at the cathode. Usually, the oxygen feed is pressurized to shift the reduction of oxygen toward product formation, water. As discussed above, the incorporation of magnetic material into the cathode of a fuel cell represents a means of passive pressurization of oxygen, because oxygen is paramagnetic (susceptible to a magnetic field) and is moved into the cathode interface by the presence of the magnetic material. In a refinement of the invention, platinized carbon particles, as well as magnetic particles or microbeads, may be incorporated into the cathode interface, as described in more detail below.

Studies of oxygen reduction have shown that the cyclic voltammetric current is enhanced in the presence of magnetic microbeads incorporated at the cathode interface. The current at the magnetically modified electrodes is about five times as large as the current at electrodes modified with only an ion exchange polymer such as Nafion. Enhancements increase with volume fraction of magnetic beads. The oxygen enhancement is observed when carbon containing a platinum catalyst is included along with the magnetic beads and the Nafion.

Thus, according to one embodiment of the invention, a cathode interface for oxygen reduction may be optimized by incorporating a magnetic composite material comprising magnetic particles or microbeads, an ion exchange polymer (e.g. Nafion), and platinized carbon particles, into the cathode interface. This may impact the performance of fuel cells in two ways. First, the cathode is pressurized to increase the concentration of oxygen in the cathode interface. This increases reactant concentration which, by Le Chatelier's principle, should shift the reduction toward products. In an ambient air feed this also helps to displace the nitrogen gas which builds up in the cathode as the oxygen is depleted from air and the unreactive nitrogen is left behind. Second, one of the loss mechanisms for the oxygen reduction is partial reduction to peroxide ($H_2O_2$), which then desorbs from the electrode surface before completing its reduction to water. The scheme is as shown below.

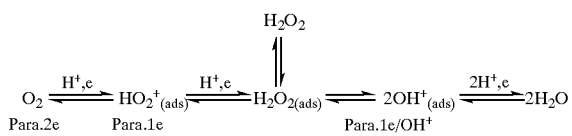

The $H_2O_2$ includes both $H_2O_2$ (absorbed) and $H_2O_2$ (solution). The loss of peroxide to solution may be diminished through the paramagnetic properties of the species on either side of $H_2O_2$ (adsorbed) in the reaction scheme. If magnetic fields stabilize $HO_2$ and drive the adsorbed peroxide to dissociate on the surface to form 2 adsorbed paramagnetic HO's, then the lifetime of adsorbed $H_2O_2$ will be decreased and so should the loss through desorption to $H_2O_2$ (solution). The net effect is therefore an increase in the final step in the reaction scheme, i.e. reduction to water. Cyclic voltammetric results for oxygen reduction using an electrode having both magnetic microbeads and platinized carbon particles incorporated into the electrode interface are discussed hereinbelow with reference to FIG. 21.

PEM Fuel Cell Design

Another revolutionary aspect of an ambient pressure PEM fuel cell is the opportunities that it opens up in packaging design. Currently, PEM fuel cells must be encased within a rigid structure in order to contain the pressure applied to the cathode side of the fuel cell. But, the ambient pressure fuel cell increases the flux of oxygen without an external pressurization requirement. This means that the rigid outer encasement is no longer needed.

PEM fuel cells are inherently amenable to being flexible. The cell itself consists of an anode and cathode separated by an ion exchanger (usually, but not restricted to, Nafion). A fuel cell with a magnetically modified cathode as discussed above which draws air into the cathode from the atmosphere without compression could be formed with an outside covering similar to the porous vegetable bags made of polyethylene or similar polyalkene or other polymer comprised of a hydrocarbon material. Or the fuel cell could be confined to different geometries and volumes, and may be flattened again for use or can be used in the confined geometry. Or the nonpressurized cell could have thin plastic outer surfaces and would be approximately as flexible as an overhead transparency.

The cell would be thin and flexible, about the size of an 8.5×11 inch piece of paper. While consuming a very small volume of fuel, this would provide more than enough power to run lap-top or notebook computers with or without color displays. Lap-tops and notebooks are currently designed to run on approximately 30 Watts. The fuel cell could be used to run a wide variety of portable electronic devices, such as voice and message communications, GPS devices, navigation systems, cameras, etc. A fuel cell with no mechanical pumps, able to sustain good cathode performance could replace batteries in many systems where small, light-weight, flexible, adaptive power sources are needed.

Another possible embodiment of fuel cells could involve forming an array of fuel cells. For example with reference to FIG. 16E, in a single sheet 1210 of fuel cells 1220, one of the advantages is that single sheet 1210 can contain several fuel cells 1220 thereon. By configuring fuel cells 1220 in different serial 1200A and parallel 1200B arrangements (see FIG. 16E), fuel cell sheet 1210 can be used to meet a wide variety of different power demands. For example, single fuel cell sheet 1210 can substitute for a wide range of different batteries. If single sheet 1210 were divided into, for example, 9 small cells of 1 Volt and 25 Amps each, the cells can be connected in different ways. If the nine cells are connected in series, the system will produce 9 Volts and 25 Amps; if the cells are connected in parallel, they will produce 1 Volt and 225 Amps; and if the cells are connected as a series connection of three sets of three cells in parallel, they will produce 3 Volts and 75 Amps.

Oxygen Concentrators

Another possible application of magnetically modified electrodes or cathodes involving flux enhancement of oxygen relates to the more general problem of concentrating oxygen from the air. The concentration of oxygen in this case amounts to separating oxygen from nitrogen. This problem may be solved using the magnetically modified electrode or cathode technique or other separation techniques discussed above and herein. Currently, the separation of oxygen from air is done cryogenically which is a costly undertaking. In a magnetic membrane system where the membrane is placed between ambient (~20% oxygen in air) air and an inner vat (or volume), and the oxygen is immediately swept from the inner vat, a concentration gradient of oxygen is established across the membrane, and oxygen is preferentially drawn into the inner volume from the ambient air.

Membrane Sensors

Membrane sensors for the paramagnetic gases $O_2$, $NO_2$, and NO (recently identified as a neurotransmitter) could be based on magnetic composites where enhanced flux would reduce response times and amplify signals. Sensors for other analytes, where oxygen is an interferant, could distinguish between species by using dual sensors, identical except one sensor incorporates a magnetic field. Examples of these sensors could be optical, gravimetric, or electrochemical, including amperometric and voltammetric. In sensors, the measured signal is proportional to the total concentration of all species present to which the sensor responds. The presence of a magnetic component in the sensor will enhance sensitivity to paramagnetic species. Through a linear combination of the signal from two sensors, similar in all respects except one contains a magnetic component, and the sensitivity of the magnetic sensor to paramagnetic species (determined by calibration), it is possible to determine the concentration of the paramagnetic species. In a system where the sensors are only sensitive to one paramagnetic and one diamagnetic species, it is possible to determine the concentration of both species.

Flux Switches

As nanostructured and microstructured materials and machines develop into a technology centered on dynamics in micro-environments, flux switches will be needed. Externally applied magnetic fields can actuate flux switches using electrodes coated with composites made of paramagnetic polymers and Fe/Fe oxide or Fe particles or other non-permanent magnetic material, or internal magnetic fields can actuate flux switches using electrodes coated with composites made of electro-active polymers or liquid crystals, where one redox form is diamagnetic and the other is paramagnetic, and organo-Fe or other superparamagnetic or ferrofluid materials or permanent magnetic or aligned surface magnetic field material. Also, an external magnet can be used to orient paramagnetic polymers and liquid crystals in a composite containing paramagnetic magnetic beads. Enhanced orientation may be possible with magnetic beads containing superparamagnetic or ferrofluid materials.

As discussed above, flux switches may be important components of the small scrubber embodiment of the invention described above. They may be important for delivery of drugs, biomaterials or medical dosing in a living organism, where an external or internal magnetic field may turn on/off a flux switch to enable delivery of drugs or biomaterials. Flux switches may also be important in imaging applications as already discussed.

As an extension of the concept of passive oxygen pressurization of fuel cell cathodes, the more general problem of concentration of oxygen from the air may be similarly solved. Currently, this is done cryogenically which is a costly undertaking. Essentially, the process of oxygen concentration according to one embodiment of the invention involves the separation of $O_2$ from $N_2$ using the magnetically modified electrode and separation techniques described above.

Batteries

Batteries with increased current densities and power, as well as decreased charge and discharge times may be made with magnetic bead composites. The improvements would be driven by flux enhancement, transport enhancement, electron kinetic effects, or by capitalizing on a potential shift. The required mass of microbeads would little affect specific power. Since magnetic fields can suppress dendrite formation, secondary battery cycle life may be extended. (Note that suppression of dendrite formation may also be important in plating dense films of lanthanides and actinides.)

The main mechanism of failure for rechargeable batteries is the formation of dendrites. Dendrites are conducting deposits that build-up between the two electrodes in the battery during cycling which will eventually short out the cell. It has been shown in tests that an externally applied magnetic field can suppress dendrite formation.

Therefore, an improved battery may include magnetically modified or coated electrodes that prevent or suppress dendrite formation. The magnetic coatings may be on the electrodes or elsewhere in the battery structure. As discussed above, a magnetic field can be established directly at the electrode surface by modifying the electrode surface with a composite of ion exchanger (polymeric separator) and magnetic particles, eliminating the need for a large external electromagnet to provide the necessary magnetic field (although in certain circumstances an externally applied magnetic field may be desirable or useful). Modifying the electrode produces a negligible increase in cell weight (<1%). Also, the flux of ions and molecules through these composites is enhanced substantially compared to the flux through the separator alone.

Using magnetic composites in rechargeable battery systems, three potential and significant improvements in battery performance are anticipated:

1. Cycle life will be enhanced because of the suppression of dendrite formation by the magnetic field at the surface of the electrodes;
2. Recharge time will be decreased (recharge rate increased) by as much as ten-fold due to the flux enhancements; and
3. Transient power output will be higher by as much as ten-fold and the discharge of power will be more rapid due to the flux enhancements.

The charging time is decreased and the transient power is increased to the extent that the motion of ions and molecules in the cell limits performance. A ten-fold (and possibly higher in some cases) enhancement in ion and molecule motion has already been demonstrated in the magnetic composites.

In a protracted use situation, the cycle life of a battery will be important. Cycle life will be enhanced by establishing a magnetic field at the electrode surface. As cycle life has not been tested with the composites of the type already discussed, it is not yet clear how much it would be improved. However, a few-fold improvement in cycle life is likely.

The technological advantages that will be seen include:

1. A negligible increase in size and weight (<1%), approximately 5–6 lbs;
2. The simplicity of modifying and the compatibility with existing battery technology; and
3. An insignificant cost of materials to change current battery technology (a few cents per battery).

The electrode modification should be useful in a wide variety of battery types, including zinc and copper batteries. In these battery types an externally applied magnetic field has demonstrated suppression of zinc and copper deposit dendrite formation.

To demonstrate the suppression of dendrite formation, an electrode must first be modified with a magnetic composite. Once the electrode is available, dendrite formation suppression is tested with the electrode in solution. Such tests provide a ready method for examining the feasibility of magnetic composites in a wide variety of battery systems.

Tests are then performed to test the magnetic composites in a two electrode battery system. The fraction of the magnetic particles needed is optimized and the depth of the separator that should contain magnetic particles is determined. Then an evaluation of cycle life, charging time, discharging time, power transients, weight change, size change, and cost is made for comparison with a system containing no magnetic particles. Once a cell is constructed using magnetically modified electrodes that shows improvements in cycle life, charging time, and power transients, the long term stability of the cell is an issue that must also be evaluated.

The process just described can be used to create a battery that is light-weight, more efficient, and a longer lasting power source than conventional batteries with unmodified electrodes. This, coupled with a greatly increased power output, will allow the operation of apparatus requiring battery power for extended periods of time. Also, more equipment may be operated with this battery at one time than with a conventional battery.

Methods of Making the Electrode

Figure 17:
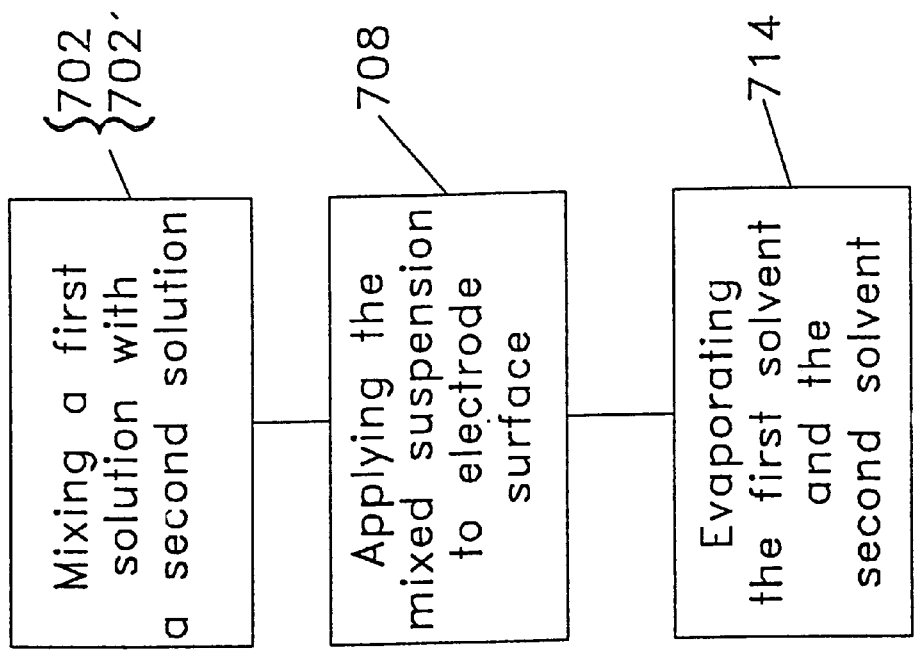
FIG. 17 is a short summary of steps involved in a method of making an electrode according to two embodiments of the invention.

FIG. 17 is a short summary of steps involved in a method of making an electrode according to two embodiments of the invention. In one embodiment, the method is a method of making an electrode with a surface coated with a magnetic composite with a plurality of boundary regions with magnetic gradients having paths to the surface of the electrode according to one embodiment of the invention. In particular step 702 involves mixing a first component which includes a suspension of at least approximately 1 percent by weight of inert polymer coated magnetic microbeads containing between approximately 10 percent and approximately 90 percent magnetizable material having diameters at least about 0.5 μm in a first solvent with a second component comprising at least approximately 2 percent by weight of an ion exchange polymer in a second solvent to yield a mixed suspension. Step 708 then involves applying the mixed suspension to the surface of the electrode. The electrode is arranged in a magnetic field of at least approximately 0.05 Tesla, wherein the magnetic field has a component oriented approximately along the normal of the electrode surface and preferably is entirely oriented approximately along the normal of the electrode surface. Step 714 then involves evaporating the first solvent and the second solvent to yield the electrode with a surface coated with the magnetic composite having a plurality of boundary regions with magnetic gradients having paths to the surface of the electrode.

Step 702 can include mixing the first component which includes a suspension of between approximately 2 percent and approximately 10 percent by weight of inert polymer coated magnetic microbeads with the second component. Alternatively, step 702 can include mixing the first component which includes inert polymer coated magnetic microbeads containing between 50 percent and 90 percent magnetizable material with the second component. Alternatively, step 702 can include mixing the first component which includes inert polymer coated magnetic microbeads containing 90 percent magnetizable material with the second component.

In addition, step 702 can include mixing a first component which includes a suspension of at least approximately 5 percent by weight of inert polymer coated magnetic microbeads containing between approximately 10 percent and approximately 90 percent magnetizable material having diameters ranging between approximately 0.5 μm and approximately 12 μm with a second component. Alternatively, step 702 can include mixing a first component which includes a suspension of at least approximately 5 percent by weight of inert polymer coated magnetic microbeads containing between approximately 10 percent and approximately 90 percent magnetizable material having diameters ranging between approximately 0.1 μm and approximately 2 μm with a second component.

Mixing step 702 can also involve mixing a first component which includes a suspension of at least approximately 5 percent by weight of inert polymer coated magnetic microbeads containing between approximately 10 percent and approximately 90 percent magnetizable material having diameters at least 0.5 μm in a first solvent with a second component comprising at least approximately 5 percent by weight of Nafion in a second solvent to yield the mixed suspension.

Step 702 can involve mixing a first component which includes a suspension of at least approximately 5 percent by weight of inert polymer coated magnetic microbeads containing between approximately 10 percent and approximately 90 percent organo-Fe material having diameters at least 0.5 μm in a first solvent with a second component comprising at least approximately 5 percent by weight of an ion exchange polymer in a second solvent to yield the mixed suspension.

Step 708 can include applying approximately between 2 percent and approximately 75 percent by volume of the mixed suspension to the surface of the electrode. Alternatively, step 708 can include applying between 25 percent and 60 percent by volume of the mixed suspension to the surface of the electrode. In yet another approach step 708 can involve applying the mixed suspension to the surface of the electrode, the electrode being arranged in a magnetic field between approximately 0.05 Tesla and approximately 2 Tesla and preferably the magnetic field is approximately 2 Tesla.

An alternative embodiment involving steps 702' through 714' (also shown in FIG. 17) involves the use of an external magnetic field. That is, again the method of making an electrode with a surface coated with a composite with a plurality of boundary regions with magnetic gradients having paths to the surface of the electrode when the external magnetic field is turned on. The steps 702 through 714 are then modified into steps 702' through 714' as follows. Step 702' involves mixing a first component which includes a suspension of at least 5 percent by weight of inert polymer coated microbeads containing between 10 percent and 90 percent magnetizable non-permanent magnetic material having diameters at least 0.5 μm in a first solvent with a second component comprising at least 5 percent of an ion exchange polymer in a second solvent to yield a mixed suspension. Step 708' then involves applying the mixed suspension to the surface of the electrode. Step 714' involves evaporating the first solvent and the second solvent to yield the electrode with a surface coated with the composite having a plurality of boundary regions with magnetic gradients having paths to the surface of the electrode when the external magnet is turned on.

A method for making a composite comprising carbon particles in association with a catalyst, such as platinum, and which is tailored to enhancing oxygen reduction current at an electrode, is outlined below. In general, this protocol is similar to that outlined above with reference to FIG. 17, with the exception that carbon particles with some degree of loading of a catalyst, for example, platinum, are included in the casting mixture. Briefly, the procedure is as follows:

Step 1) A casting mixture is formed comprising the following components:
i. a suspension of an ion exchange polymer, such as Nafion, ii. magnetic particles or microbeads, which may be coated to render them inert,
iii. carbon particles in association with a catalyst, typically platinum. Other examples of catalysts were provided above.
iv. at least one casting solvent Depending, among other factors, on the particular application or intended use, magnetic composites may be formed according to the procedure outlined above wherein the composite comprises from about 85% to about 0.01% by weight of magnetic material, and from about 15% to about 99.99% by weight of an ion exchange polymer. The magnetic material component in the casting mixture which is used to make-up the composite may be in the form of magnetic particles, beads or microbeads of iron oxides (e.g. $Fe_2O_3$, $Fe_3O_4$) or of other magnetic materials, and may be coated or non-coated (encapsulated or non-encapsulated).

The amount of catalyst present in association with the carbon particles may be varied over a fairly broad range, according to, among other things, other parameters associated with formulation of the casting mixture, for example the percentages of Nafion, carbon particles, and magnetic microbeads present in the casting mixture. The amount of catalyst present in association with the carbon particles may range, for example, from about 5% (by weight) to about 99.99% (by weight) of the combined weight of the carbon particles plus catalyst. In the case of platinum comprising the catalyst in association with the carbon particles, the platinum may be present primarily or solely on the surface of the carbon particles. (Alternatively, platinum can be used as catalyst and conductor instead of the carbon. The amount of the carbon particles in association with a catalyst component of a magnetic composite may range from 0.01% to about 80% by weight (or mass) of the total weight of the magnetic composite.

Another variable in formulating the casting mixture and in the method of making the electrode is the size and type of the carbon particles. Preferably, the carbon particles are in the range of 15 μm to 70 μm. It should also be noted that, according to another embodiment of the invention, particles containing platinum could be used as a component of the magnetic composite, either in lieu of, or in addition to, the carbon particles in association with a catalyst component. Such particles containing platinum may lack a carbon constituent, or may be composed predominantly or solely of platinum (i.e. up to 100% platinum). In the latter case the particles composed predominantly or solely of platinum may function as a catalyst and/or as electron conductors, and may serve a dual role as both catalyst and electron conductors. The particles a containing platinum component of the composite may comprise as little as about 0.1% of platinum by weight. The particles containing platinum component of the composite may also consist essentially of platinum with trace amounts of other materials, such as carbon (e.g. 99.99% platinum and 0.01% carbon). Thus there may be a continuum between carbon particles in association with a catalyst, wherein the catalyst is platinum, and particles containing platinum, wherein the particles containing platinum comprise carbon. (Increasing the platinum content of a composite would likely result in increased cost of materials used in its manufacture.)

Step 2) The casting mixture is thoroughly agitated, for example by sonication or stirring with a mechanical stirring device, and an aliquot is transferred to the electrode surface. The electrode serves as a current collector. At this stage, before the casting solvent(s) evaporate, the electrode may be placed in a magnetic field. Such a magnetic field orients the magnetic particles and gives rise to an ordered structure. (There is some evidence that an external magnetic field is unnecessary.)

Step 3) The external magnet, if any, is removed leaving behind a magnetic composite on the current collector.

Step 4) The modified electrode may now be placed in a matrix, e.g. in solution, where oxygen is fed to the current collector through the magnetic composite from the solution or other matrix.

Figure 18A:
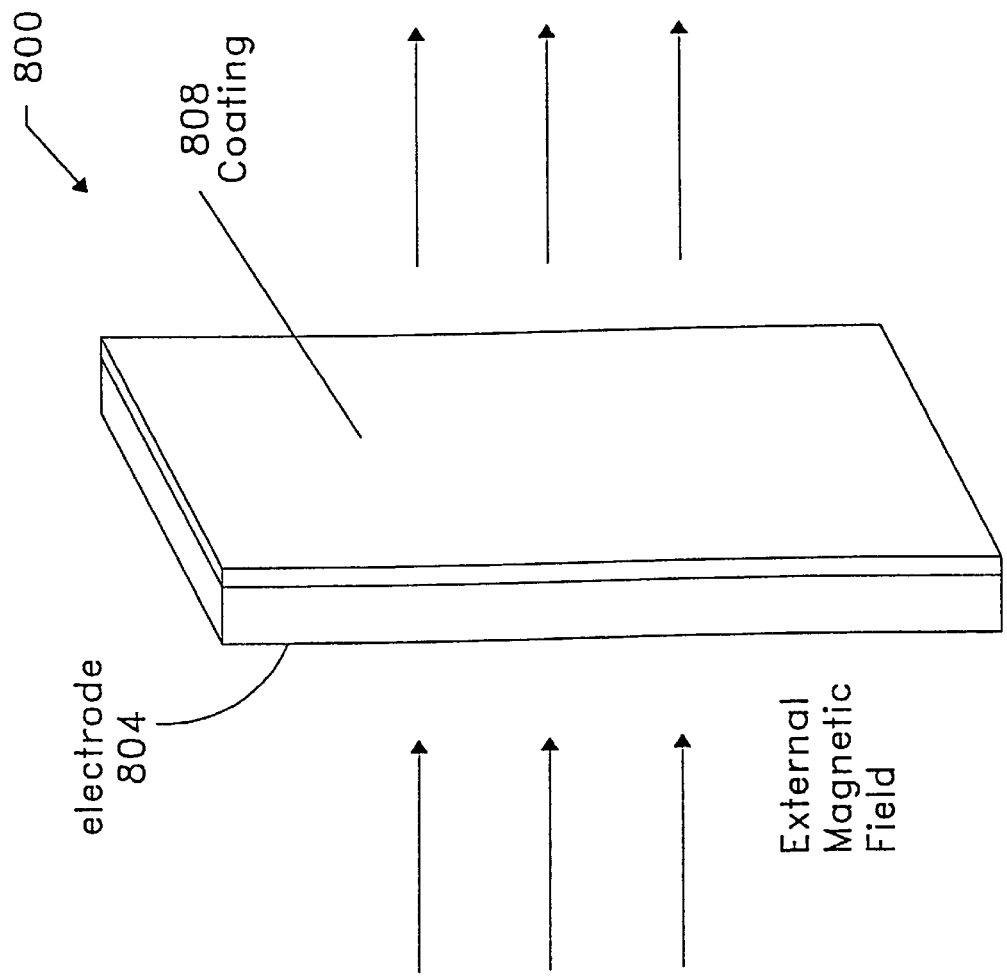
FIGS. 18A and 18B show a flux switch 800 to regulate the flow of a redox species according to yet another embodiment of the invention.
Figure 18B:
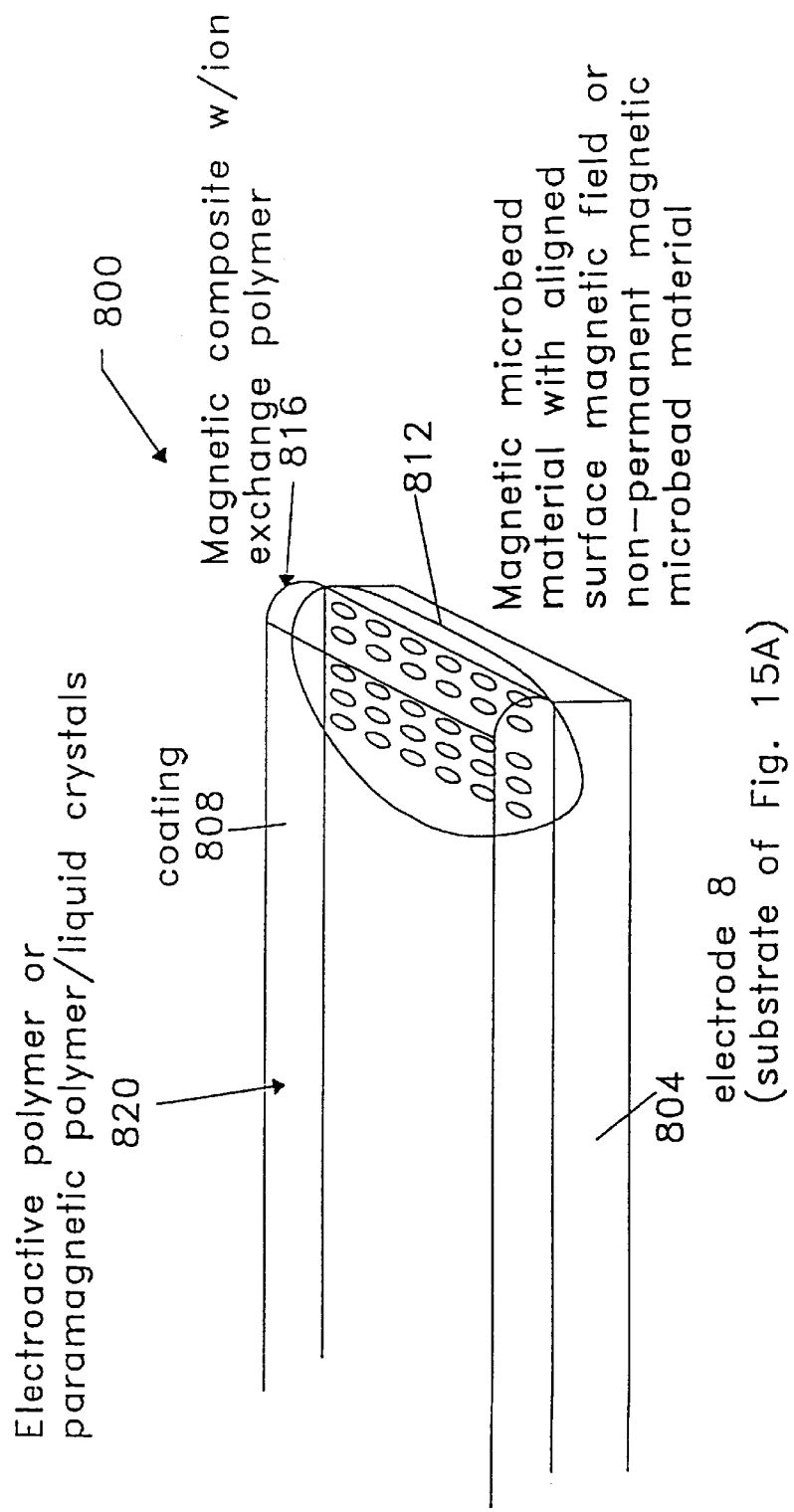

FIGS. 18A and 18B show a flux switch 800 to regulate the flow of a redox species according to yet another embodiment of the invention. In particular, FIGS. 18A and 18B show an electrode 804 and a coating 808 on the electrode 804. Coating 808 is formed from a composite which includes magnetic microbead material 812 with an aligned surface magnetic field; an ion exchange polymer 816; and an electro-active polymer 820 in which a first redox form is paramagnetic and a second redox form is diamagnetic, wherein the flux switch is actuated by electrolyzing the electro-active polymer from the first redox form ordered in the magnetic field established by the coating to the second redox form disordered in the magnetic field.

Microbead material 812 can include organo-Fe material. The redox species can be more readily electrolyzed than the electro-active polymer. Electro-active polymer 820 can be an electro-active liquid crystal with chemical properties susceptible to said magnetic field or an electro-active liquid crystal with viscosity susceptible to said magnetic field. Electro-active polymer 820 includes an electro-active liquid crystal with phase susceptibility to said magnetic field. Electro-active polymer 812 can include polyvinyl ferrocenium). In addition, magnetic particles or microbeads can comprise organo-Fe material.

FIG. 19 shows a dual sensor 900 for distinguishing between a first species (particles A) and a second species (particles B). The dual sensor includes a first membrane sensor 906 which preferentially passes the first species over the second species; and a second membrane sensor 912, which preferentially enhances the concentration of the second species over the first species, thereby enabling the measurement of at least the first species. The first and second species can be in any state such as liquid, gaseous, solid and plasma.

In one embodiment of the dual sensor, the first species can include a paramagnetic species and the second species can include a diamagnetic species. In this case, the first membrane sensor 906 is a magnetically modified membrane sensor, and the second membrane sensor 912 is an unmodified membrane sensor. The magnetically modified membrane sensor preferentially enhances the concentration of and allows the detection of the paramagnetic species over the diamagnetic species and the unmodified membrane sensor enhances the concentration of and allows the detection of the diamagnetic species and the paramagnetic species, enabling the measurement of the concentration of at least the paramagnetic species. More particularly, the paramagnetic species can be one of $O_2$, $NO_2$, and NO. The diamagnetic species can be $CO_2$.

In another embodiment, the first species can include a paramagnetic species and the second species can include a nonmagnetic species. In this case, the first membrane sensor 906 is a magnetically modified membrane sensor, and the second membrane sensor includes an unmodified membrane sensor. The magnetically modified membrane sensor preferentially enhances the concentration of and allows the detection of the paramagnetic species over the nonmagnetic species and the unmodified membrane sensor enhances the concentration of and allows the detection of the nonmagnetic species and the paramagnetic species, thereby enabling the measurement of the concentration of at least the paramagnetic species. More particularly, the paramagnetic species can be one of $O_2$, $NO_2$, and NO.

In yet another embodiment, the first species can include a diamagnetic species and the second species can include a second diamagnetic species. In this case, first membrane sensor 906 is a magnetically modified membrane sensor, and second membrane sensor 912 is a differently magnetically modified membrane sensor. The magnetically modified membrane sensor preferentially enhances the concentration of and allows the detection of the first diamagnetic species over the second diamagnetic species and the differently magnetically modified membrane sensor enhances the concentration of and allows the detection of the second paramagnetic species and the diamagnetic species, enabling the measurement of the concentration of at least the first diamagnetic species. The first diamagnetic species can include $CO_2$.

In yet another embodiment, the first species can be a first paramagnetic species and the second species can be a second paramagnetic species. In this case, first membrane sensor 906 is a magnetically modified membrane sensor, and second membrane sensor 912 is a differently magnetically modified membrane sensor, wherein the magnetically modified membrane sensor preferentially enhances the concentration of and allows the detection of the first paramagnetic species over the second paramagnetic species and the differently magnetically modified membrane sensor enhances the concentration of and allows the detection of the second paramagnetic species and the first paramagnetic species, enabling the measurement of the concentration of at least the first paramagnetic species. Again, the first paramagnetic species can be one of $O_2$, $NO_2$, and NO.

In yet another embodiment of the invention, the first species can be a diamagnetic species and the second species can be a nonmagnetic species. In this case, first membrane sensor 906 is a magnetically modified membrane sensor, and second membrane sensor 912 is an unmodified membrane sensor, wherein the magnetically modified membrane sensor preferentially enhances the concentration of and allows the detection of the diamagnetic species over the nonmagnetic species and the unmodified membrane sensor enhances the concentration of and allows the detection of the nonmagnetic species and the diamagnetic species, enabling the measurement of the concentration of at least the diamagnetic species.

Figure 20:
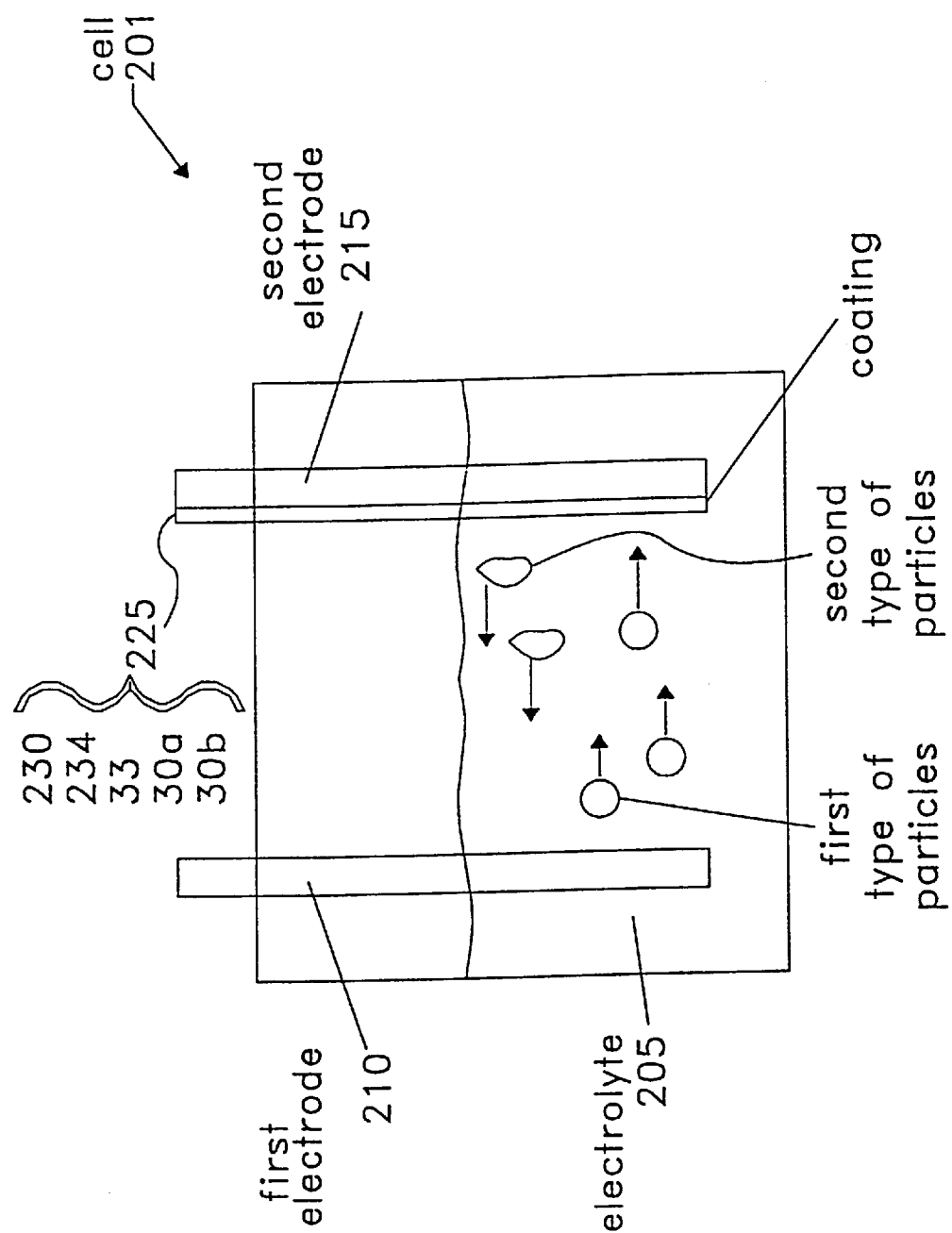
FIG. 20 shows a cell 201 according to another embodiment of the invention. An embodiment of the chromatographic technique is shown in FIG. 20A.

FIG. 20 shows a cell 201 according to another embodiment of the invention. In particular, FIG. 20 shows an electrolyte 205 including a first type of particles. A first electrode 210 and a second electrode 215 are arranged in electrolyte 205. The first type of particles transform into a second type of particles once said first type of particles reach said second electrode 215. Second electrode 215 has a surface with a coating 225 fabricated according to the above methods. Coating 225 includes a first material 230 having a first magnetism, and a second material 234 having a second magnetism, thereby creating a plurality of boundaries (33 of FIG. 15A) providing a path between electrolyte 205 and said surface of second electrode 215. Each of said plurality of boundaries having a magnetic gradient within said path, said path having an average width of approximately one nanometer to approximately several micrometers, wherein said first type of particles have a first magnetic susceptibility and said second type of particles have a second magnetic susceptibility and the first and said second magnetic susceptibilities are different. Coating 225 operates in the manner described with respect to FIG. 16.

First material 230 in coating 225 can include a paramagnetic species and second material 234 can include a diamagnetic species. Alternatively, first material 230 can include a paramagnetic species having a first magnetic susceptibility and second material 234 can include a paramagnetic species having a second magnetic susceptibility, wherein said first magnetic susceptibility is different from said second magnetic susceptibility. In yet another approach, first material 230 can include a diamagnetic species having a first magnetic susceptibility while second material 234 includes a diamagnetic species having a second magnetic susceptibility, and said first magnetic susceptibility is different from said second magnetic susceptibility. In another approach, first material 230 could alternatively include a paramagnetic species having a first magnetic susceptibility and second material 234 comprises a nonmagnetic species. In another approach, first material 230 can include a diamagnetic species having a first magnetic susceptibility and second material 234 can include a nonmagnetic species. Electrolyte 205 can be an electrolyzable gas such as $O_2$ or can include a chlor-alkali.

Chromatographic Flux Enhancement by Nonuniform Magnetic Fields

Using a chromatographic approach, as discussed above, flux may be enhanced by nonuniform magnetic fields. This is a separation or chromatographic application (magnetochromatography) and it involves no electrochemistry. The basis of the invention follows.

The basic methodology comprises taking an iron (or other magnetizable material) wire and coating it to make it chemically inert. The iron wire is threaded inside a capillary. The capillary is filled with a polymer, or gel, or other material through which molecules and/or ions can move. Alternatively, the polymer or other material can be dip coated or cast directly on the surface of the inert coating; this eliminates the need for the capillary. The ions and/or molecules to be separated are introduced into one end of the capillary. A gradient is established along the length of the tube to cause motion of the molecules and/or ions through the tube. The gradient could be, for example, a concentration or a potential gradient. (There are a whole range of gradients used in chromatography that can be directly drafted into this system. Besides concentration and potential gradients, these include gradients of density, viscosity, pressure, temperature, ion exchange capacity, characteristic dimensions of the microstructured substrate (stationary phase) polarity and dielectric constant, as well as forced flow and convection, and time dependency (temporal gradients and pulses)). The capillary is placed inside a magnetic field. A circular magnet could be used, but other geometries are possible. The magnetic field will be concentrated inside the iron wire, and as the field decays into the polymer or gel surrounding the wire, a nonuniform magnetic field will be established. Moieties moving through the gel will be drawn toward the wire and swept down the tube by the concentration gradient and surface diffusion processes.

Variations in specific embodiments are possible. A wire is discussed above, but any shape including beads will work. The wire can be any magnetizable material such as iron or iron oxides, as well as permanent magnets and superconductors.

The coating on the wire to make it chemically inert could include polymers, silanes, thiols, silica, glass, etc. In some systems, the choice of wire, solvent and substrate may create a system where the "wire" is already inert and no coating is needed.

The polymer or gel in the capillary can be one of the ion exchange polymers already discussed (Nafion and poly (styrene sulfonate)) or other material, probably having a viscosity higher than that of bulk solvent. Other examples could involve separation materials commonly used in chromatography—including acrylamide polymers, acrylate polymers, Dow-Ex (Trademark of Dow-Corning Corporation) materials, or maybe just sucrose or glycerol (glycerin) in solvent.

Ions and/or molecules can be introduced from any phase (gas, liquid, solid, or plasma), although liquid is the most obvious. Molecules can be introduced continuously for a continuous separation or in single shots or in a series of shots. The nonmagnetic gradient is needed to pull molecules that move into the surface zone rapidly down the tube so more molecules can be drawn in by the magnetic field.

The concentration of the field inside a magnetizable wire or other structure by the external magnet can be controlled with pulsed fields, reversed fields, DC fields, and graded fields as only some examples of what can be done to control the separation and transport direction (vector) of the materials. A combination of different magnetizable materials inside the gel—either parallel or crossed, might provide some interesting mechanisms for vectoring molecules or ions and separating them according to differences in their susceptibilities. Note, the combination of vectors provides a mechanism for separations of all types.

Note also that the switching possibilities here are significant. By using an external electromagnet in this system, it should be possible to turn the effect on and off. If superconductors are used, the switching can be done by turning the field on and off by temperature changes.

All the existing separation methodologies of chromatography and separation science can be brought to bear here. Separations are driven by various gradients and flows. These include diffusion, migration, fluid flow, size exclusion, thermal programming, electrophoresis, electro-osmosis, etc.

Figure 20A:
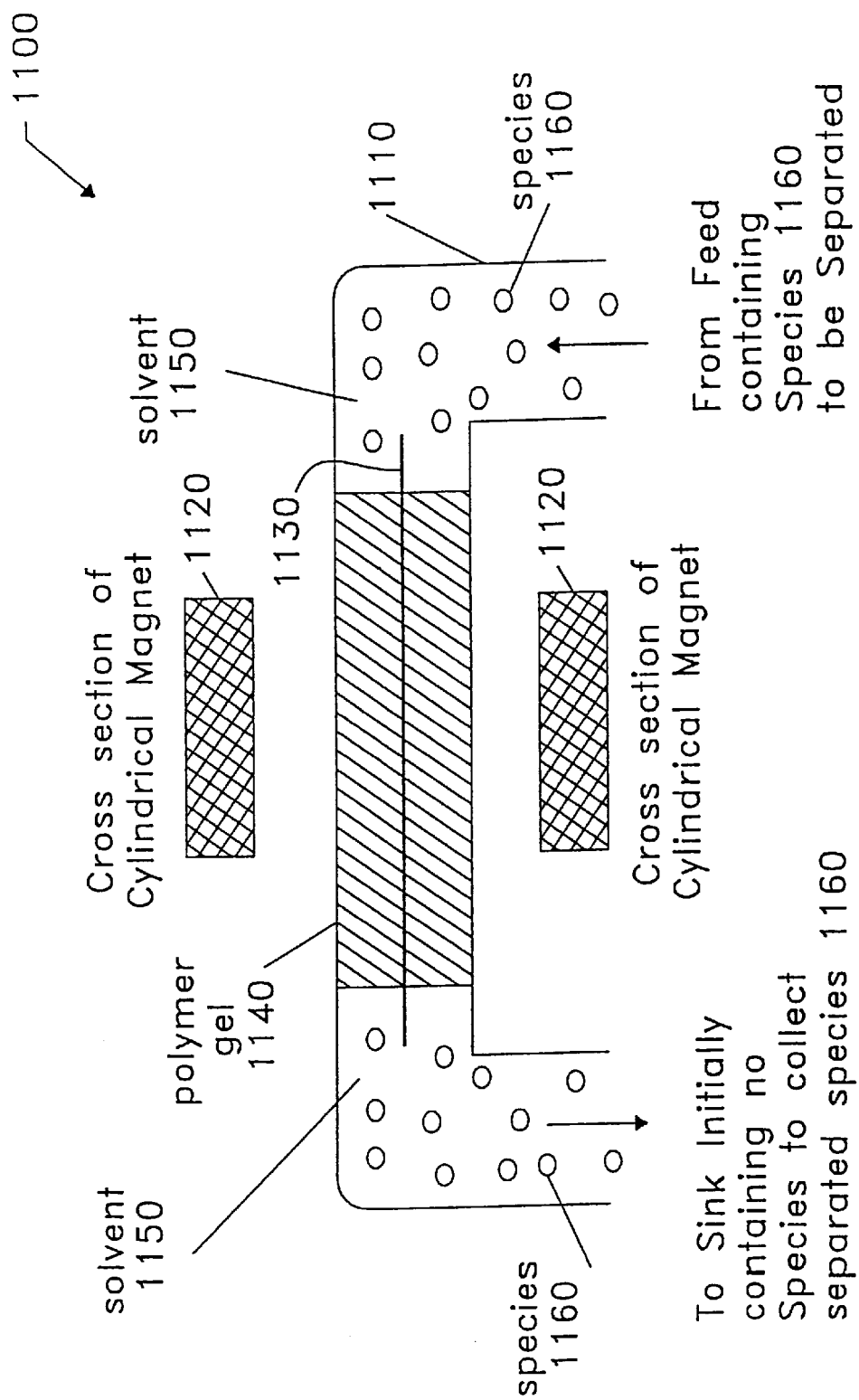
FIG. 20B shows rough magnetic field lines in the iron wire.
FIG. 20C shows a method for the technique of FIG. 20A.
Figure 20B:
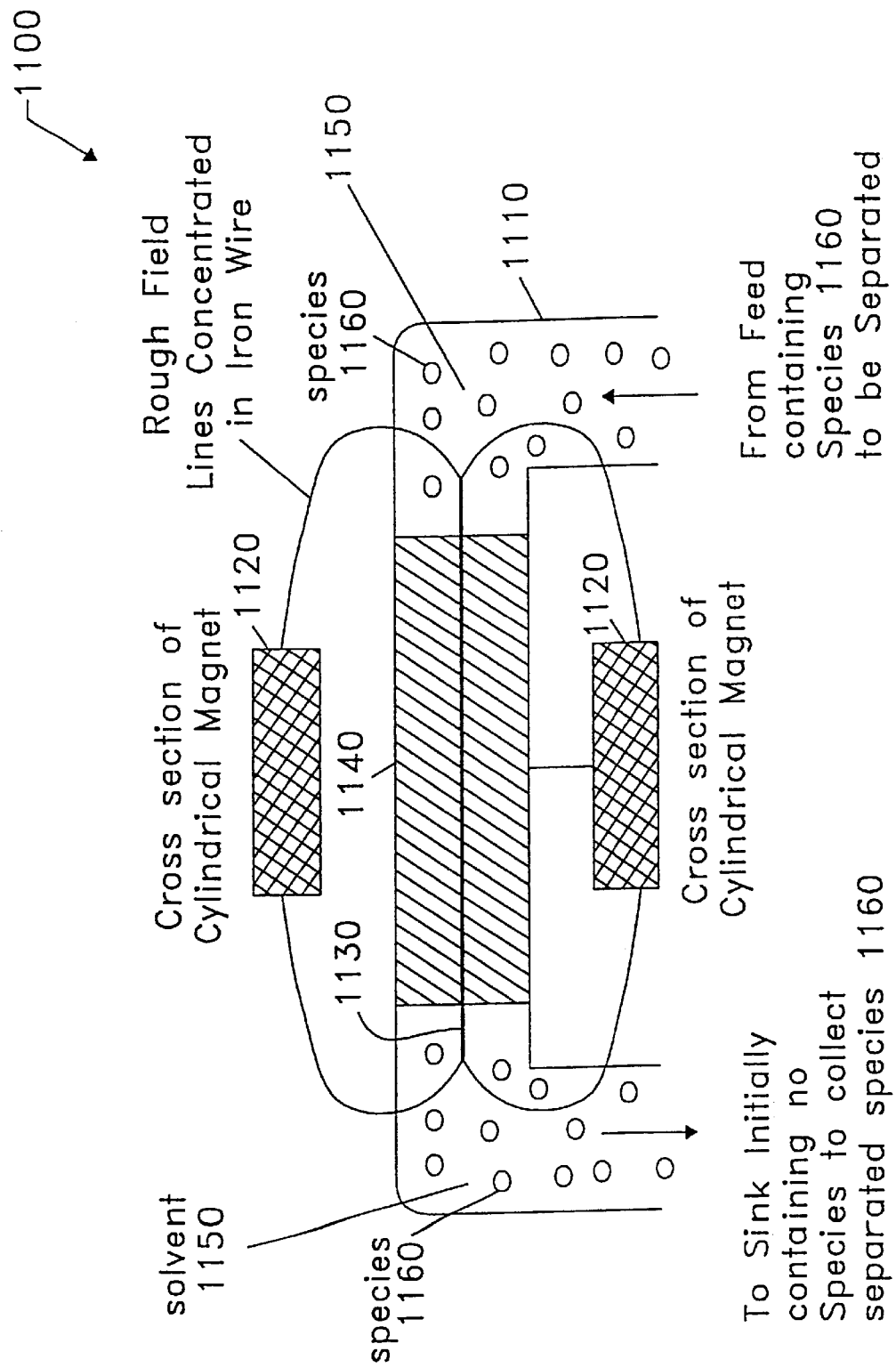

An embodiment of the above discussed chromatographic technique is shown in FIG. 20A. FIG. 20A shows apparatus 1100 comprising capillary 1110, magnets 1120, iron wire 1130, polymer gel 1140, solvent 1150, and species 1160. FIG. 20B shows rough magnetic field lines that may be concentrated in iron wire 1130. Species 1160 is to be separated from other species introduced through one end of capillary 1110. Species 1160 is fed into one end of capillary or tube 1110 containing solvent 1150 and caused to move through capillary or tube 1110 driven by a gradient (concentration, potential, or other gradient) and is subsequently passed through or is swept down capillary 1110 or through polymer gel 1140 therein, wherein movement of species 1160 is influenced by its own magnetic properties (magnetic susceptibility) and the magnetic field concentrated in iron wire 1130 by magnets 1120. Thereafter, species 1160 is collected after passing through the other end of capillary or tube 1110 and separated from other species not passing through capillary 1110.

Figure 20C:
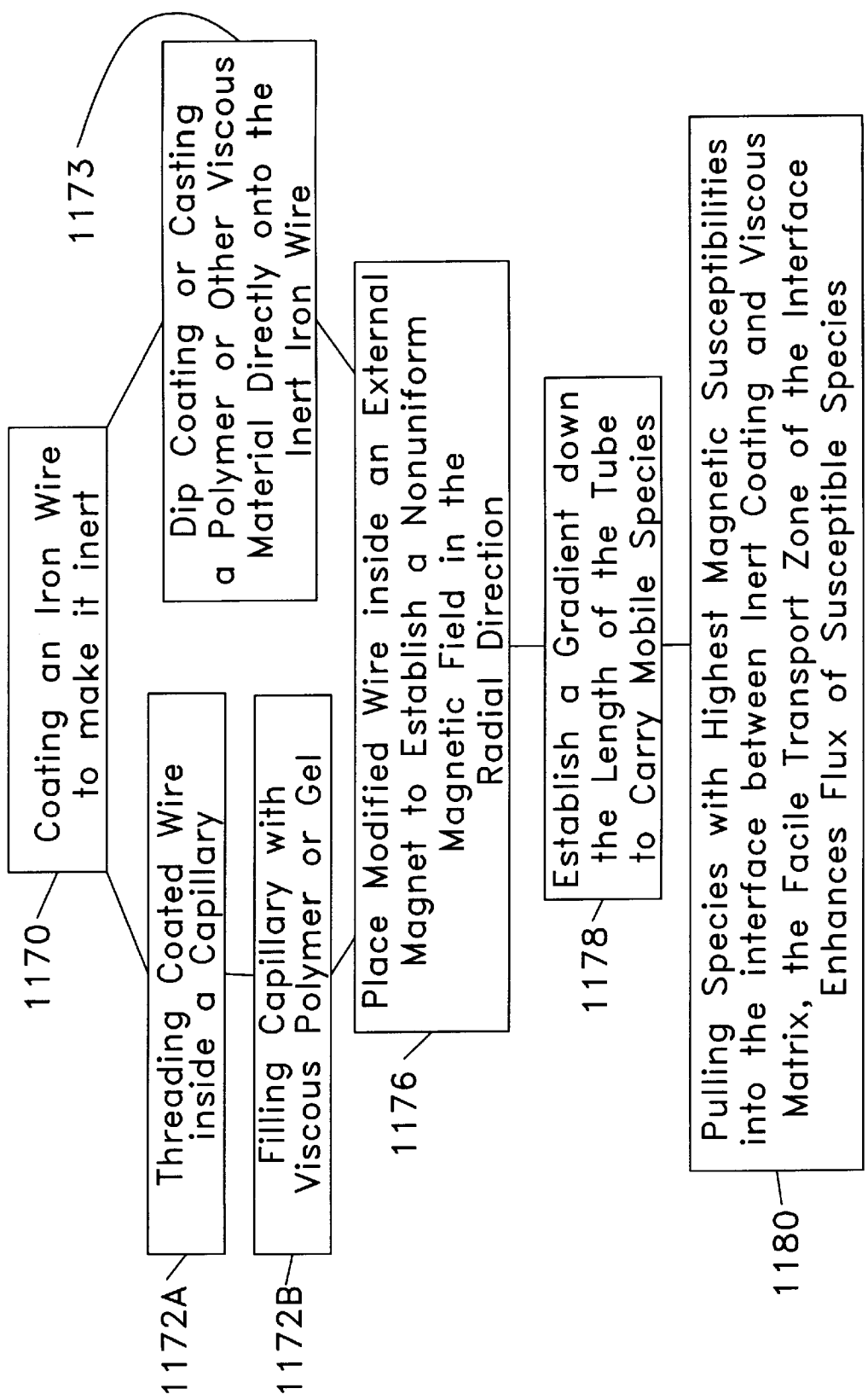

A method comprising steps for this chromatographic process may be described in FIG. 20C as follows. In step 1170 an iron wire is coated to make it chemically inert. The iron wire is then threaded inside a capillary or tube in step 1172A. A capillary is filled with a polymer, gel, or other material (which may be viscous) through which molecules and/or ions can move in step 1172B. Alternatively, the inert wire is dip coated or cast with a polymer, gel, or other material (may be viscous) directly in step 1173. The inert wire is placed inside a magnetic field in step 1176 with or without the capillary, depending on the previous alternative steps. A gradient is established along the length of the tube to carry the mobile species (including species to be separated) down the tube in step 1178. Species with the highest magnetic susceptibilities (including the species to be separated) are pulled into the interface between the inert coating and the polymer, gel, or other material (viscous matrix), the facile transport zone of the interface which enhances the flux of the magnetically susceptible species in step 1180. In step 1180, species move through the interface between polymer or other materials and the inert coating through which molecules and/or ions can move and are swept down the tube by the gradient and surface diffusion processes according to the magnetic properties of the species, the magnetic field concentrated in the iron wire, and the magnetic gradient established in the system from the iron wire and the external field.

Another method that could be followed for the apparatus involves: placing an iron wire (or other material) into a heat shrink material in step 1310, perhaps teflon; heat shrinking the heat shrink material in step 1320; dip coating with a layer of Nafion or PSS; drying the dip-coated layer, perhaps in a vacuum desiccator in step 1330; capping the ends of the coated wire and sliding the coated wire into tubing, perhaps spaghetti tubing in step 1340; placing one end of the tubing in a solution that contains the species to be separated in step 1350; placing the other end of the tubing into a solution that does not contain the species to be separated (this sets up a concentration gradient down the length of the tubing) in step 1360; placing the entire system in a magnetic field that is oriented radially with respect to the iron wire, perhaps in a hollow cylindrical magnet in step 1370. This process will enhance the separation of paramagnetic species. Note that the wire may be made of material other than iron, such as permanent magnets. The wire may also be in different geometries than a typical wire, such as a plate, disk, or any other shape or volume.

Figure 21:
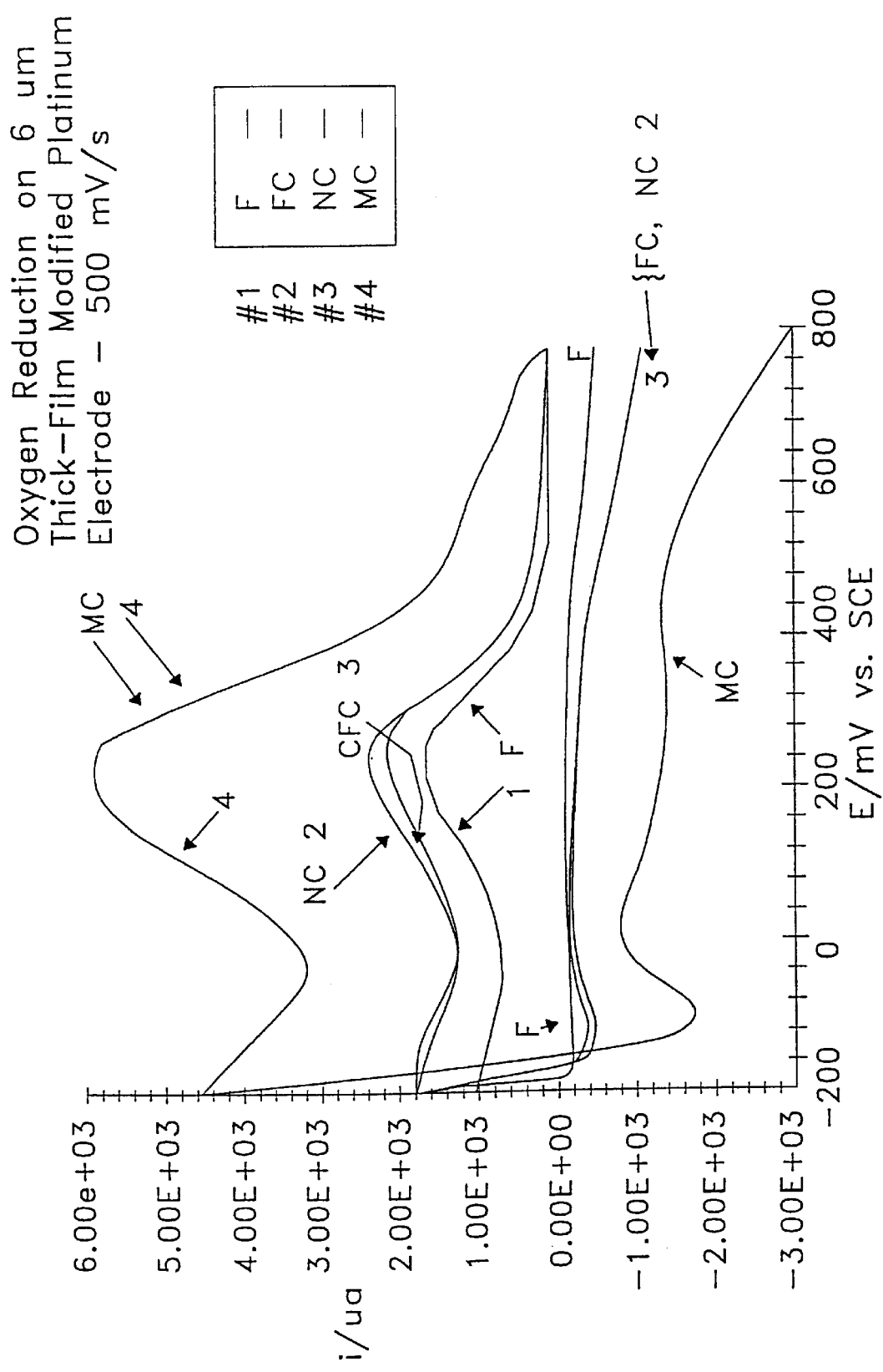
FIG. 21 shows cyclic voltammetric data for oxygen reduction using an electrode having both magnetic microbeads and platinized carbon particles incorporated into the electrode interface (curve No. 4), as compared with corresponding data for three other electrode surface modifications (curve Nos. 1–3).

FIG. 21 shows cyclic voltammetric results for oxygen reduction using an electrode having both magnetic particles or microbeads and platinized carbon particles incorporated into the electrode interface, as described above. Oxygen reduction was compared for electrodes having four different types of surface modifications, as detailed below. In the experiment, the solution was saturated with oxygen, and then the potential applied to the electrode was scanned at 500 mV/s from a potential where no oxygen reduction occurs (+800 mV) to a potential where all the oxygen in the vicinity of the electrode surface is electrolyzed (−200 mV). Curve number 1 of FIG. 21 shows data for a simple film of Nafion on the electrode surface (i.e. 100% Nafion). Slightly higher currents are observed for films containing 43% Nafion and 57% platinized carbon (curve No. 2) and 33% Nafion, 11% nonmagnetic polystyrene beads, and 56% platinized carbon (curve No. 3) (all percentages by volume). Curve No. 4 shows data for a film of 32% Nafion, 11% magnetic polystyrene beads, and 57% platinized carbon (all percentages by volume). Note that for the magnetic composite the current for oxygen reduction (at about 250 mV vs SCE (a reference electrode)) is significantly higher. The concentration of platinum of the platinized carbon was 40% by weight in each case. These results are not optimized, but indicate that the incorporation of magnetic particles and platinized carbon into the electrode interface significantly enhances the oxygen flux under transient voltammetric conditions.

The data presented above further substantiate the claim that a magnetically modified interface has a significant impact in enhancing the current and flux of oxygen. This enhancement can be driven by three mechanisms. First, the flux of oxygen may be increased by the magnetic fields. Second, the magnetic fields may impact the oxygen reduction kinetics. Third, the magnetic columns or particles may serve to better distribute the platinized carbon throughout the composite and so enhance current collection efficiency, either by distributing the catalyst/carbon electron conductor more uniformly throughout the interface and/or increasing the surface area where oxygen is adsorbed and awaiting reduction.

Figure 22:
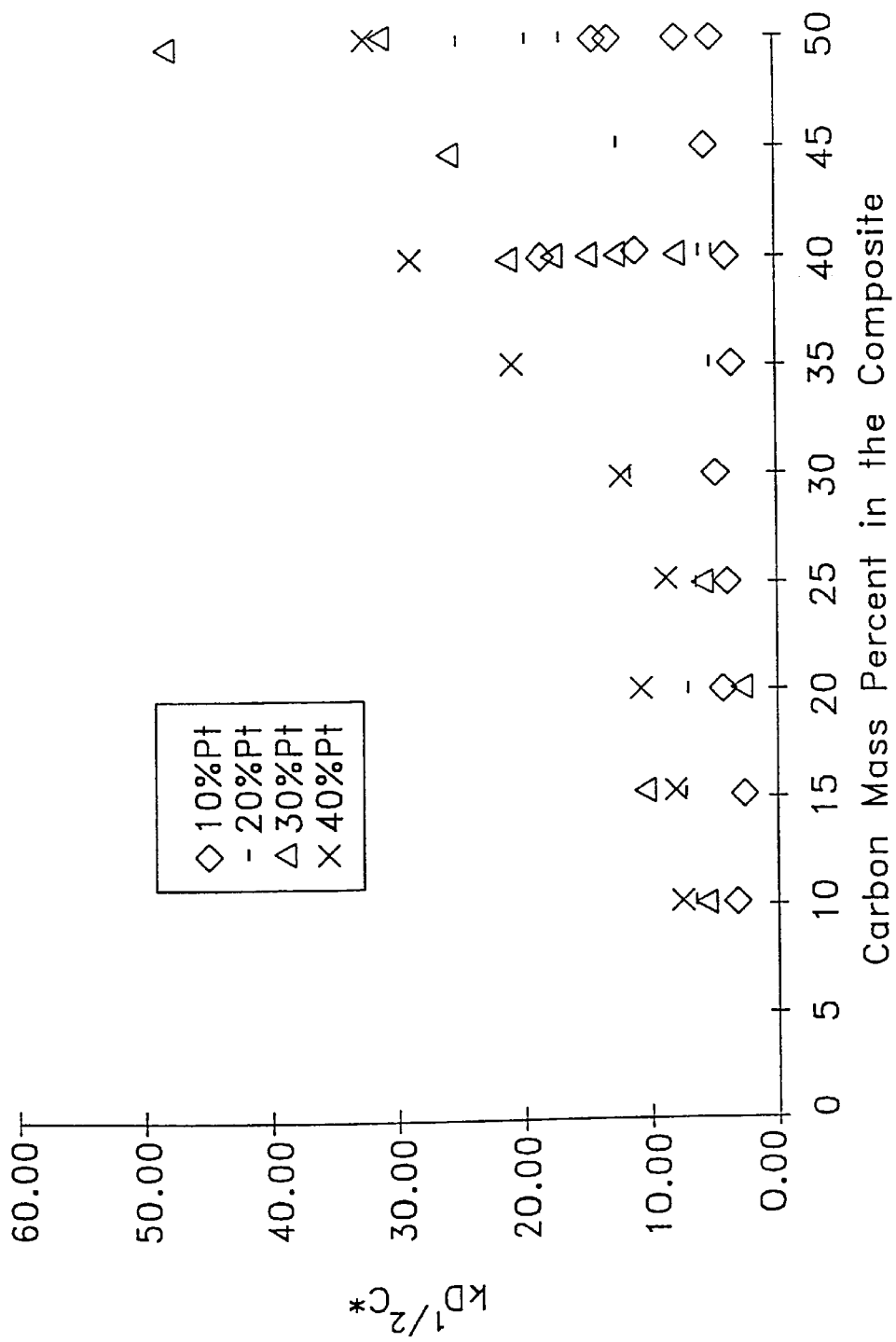
FIG. 22 shows a plot of $kD^{1/2}C'$ (y-axis) while the carbon mass percent (as platinized carbon) in the composite was varied over the range of 10% to 50%, where $kD^{1/2}C'$ is a parameter proportional to the peak cyclic voltammetric current. The platinum content of carbon is 10, 20, 30 or 40%. Each point represents a single experiment.

In FIG. 22, $kD^{1/2}C^+$, a parameter proportional to the peak cyclic voltammetric current, is plotted on the y-axis, while the carbon mass percent (or % by weight) in the composite was varied over the range of 10% to 50% (i.e. from 10 g to 50 g of carbon particles in association with a catalyst per 100 g of composite). The magnetic bead fraction was held constant at 10% (mass percent or % by weight) in these studies. The remaining fraction of the composite is Nafion. The platinum concentration of the platinized carbon was 10, 20, 30 or 40% by weight. Each point represents a single experiment. The flux enhancement is greater for 30% and 40% platinum on carbon than for 20% or 10%. Essentially, at the higher concentrations of platinum, additional catalyst does not enhance the flux.

The comparisons of the different film composites in FIG. 21 clearly indicate that the flux is higher in a magnetic environment, but the results do not definitively identify the flux enhancement as due to a magnetic effect. The structure of the magnetic composites is different from the structure of the nonmagnetic composites. The results do not rule out increased surface area as the only source of the flux enhancement.

Table 4 shows measured values of the parameter $kD^{1/2}C$ for a variety of different experiments. In the experiments, an electrode used was modified with Nafion, Nafion and non-magnetic beads, or Nafion and magnetic beads. The relative peak current is a measure of the enhancement in the oxygen reduction signal, and is listed as $kD^{1/2}C$ where k is the extraction parameter, D is the diffusion coefficient of $O_2$ in the film, and C is the concentration of the oxygen in solution. The parameter $kD^{1/2}C$ is determined from the slope of a plot of the peak currents versus square root of scan rate. The slope is renormalized by the electrode area, Faraday's constant (96485 coulombs/mole of electrons) and number of electrons transferred (approximated as 4). The experiments in Table 4 are grouped by the dates they were performed. Since there is no good way to determine the oxygen content at the time these studies were performed, it is best to compare the results for a given day, and hence it is best to compare results within a given group. The Nafion film and bare electrode data can serve as a rough estimate of the oxygen content. In the group marked A, no carbon is included in the interface, and there is no evidence that the magnetic particles enhance the reduction of oxygen. In the rest of the samples, carbon is included in the matrix on the electrode. In general, the results indicate that when carbon is included on the electrode, the electrolysis current is enhanced in the presence of the magnets. Also, it should be noted that these enhancements are larger when the magnetic content is increased.

Electrode Surface Modification to Prevent Passivation and Enable

Direct Reformation of Fuels

A major constraint to fuel cell development and design is the problem of electrode passivation, which results from the reaction of electrolytic intermediates with the electrode surface, and effectively terminates or drastically impedes the electrolytic process. The available evidence indicates that electrode passivation (which occurs rapidly) is directly responsible for the failure of prior art fuel cells to utilize the process of direct reformation. Direct reformation is a process wherein a fuel, such as a liquid alcohol fuel (e.g. methanol, ethanol) or a hydrocarbon fuel (e.g. propane) is delivered directly to an electrode (the anode), where it is oxidized (reformed) directly. During direct reformation, in a fuel cell or other setting, a liquid or gaseous fuel may be transported from a suitable source of fuel or fuel storage device and delivered to the appropriate electrode(s) via one or more delivering means, which may include various suction and pressurization devices, including various types of pumps. Devices for moving and/or delivering liquids and gases, including fuels, including pumping devices, are well known in the art.

Studies of ethanol oxidation show that the cyclic voltammetric current is enhanced in the case of electrodes modified with a coating of magnetic composites comprising magnetic microbeads and carbon particles in association with a catalyst, as compared with bare (i.e. uncoated) electrodes or electrodes modified with a coating of a composite which lacks either magnetic microbeads or carbon particles in association with a catalyst. In a preferred embodiment of the invention, the carbon particles in association with a catalyst comprise particles of carbon in association with platinum, i.e. a form of platinized carbon (Pt-C). The cyclic voltammetric data on ethanol oxidation are presented in FIGS. 23 through 29, and collectively indicate not only the feasibility for the prevention of electrode passivation, but also the parameters for the direct reformation of ethanol at the surface of a magnetically modified electrode.

Magnetic modification of electrodes may be achieved by methods similar to those described above on modification of electrodes with a magnetic composite in the context of enhancement of the electrochemical reduction of oxygen. For example, a casting mixture may be formulated to include:

1. A suspension of an ion exchange polymer, such as Nafion;
2. Magnetic microbeads or particles, which may be encapsulated or coated with an encapsulating material, or non-encapsulated; and
3. At least one suitable solvent or a solvent mixture to serve as a vehicle or carrier for components 1 through 3.

Depending on a number of factors, including the particular application or intended use of the magnetic composite material, the casting mixture may further include carbon particles in association with a catalyst, and/or particles containing platinum.

The casting mixture is agitated by, for example, sonication or stirring, and an aliquot of the casting mixture is deposited on the surface of a bare or uncoated electrode. The electrode serves as a current collector.

Before the solvent, solvent mixture or carrier has evaporated, the electrode may be arranged in an external magnetic field in order to orient the magnetic particles and form an ordered structure on the surface of the electrode (as described in greater detail elsewhere herein). (There is, however, some evidence that the presence of an external magnetic field may be optional.)

After the solvent or carrier has evaporated, the external magnet, if any, is removed to yield a coating of a magnetic composite in surface contact with the magnetically modified electrode. The thickness of the coating or film of the magnetic composite on the electrode surface depends on various parameters of the process of electrode modification, such as the volume of casting mixture cast per unit area of electrode surface. In general, the thickness of the magnetic composite coating is in the range of 0.5 to 100 $\mu$m. A preferred range for the thickness of the magnetic composite coating is from 2 to 25 $\mu$m.

The nature and relative amounts of the various components comprising the casting mixture, and therefore the composition of the composite coating or film on the electrode surface, may vary. In general, the composite coating comprises between about 0.01% and about 85% of beads or microbeads, such as magnetic microbeads comprising oxides of iron; and from about 15% to about 99.99% of an ion exchange polymer, by weight. A magnetic composite coating may, optionally, further comprise from 0% to about 80% by weight of carbon particles in association with a catalyst, and/or particles containing platinum. Typically the catalyst comprises platinum, and the catalyst may be loaded on the surface of the carbon particles. Variables related to the carbon particles in association with a catalyst component include the nature and degree of loading of the catalyst on the surface of the carbon particles, and the size and type of the carbon particles. The particles containing platinum may lack carbon or may include carbon, and may be comprised predominantly of platinum, or the particles containing platinum may consist essentially of platinum (i.e. having about 95% to about 100% platinum, by weight, of the particles containing platinum).

A preferred type of carbon particle comprising a composite material is Vulcan XC-72. A catalyst, in association with carbon particles, that can be employed in practicing the invention may include platinum, palladium, ruthenium, or rhodium, as well as other transition metals including cobalt and nickel. The amount of catalyst in association with the carbon particles may range from about 5% or less to about 99.99%, by weight; a more preferred range is from about 10% to about 50% by weight. A preferred catalyst which may be used in combination with carbon particles is platinum. In a more preferred embodiment of the invention, the platinum is disposed on the surface of the carbon particles.

A preferred ion exchange polymer comprising a composite coating or film, under the invention, comprises Nafion. The magnetic microbead component of a magnetic composite may comprise beads of magnetic material, such as iron(III) oxide or magnetite, which may or may not be coated with an encapsulating material. The encapsulating material which may be used to encapsulate or coat the magnetic microbeads may be an inert material. In one embodiment of the invention an encapsulating material comprises polystyrene. The percentage by weight of magnetic or magnetizable material comprising the magnetic microbead component of the magnetic composite is normally between 2% and 90%. The size of the magnetic particles, beads or microbeads comprising the magnetic composite material range in diameter from about 0.1 micrometer to about 50 $\mu$m; and more preferably the magnetic microbeads are in the range of from 1 to 10 $\mu$m in diameter.

The range of encapsulating materials which may be used to coat or encapsulate magnetic microbeads under the invention may include, for example: various polymers, silanes, thiols, silica, glass, etc.

The solvent, solvent mixture or carrier component of the casting mixture may comprise any suitable solvent, or combination of two or more solvents, which will suitably dissolve and/or suspend the other components of the casting mixture and allow for the distribution of the casting mixture on the surface of the electrode.

The surfaces of platinum electrodes were modified by coating their surface with a number of different composites comprising an ion exchange polymer, magnetic microbeads, and carbon particles in association with a catalyst. For comparative purposes, composites were also prepared comprising an ion exchange polymer in combination with non-magnetic microbeads, with or without carbon particles in association with a catalyst. Once the composite material coating the modified electrode is dry, the electrode may be placed in a solution or other matrix containing a fuel, such as ethanol.

Unmodified (bare) platinum electrodes and the variously modified electrodes were then studied in the context of ethanol oxidation by cyclic voltammetry. The electrodes were removed from the external magnetic field before making voltammetric measurements.

In a first series of experiments, electrodes modified with a surface coating or film of the ion exchange polymer Nafion and non-magnetic (polystyrene) beads (diameter=1 to 3 $\mu$m) were compared with electrodes modified with a surface coating or film of the ion exchange polymer Nafion and magnetic beads (diameter=1 to 3 $\mu$m). In each case, the composite coating or film consisted of 25% beads and 75% Nafion, by volume. Films or composite coatings were cast on a polished platinum disk electrode, having an area of 0.46 cm$^2$. The films were then dried in a vacuum desiccator for 1 hour. The electrodes were placed in a solution of ethanol, with 0.1 M Na$_2$SO$_4$ as the electrolyte, in 18 megohm Milli-Q water. The solution was not purged, but rather was at ambient conditions. After soaking in the solution for 1 hour, each electrode was cycled 100 scans at a scan rate of 500 mV/s between −700 and 900 mV before data was recorded. This repeated cycling was performed in order to allow, or induce, passivation in an electrode which is susceptible to passivation, or which can be passivated by repeated cycling. Cyclic voltammograms were then recorded at scan rates of 500, 200, 100, 50, and 20 mV/s for both the electrode bearing the magnetic film and for that bearing the non-magnetic film. The results of the first series of experiments are shown in FIGS. 23A, 23B, and 24A–C.

Figure 23A:
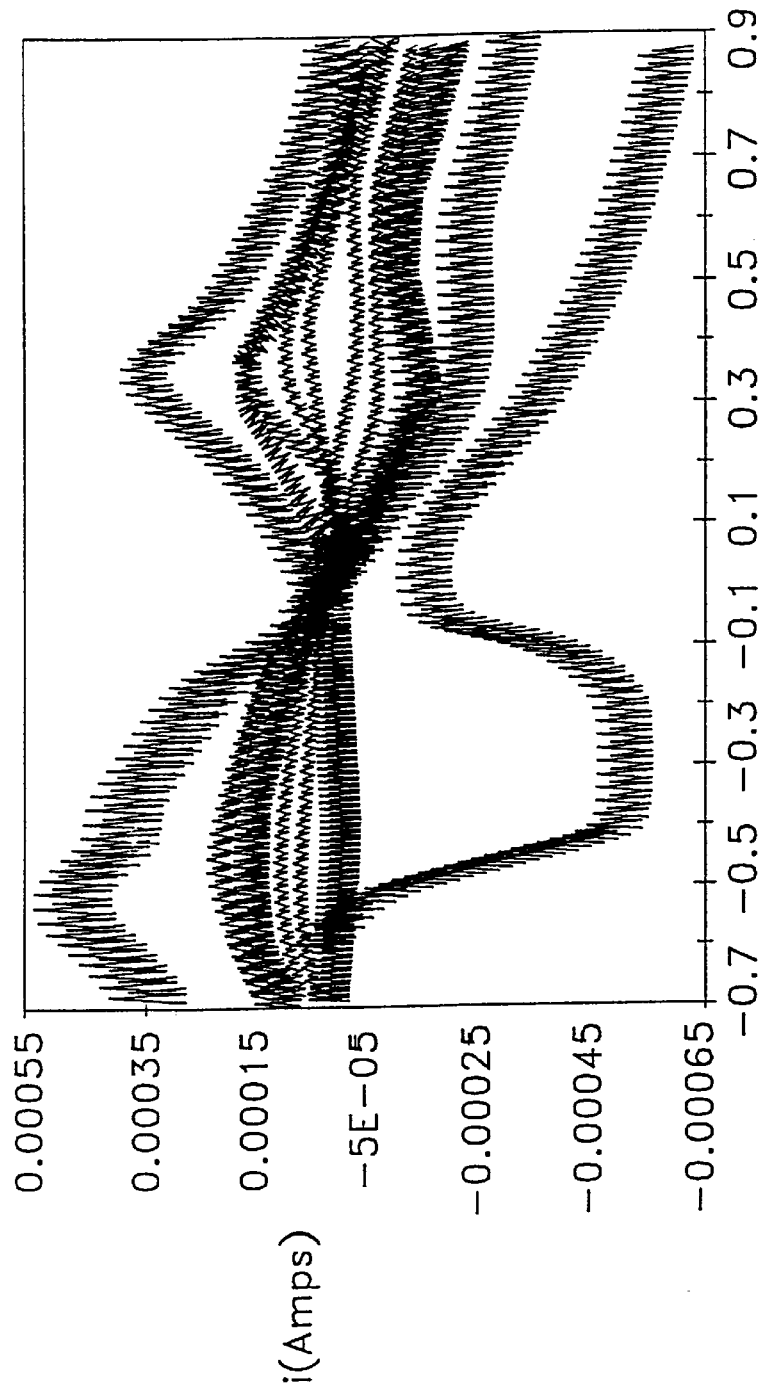
FIGS. 23A and 23B show cyclic voltammetric data for ethanol oxidation (6 mM ethanol in 0.1 M $Na_2SO_4$) using a platinum electrode bearing a surface composite comprising Nafion and either non-magnetic microbeads (FIG. 23A) or magnetic microbeads (FIG. 23B) (25% beads, 75% Nafion, by volume). Cyclic voltammograms were recorded at scan rates of 500, 200, 100, 50, and 20 mV/s. The electrode was cycled 100 times between −700 and 900 mV before the data was recorded.
Figure 23B:
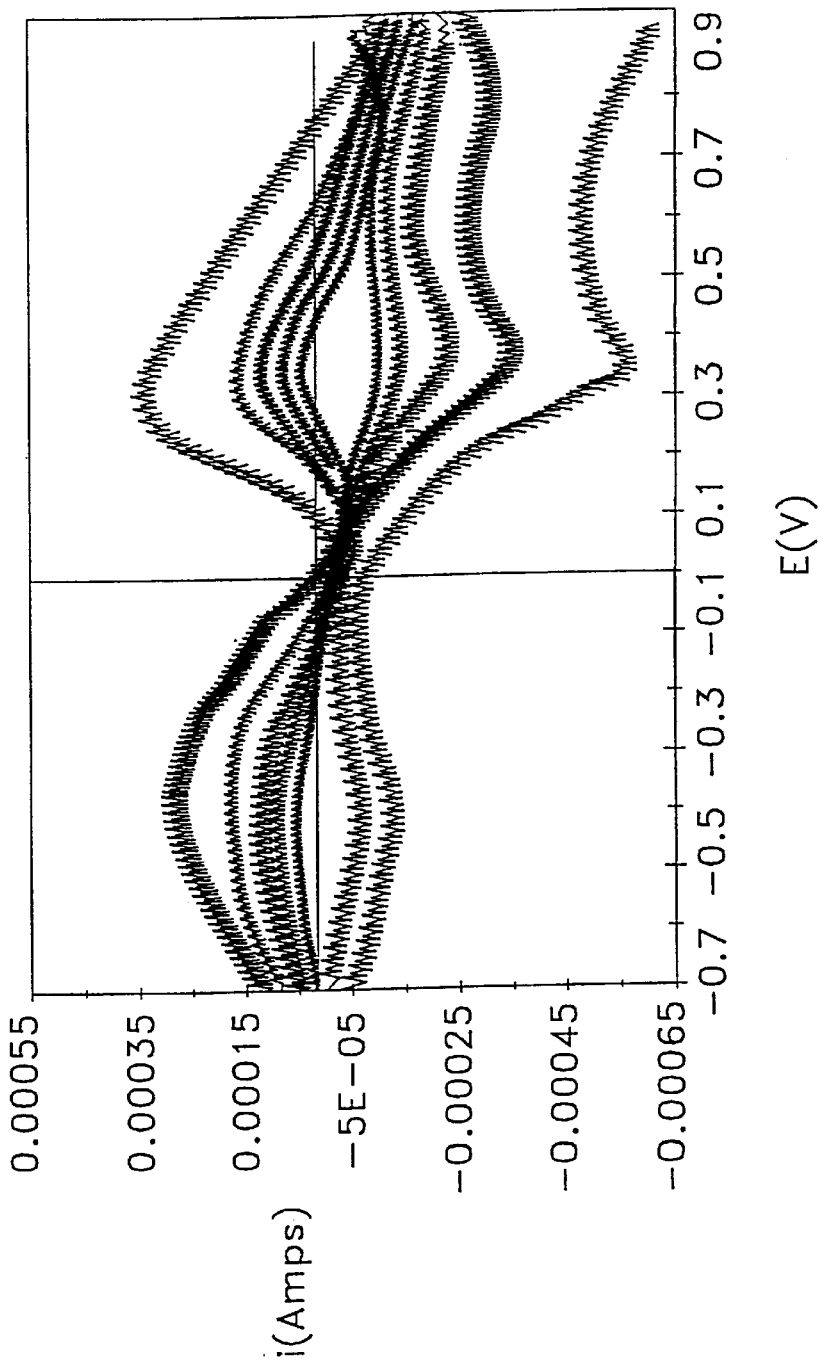
Figure 24A:
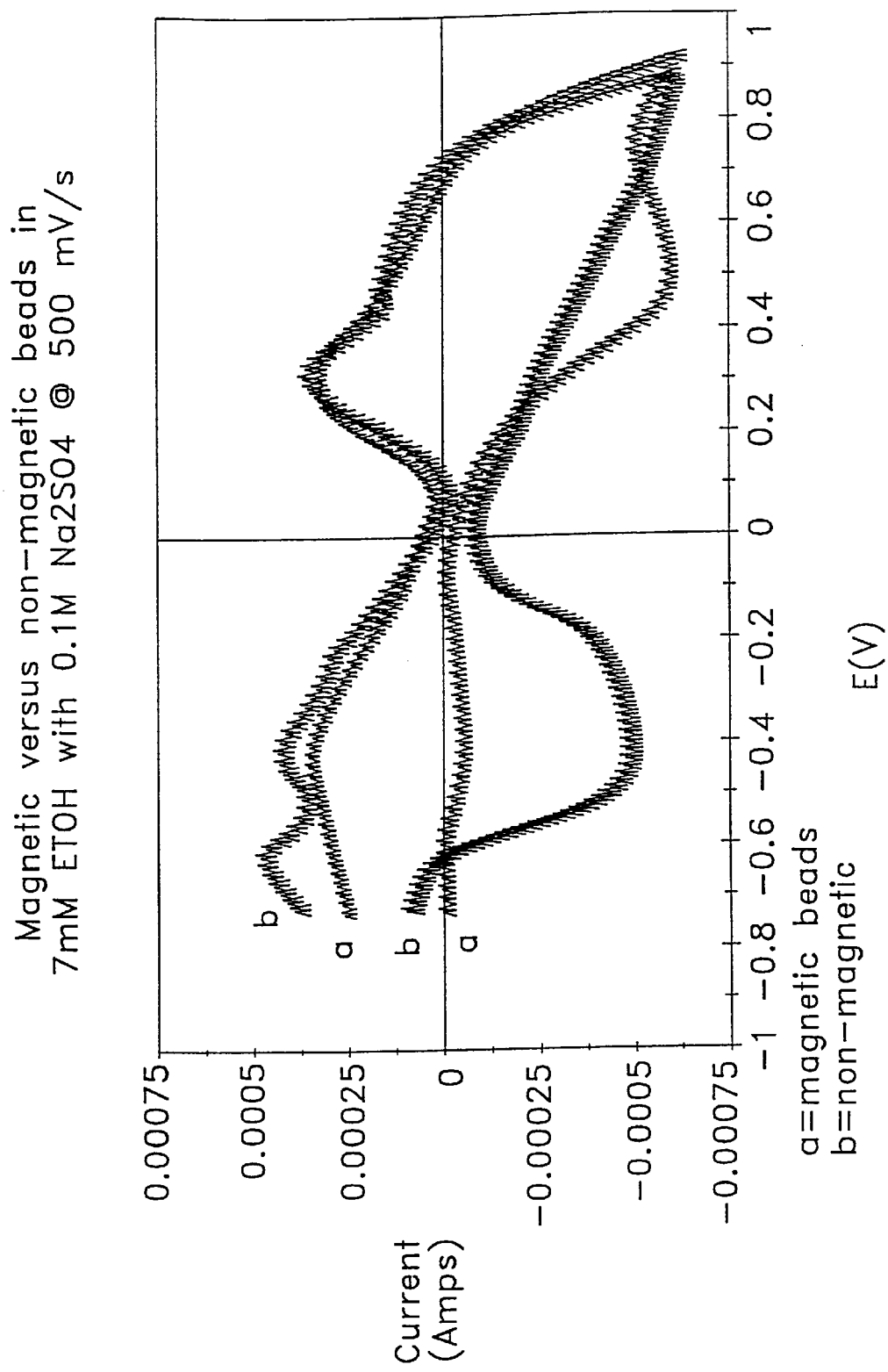
FIGS. 24A, 24B, and 24C show cyclic voltammetric data for ethanol oxidation (7 mM ethanol in 0.1 M $Na_2SO_4$) using a platinum electrode bearing a surface composite comprising non-magnetic microbeads and Nafion (25% beads, 75% Nafion, by volume), and using a platinum electrode bearing a surface composite comprising magnetic microbeads and Nafion (25% beads, 75% Nafion, by volume). Cyclic voltammograms were recorded at a scan rate of 500 Mv/s (FIG. 24A), 100 mV/s (FIG. 24B), and 20 mV/s (FIG. 24C). In each case, the electrode was cycled 100 times between −700 and 900 mV before the data was recorded.
Figure 24B:
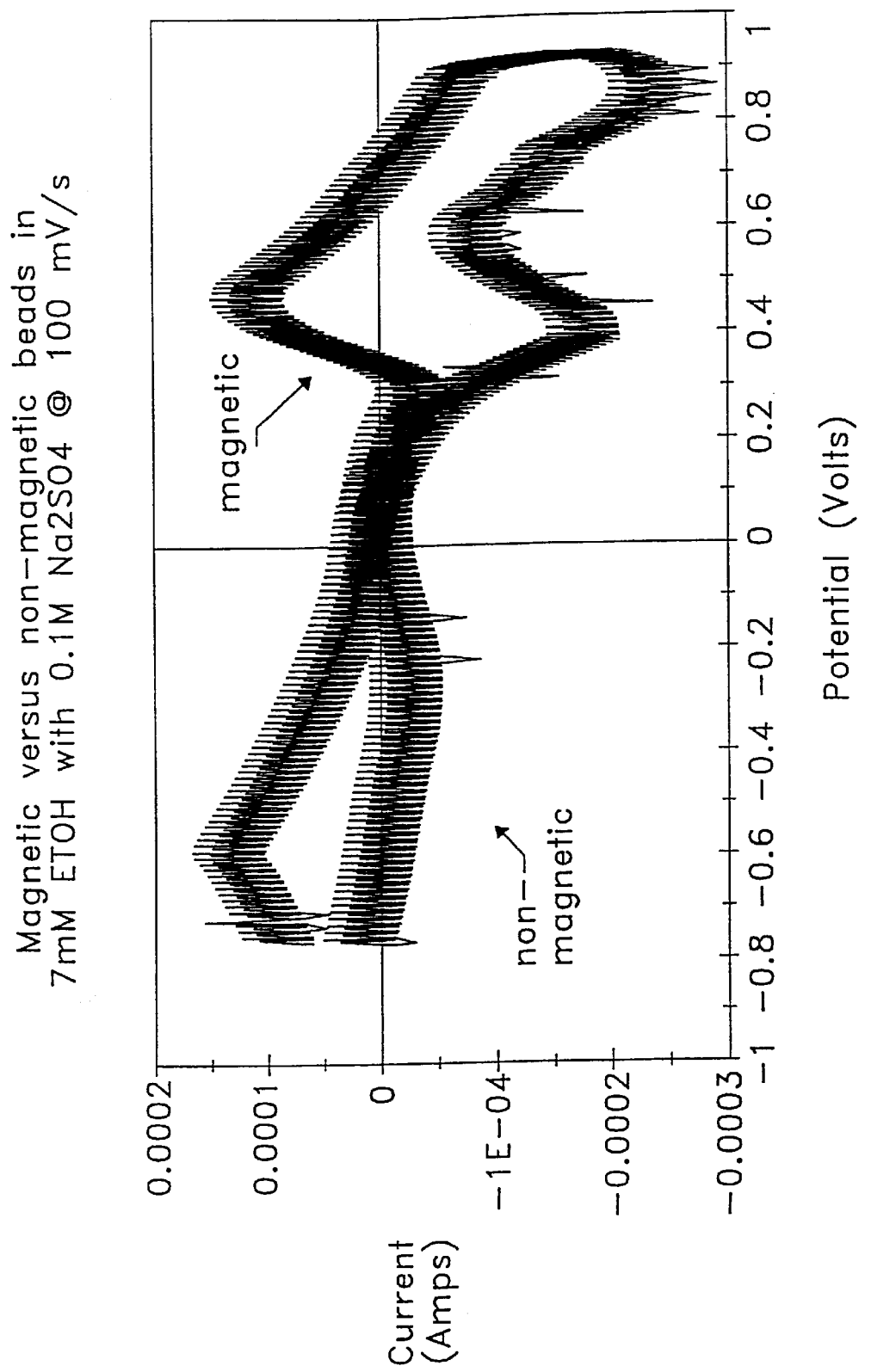
Figure 24C:
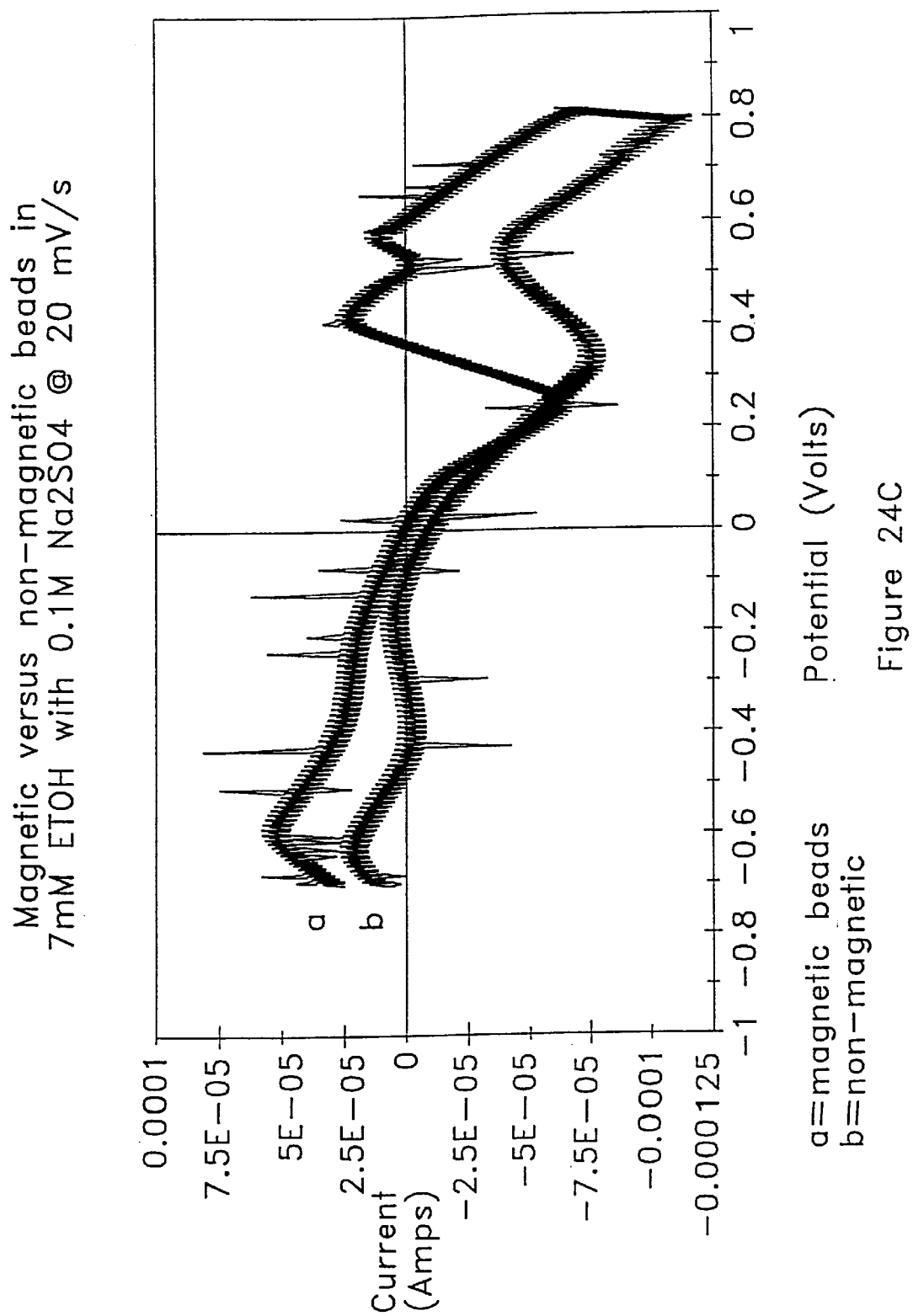

FIGS. 23A and 23B show cyclic voltammetric data for ethanol oxidation (6 mM ethanol in 0.1 M Na$_2$SO$_4$) using a platinum electrode bearing a surface composite comprising Nafion and either non-magnetic microbeads (23A) or magnetic microbeads (23B) (25% beads, 75% Nafion, by volume). Cyclic voltammograms were recorded at scan rates of 500, 200, 100, 50, and 20 mV/s. FIG. 24A, 24B, and 24C show cyclic voltammetric data for ethanol oxidation (7 mM ethanol in 0.1 M Na$_2$SO$_4$) using a platinum electrode bearing a surface composite comprising non-magnetic microbeads and Nafion (25% beads, 75% Nafion, by volume), and using a platinum electrode bearing a surface composite comprising magnetic microbeads and Nafion (25% beads, 75% Nafion, by volume). Cyclic voltammograms were recorded at a scan rate of 500 mV/s (FIG. 24A), 100 mV/s (FIG. 24B), and 20 mV/s (FIG. 24C).

When the voltammetry of ethanol electrolysis using the differently modified electrodes is compared, little or no difference is discernible in the case of the magnetic composite coating as compared with the non-magnetic coating in the absence of platinized carbon. With the exception of the 500 mV/s scan rate, the cyclic voltammograms for the magnetic and non-magnetic films overlaid one another. In FIG. 24A, which shows data for the 500 mV/s scan rate, the peak between −600 and −200 mV is much larger for the non-magnetic film as compared with the magnetic film, while the respective second peaks almost overlay one another. In FIGS. 24B and 24C, there is no distinguishable difference between the magnetic and non-magnetic films.

In a second series of experiments concerning the voltammetry of ethanol electrolysis, electrode surfaces were modified with a composite comprising carbon particles in association with a platinum catalyst. Thus, electrodes having a coating or film comprising platinized carbon particles, Nafion, and magnetic beads were compared with electrodes having a coating comprising platinized carbon particles, Nafion and non-magnetic (polystyrene) beads, and with uncoated (bare) electrodes. The experimental details were otherwise generally as outlined above for the first series of experiments, with the exceptions described below.

Four different composites were formulated to coat the electrodes used in the second series of experiments, and are designated as Films 6 through 9. The carbon particles in association with a catalyst used in these films was in the form of Vulcan XC-72 (E-Tek, Natick, Mass.) containing 20% platinum, by weight. This component of the composite coating or film is referred to as Pt-C. The percentage, by weight, of beads in the different composite formulations used to form each film was kept constant at 11%. Films 6 and 9 contain non-magnetic, polystyrene, beads, while films 7 and 8 contain magnetic beads. The composition, by weight, of each of the four films is as follows:

Film 6: 26% Pt-C; 63% Nafion; 11% polystyrene beads
Film 7: 26% Pt-C; 63% Nafion; 11% magnetic beads
Film 8: 76% Pt-C; 13% Nafion; 11% magnetic beads
Film 8: 76% Pt-C; 13% Nafion; 11% polystyrene beads Cyclic voltammograms were taken, at a range of scan rates, for electrodes coated with one of films 6 through 9, and for a bare (uncoated) electrode. The results are presented in FIGS. 25 through 29.

Figure 25:
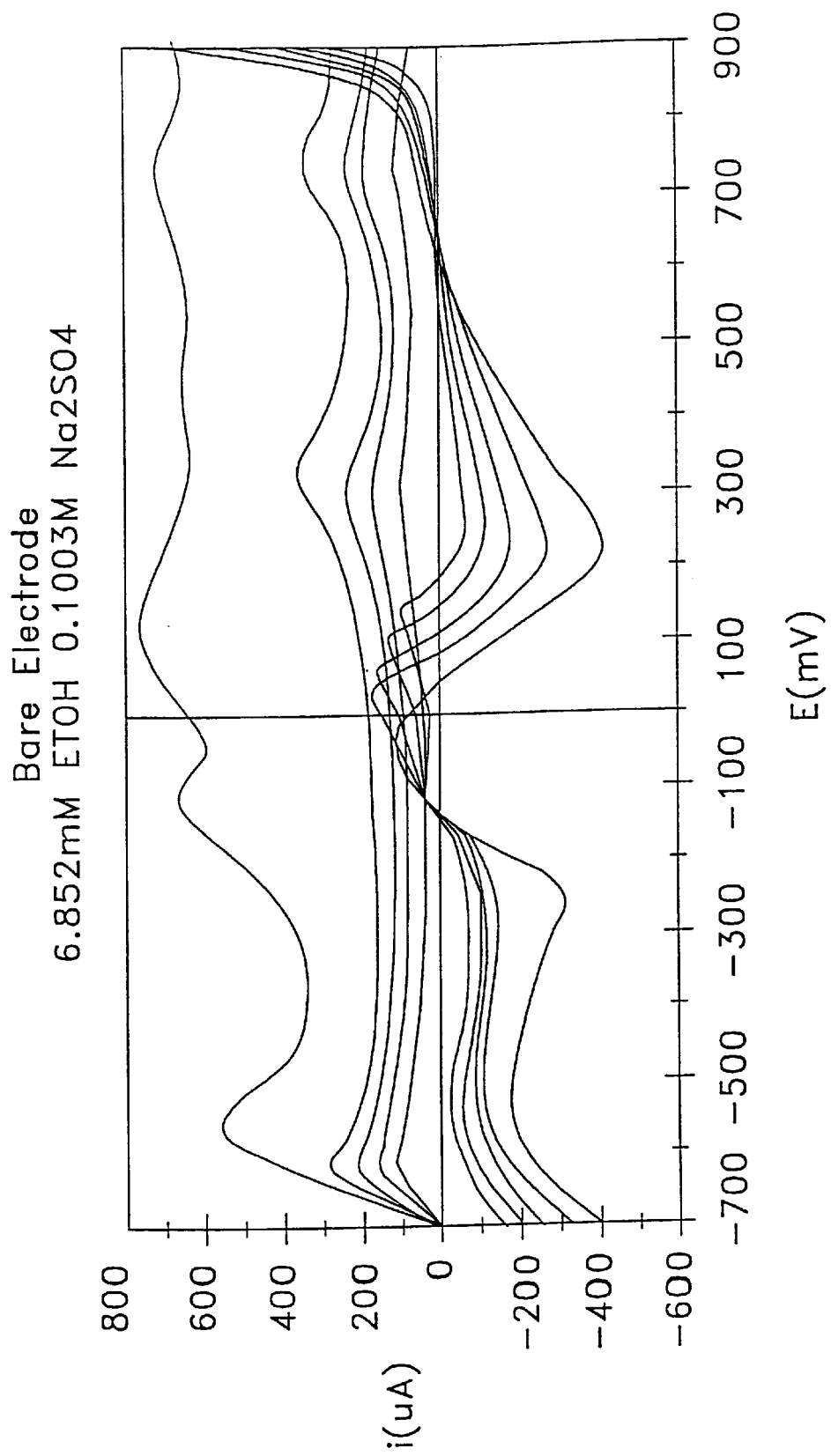
FIG. 25 shows cyclic voltammetric data for ethanol oxidation (6.852 mM ethanol in 0.1003 M $Na_2SO_4$) using a bare platinum electrode. Cyclic voltammograms were recorded at scan rates of 500, 200, 100, 50, and 20 mV/s. The electrode was cycled 100 times between −700 and 900 mV before the data was recorded.
Figure 26A:
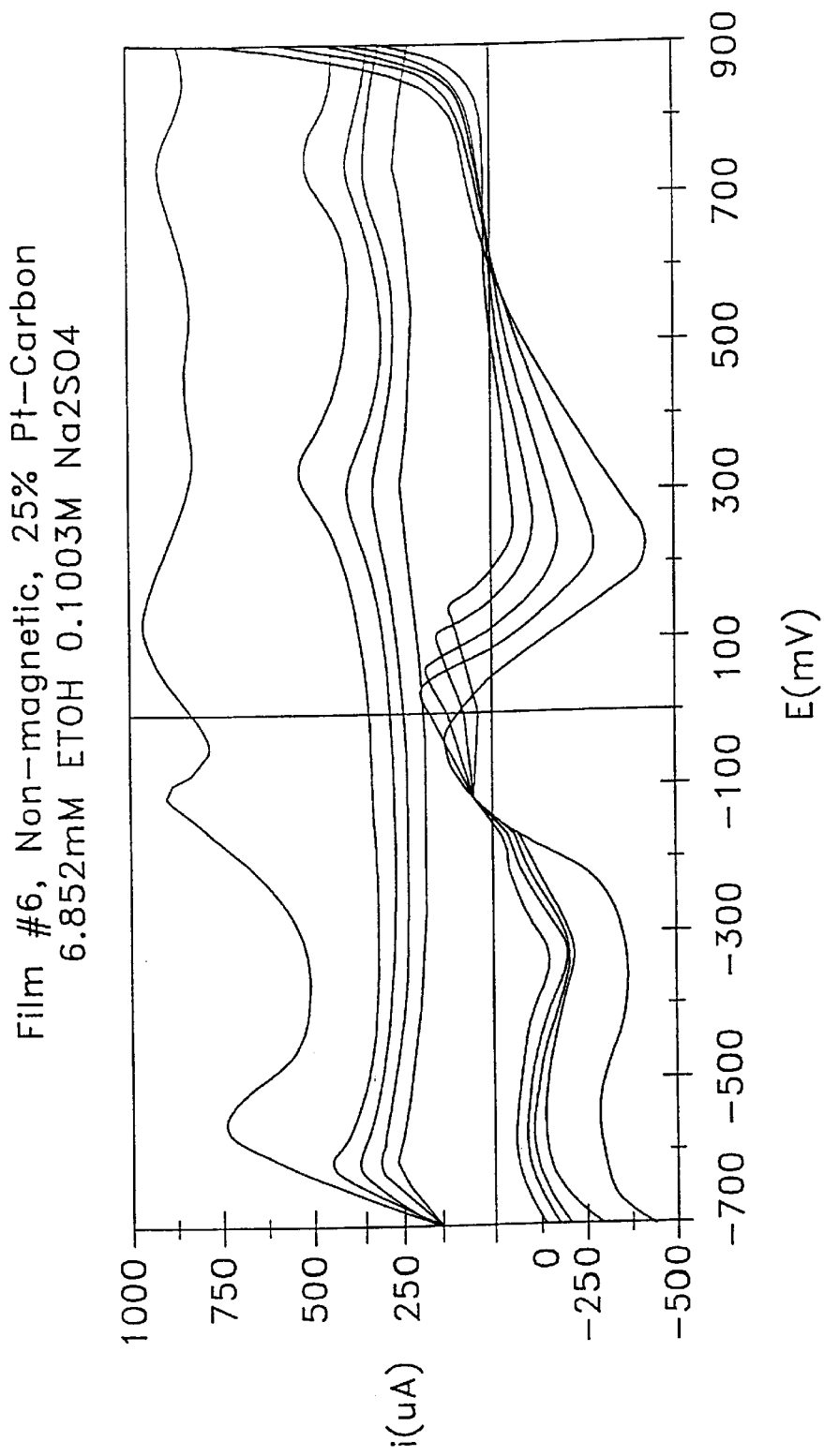
FIGS. 26A and 26B show cyclic voltammetric data for ethanol oxidation (6.852 mM ethanol in 0.1003 M $Na_2SO_4$) using a platinum electrode bearing a surface composite comprising platinized carbon (Pt—C), Nafion, and either non-magnetic microbeads (FIG. 26A) or magnetic microbeads (FIG. 26B), (11% beads, 26% Pt-C, and 75% Nafion, by volume). Cyclic voltammograms were recorded at scan rates of 500, 200, 100, 50, and 20 mV/s. The electrode was cycled 100 times between −700 and 900 mV before the data was recorded.
Figure 26B:
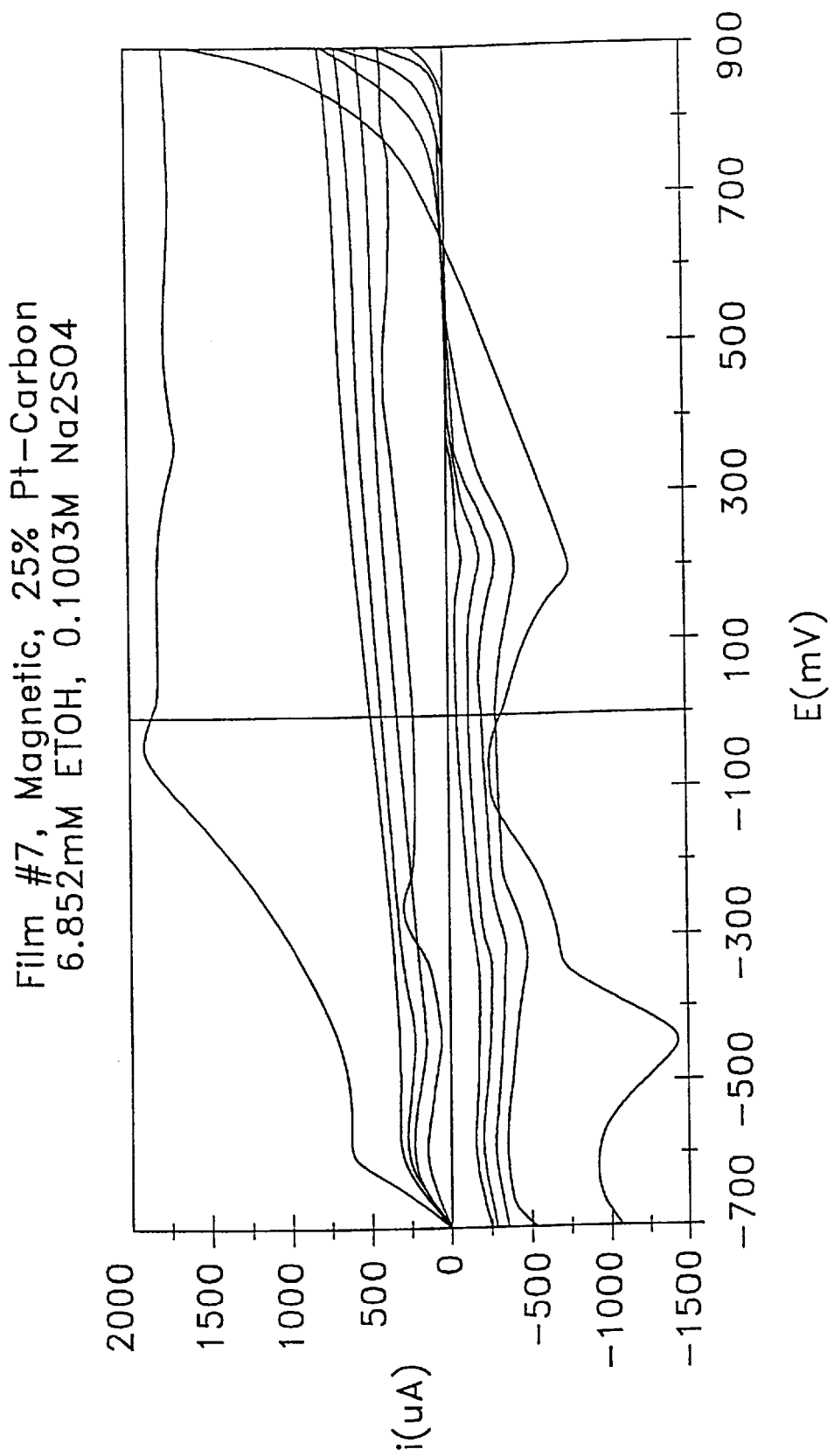
Figure 27A:
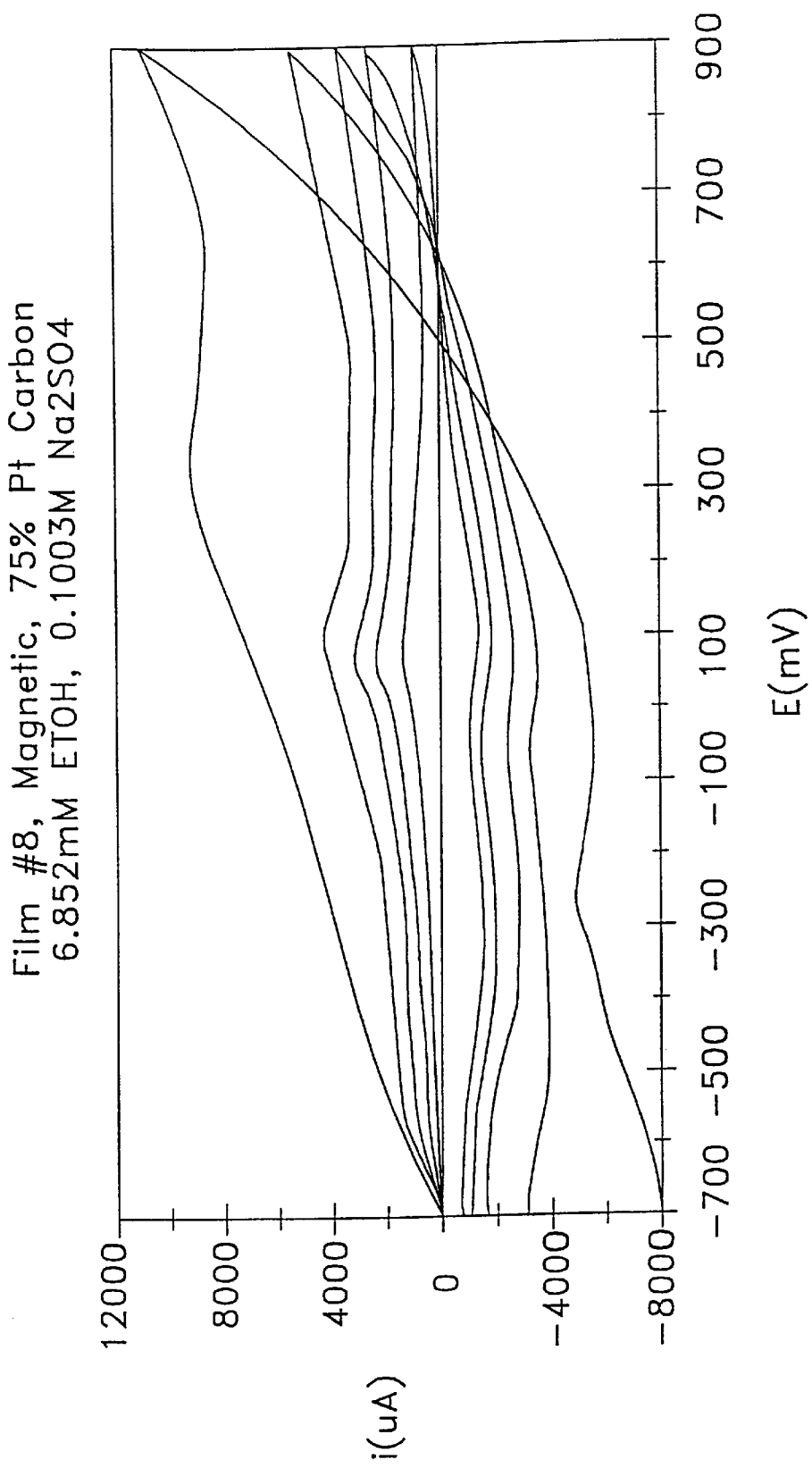
FIGS. 27A and 27B show cyclic voltammetric data for ethanol oxidation (6.852 mM ethanol in 0.1003 M $Na_2SO_4$) using a platinum electrode bearing a surface composite comprising Pt—C, Nafion, and either magnetic microbeads (FIG. 27A) or non-magnetic microbeads (FIG. 27B), (11% beads, 76% Pt—C, and 13% Nafion, by volume). Cyclic voltammograms were recorded at scan rates of 500, 200, 100, 50, and 20 mV/s. The electrode was cycled 100 times between −700 and 900 mV before the data was recorded.
Figure 27B:
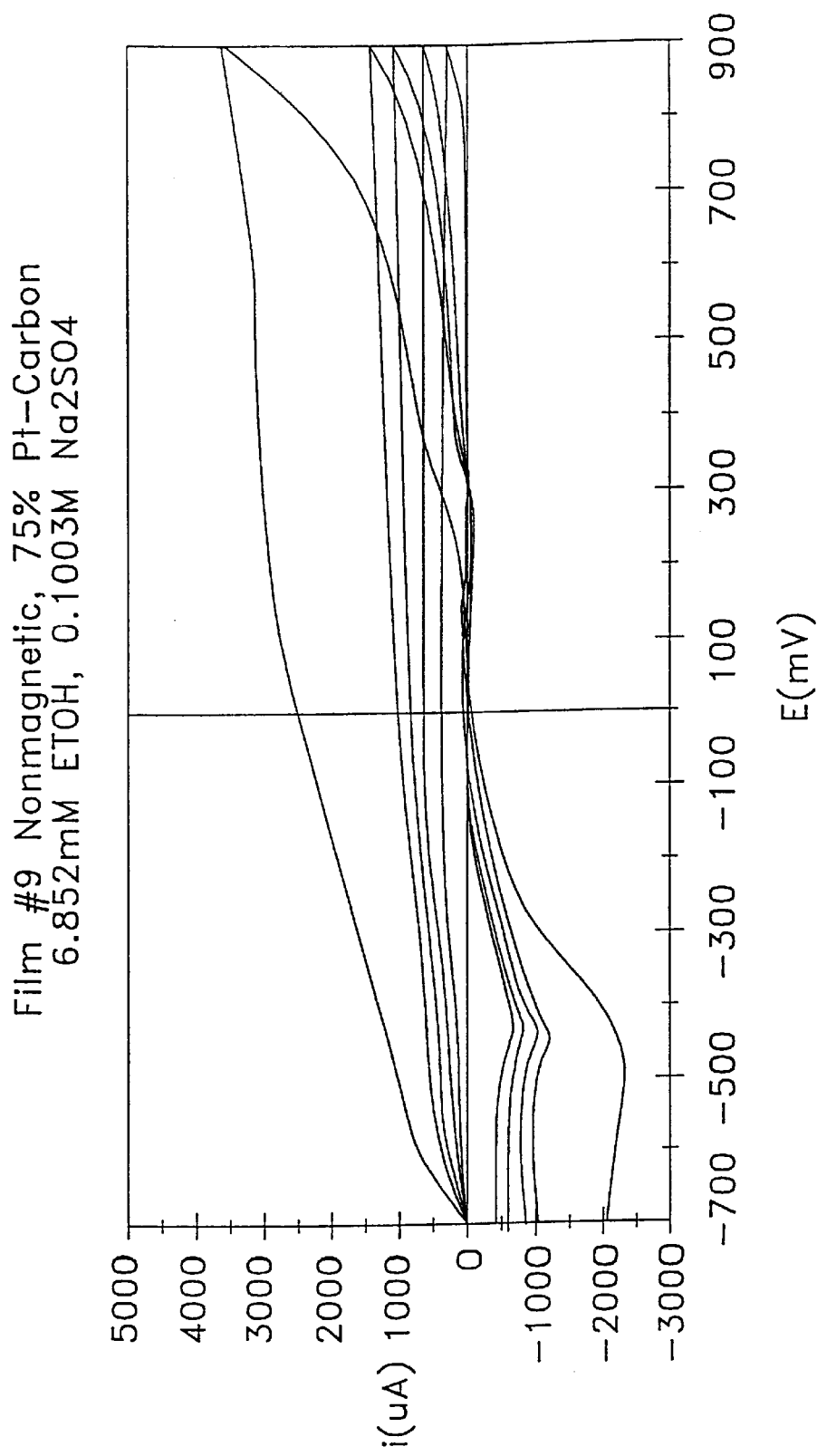

FIG. 25 shows cyclic voltammetric data for ethanol oxidation (6.852 mM ethanol in 0.1003 M $Na_2SO_4$) using the bare (uncoated) platinum electrode, recorded at scan rates of 500, 200, 100, 50, and 20 mV/s. FIGS. 26A and 26B show cyclic voltammetric data for ethanol electrolysis (6.852 mM ethanol in 0.1003 M $Na_2SO_4$) using platinum electrodes bearing the surface composites designated Films 6 and 7, respectively. Voltammograms were recorded at scan rates of 500, 200, 100, 50, and 20 mV/s. FIGS. 27A and 27B show cyclic voltammetric data for ethanol electrolysis (6.852 mM ethanol in 0.1003 M $Na_2SO_4$) using platinum electrodes bearing the surface composites designated Films 8 and 9, respectively. Voltammograms were again recorded at scan rates of 500, 200, 100, 50, and 20 mV/s.

Figure 28A:
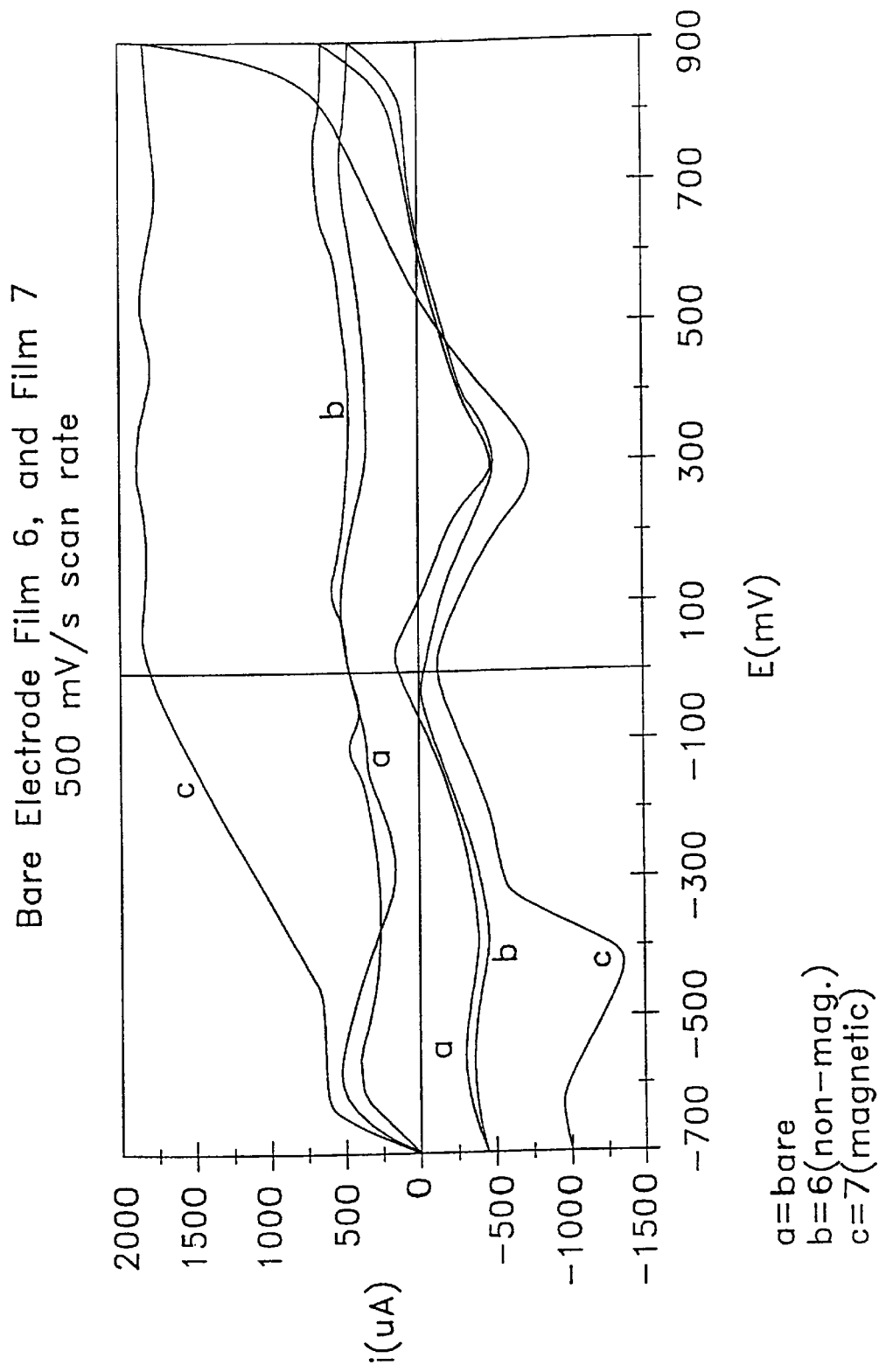
FIG. 28A shows cyclic voltammetric data for ethanol oxidation (6 mM ethanol in 0.1 M $Na_2SO_4$) using a bare platinum electrode, and using platinum electrodes bearing surface composites comprising Pt—C, Nafion, and either magnetic microbeads or non-magnetic microbeads, (11% beads, 26% Pt—C, and 63% Nafion, by volume). Cyclic voltammograms were recorded at a scan rate of 500 mV/s. The electrode was cycled 100 times between −700 and 900 mV before the data was recorded.

FIG. 28A shows cyclic voltammetric data for ethanol oxidation (6 mM ethanol in 0.1 M $Na_2SO_4$) using a bare platinum electrode, and using platinum electrodes bearing surface composites designated as Film 6 (non-magnetic) or Film 7 (magnetic). The voltammograms were recorded at a scan rate of 500 mV/s. It can be seen that at this scan rate the bare electrode and the electrode coated with non-magnetic Film 6 have approximately the same current. In contrast, the electrode coated with the magnetic Film 7 shows current at about twice the value recorded for the electrode coated with the non-magnetic film.

Figure 28B:
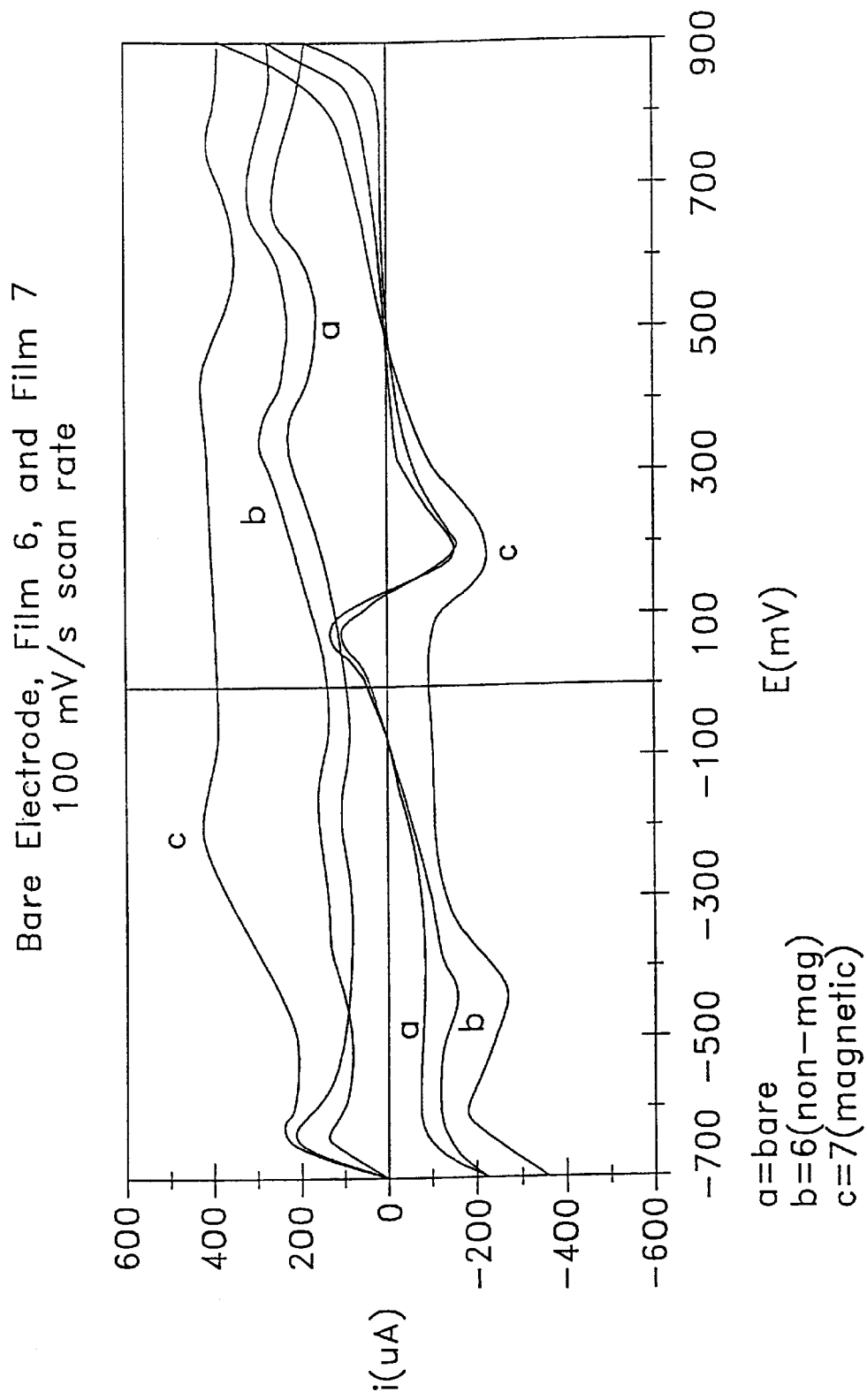
FIG. 28B shows cyclic voltammetric data for ethanol oxidation, as for FIG. 28A, recorded at a scan rate of 100 mV/s.
Figure 28C:
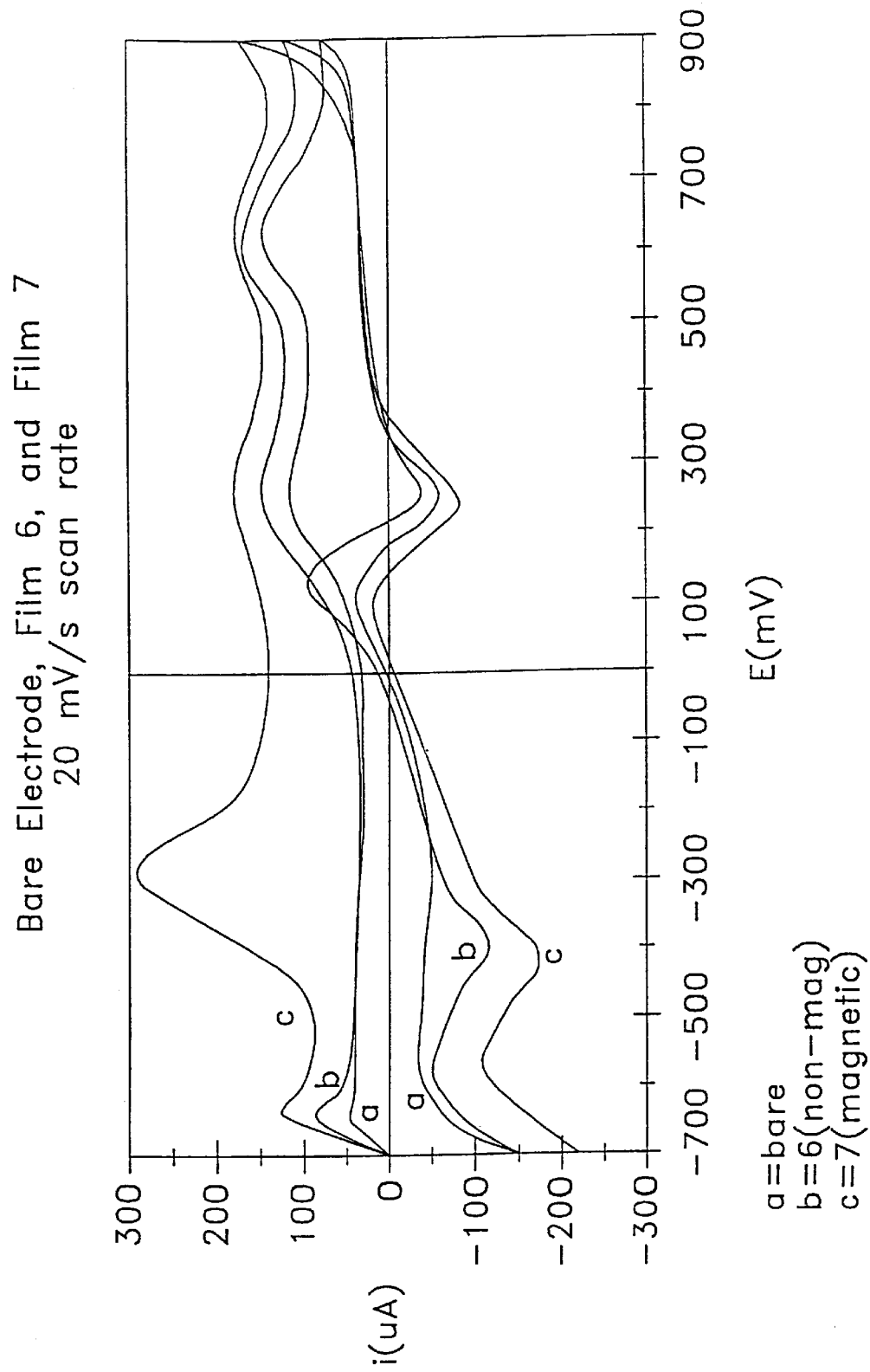
FIG. 28C shows cyclic voltammetric data for ethanol oxidation, as for FIG. 28A, recorded at a scan rate of 20 mV/s.

The oxidation of ethanol is a multielectron process, with numerous intermediates; the steps occur over a range of potentials and the potential is pH dependent. However, the peak at about −100 mV observed for the magnetic composite film corresponds to ethanol oxidation (see FIG. 28A). FIGS. 28B and 28C also show cyclic voltammetric data for ethanol oxidation (6 mM ethanol in 0.1 M $Na_2SO_4$) using a bare platinum electrode, and using platinum electrodes bearing surface composites designated as Film 6 (non-magnetic) or Film 7 (magnetic), as for FIG. 28A but at scan rates of 100 mV/s and 20 mV/s, respectively. Enhanced current for magnetic Film 7, as compared with non-magnetic Film 6, can also be seen in FIGS. 28B and 28C. The effect is particularly well illustrated in FIG. 28C (20 mV/s scan rate) in which case the oxidation wave is very obvious for the electrode coated with the magnetic composite film at −300 mV, but is completely absent for both the bare electrode and the electrode coated with the non-magnetic composite.

Further evidence that the magnetic modification of the electrode prevents passivation is seen at +100 mV on the return sweep. The electrode coated with the magnetic composite exhibits a simple reverse wave. In contrast, both the bare electrode and that modified with the non-magnetic composite both exhibit a wave that first swings to negative current and then swings to positive current. The latter type of wave is consistent with the stripping of a passivation layer from the surface of the electrode, thereby allowing a chemical species that would otherwise (i.e. in the absence of a passivation layer) have been electrolyzed at lower potential (but was prevented from so doing by the passivation layer) to undergo electrolysis once the passivation layer is stripped from the electrode.

There is some evidence that the electrolysis of ethanol at a magnetically modified electrode is chemically reversible, as indicated by the backwave at −400 mV vs SCE. The fact that the best resolved voltammograms were obtained at low scan rates is a good indication that electrodes magnetically modified with composite coatings, according to the present invention, will perform well in commercially valuable electrochemical processes, such as in steady state fuel cell applications. An electrode which resists, or is less susceptible to, passivation will provide higher power output for longer periods, as compared with an electrode which is more susceptible to passivation.

Figure 29A:
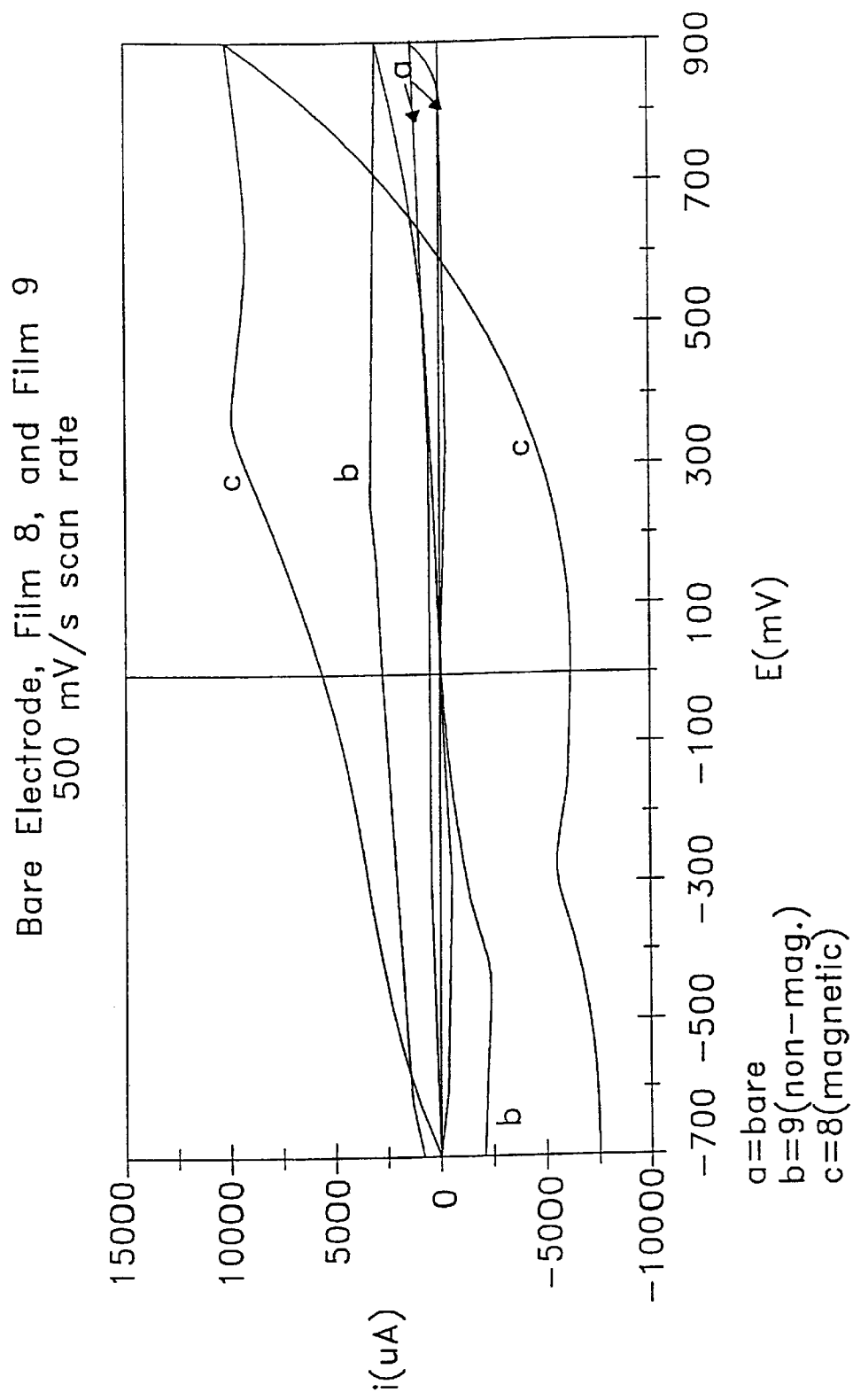
FIG. 29A shows cyclic voltammetric data for ethanol oxidation (6 mM ethanol in 0.1 M $Na_2SO_4$) using a bare platinum electrode, and using platinum electrodes bearing surface composites comprising Pt—C, Nafion, and either magnetic microbeads or non-magnetic microbeads, (11% beads, 76% Pt—C, and 13% Nafion, by volume). Cyclic voltammograms were recorded at a scan rate of 500 mV/s. The electrode was cycled 100 times between −700 and 900 mV before the data was recorded.
Figure 29B:
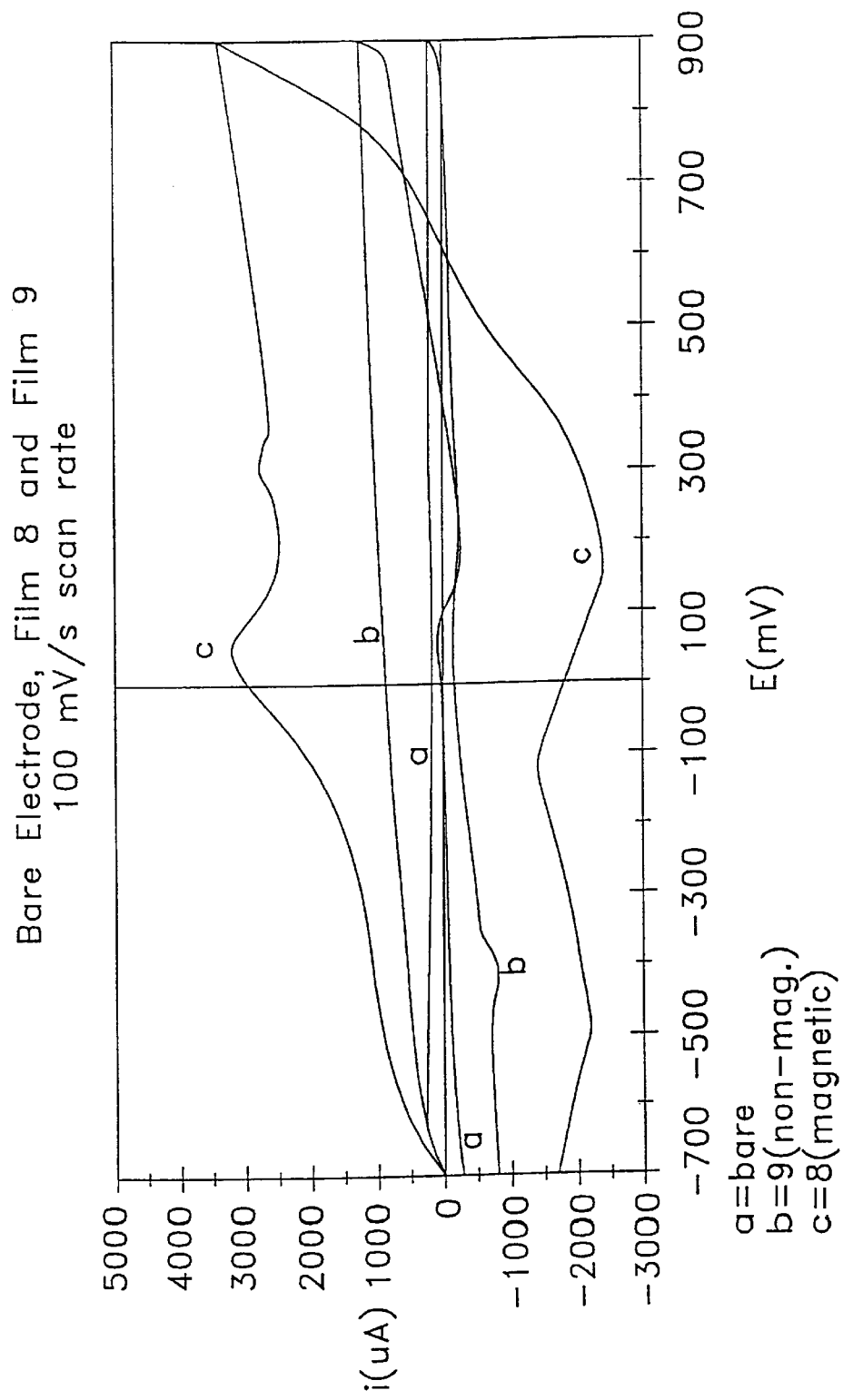
FIG. 29B shows cyclic voltammetric data for ethanol oxidation, as for FIG. 29A, recorded at a scan rate of 100 mV/s.
Figure 29C:
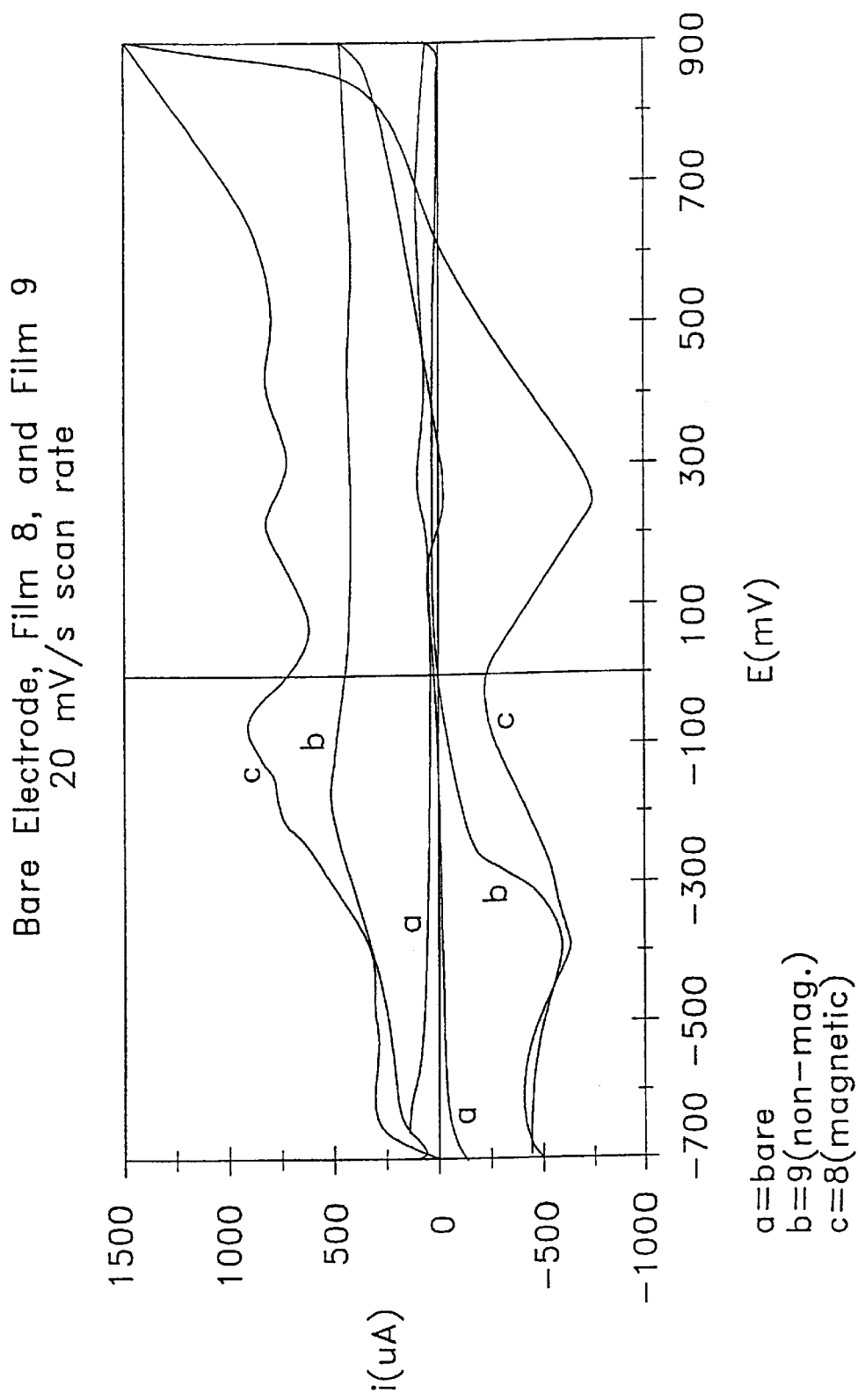
FIG. 29C shows cyclic voltammetric data for ethanol oxidation, as for FIG. 29A, recorded at a scan rate of 20 mV/s.

FIG. 29A shows cyclic voltammetric data for ethanol oxidation (6 mM ethanol in 0.1 M $Na_2SO_4$) using a bare platinum electrode, and using platinum electrodes bearing surface composites designated as Film 8 (magnetic) or Film 9 (non-magnetic). The voltammograms were recorded at a scan rate of 500 mV/s. FIGS. 29 B and 29 C show cyclic voltammetric data for ethanol oxidation (6 mM ethanol in 0.1 M $Na_2SO_4$) using a bare platinum electrode, and using platinum electrodes bearing surface composites designated as Film 9 (non-magnetic) or Film 8 (magnetic), as for FIG. 29A but at scan rates of 100 mV/s and 20 mV/s, respectively. Again, it can be seen that the electrode coated with the magnetic film (Film 8) has much higher current than the electrode bearing the non-magnetic film (Film 9). In the case of Film 9, it can be seen from FIG. 29A–C that the electrode coated with this non-magnetic film has a larger current than the bare electrode, due to the relatively high % of platinized carbon in the film (cf. Film 6, FIG. 28A). Referring to FIG. 29C, the voltammetric trace for the magnetic film has more peaks, as compared with those for the non-magnetic film and for the bare electrode. This may be due to the stabilization of intermediates of ethanol oxidation by the magnetic field associated with the magnetic particles in the film.

Taken as a whole, the data are consistent with magnetic modification of electrodes, according to the invention, for the prevention of passivation of electrodes. Compositions, apparatus, and methods of the invention also allow for the direct reformation of a liquid fuel, such as ethanol, at the surface of a magnetically modified electrode. Such compositions, apparatus, and methods are advantageous in a range of applications related to the development of electrochemical processes which proceed by either a free radical mechanism or a multielectron transfer process, and in fuel cell applications.

Numerous and additional modifications, improvements, and variations of the present invention are possible in light of the above teachings. It is therefore to be understood that the invention may be practiced otherwise than as specifically disclosed, and that the scope of the invention is defined by the appended claims rather than by the embodiments presented above.

What is claimed is:

1. A method of making an electrode having a surface coating of a magnetic composite, wherein the electrode resists passivation, comprising the steps of:

providing an electrode;

casting a casting mixture onto the surface of the electrode, said casting mixture comprising an ion exchange polymer, magnetic particles, and a solvent; and evaporating the solvent from the surface of the electrode to yield an electrode having a surface coating of the magnetic composite, wherein the resulting coated electrode resists passivation.

2. The method of claim 1, further comprising the step of:

after casting the casting mixture, arranging the electrode in an external magnetic field before evaporation of the solvent.

3. The method of claim 2, further comprising the step of:

removing the electrode from the external magnetic field after evaporation of the solvent.

4. The method of claim 1, wherein said casting step comprises casting a casting mixture further comprising particles containing a catalyst.

5. The method of claim 4, wherein the step of casting a casting mixture comprises platinum, platinum-coated carbon, platinum/ruthenium, ruthenium, palladium, rhodium, cobalt, nickel, a porphyrin, a platinum-iron alloy, a platinum-cobalt alloy, a platinum-nickel alloy, a transition metal, or combinations thereof as the catalyst.

6. The method of claim 1, wherein said casting step comprises casting a casting mixture further comprising:

carbon particles having a platinum catalyst disposed on the surface of the carbon particles.

7. The method of claim 6, wherein the step of casting a casting mixture comprises the platinum catalyst disposed on the surface of the carbon particles by from about 5% to about 99.99% by weight of the carbon particles as part of the casting mixture.

8. The method of claim 6, wherein the step of casting a casting mixture comprises magnetic particles that have diameters in the range of from about 0.1 $\mu$m to about 50 $\mu$m.

9. The method of claim 6, wherein the step of casting a casting mixture comprises magnetic particles that comprise from about 2% to about 90% by weight of magnetizable or magnetic material.

10. The method of claim 1, wherein said providing an electrode step comprises providing an anode.

11. The method of claim 1, wherein the step of casting a casting mixture comprises casting an ion exchange polymer that comprises from about 15% to about 99.99% by weight of the casting mixture.

12. The method of claim 1, wherein the step of evaporating the solvent comprises producing the surface coating with a thickness in the range of from about 0.5 $\mu$m to about 100 $\mu$m.

13. The method of claim 1, wherein the step of casting a casting mixture comprises said casting mixture comprising an electron conductor, and said electron conductor may comprise carbon.

14. A method of making an electrode having a surface coating of a magnetic composite, wherein the electrode resists passivation, comprising the steps of:

providing an electrode;

forming a suspension comprising magnetic particles and a polymeric material in a solvent;

depositing the suspension on the electrode; and evaporating the solvent to form a magnetic composite coating on the electrode.

15. The method of claim 14, wherein the step of forming a suspension comprises magnetic particles that comprise an iron oxide, a samarium cobalt, a neodymium alloy, nickel, cobalt, iron, neodymium iron boron, a lanthanide, or combinations thereof.

16. The method of claim 14, wherein the step of forming a suspension comprises polymeric material that is an ion exchange polymer.

* * * * *